(12) United States Patent
Yajima et al.

(10) Patent No.: US 12,263,801 B2
(45) Date of Patent: Apr. 1, 2025

(54) OCCUPANT PROTECTION DEVICE

(71) Applicant: TOYODA GOSEI CO., LTD., Kiyosu (JP)

(72) Inventors: Takatoshi Yajima, Kiyosu (JP); Yasushi Masuda, Kiyosu (JP); Kenji Kakimoto, Kiyosu (JP); Wataru Miura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/493,309

(22) Filed: Oct. 24, 2023

(65) Prior Publication Data
US 2024/0166155 A1 May 23, 2024

(30) Foreign Application Priority Data

Nov. 17, 2022 (JP) .................................. 2022-183890
Mar. 10, 2023 (JP) .................................. 2023-037747
Mar. 28, 2023 (JP) .................................. 2023-052467

(51) Int. Cl.
  *B60R 21/18* (2006.01)
  *B60R 21/2338* (2011.01)

(52) U.S. Cl.
  CPC .... *B60R 21/18* (2013.01); *B60R 2021/23382* (2013.01)

(58) Field of Classification Search
  CPC ................ B60R 2021/23386; B60R 21/18
  See application file for complete search history.

(56) References Cited

U.S. PATENT DOCUMENTS

| | | | |
|---|---|---|---|
| 6,286,860 B1 | 9/2001 | Adomeit et al. | |
| 11,390,232 B2 * | 7/2022 | Fischer | B60R 21/239 |
| 11,648,905 B2 * | 5/2023 | Yamada | B60R 21/2338 |
| | | | 280/730.1 |
| 2009/0278339 A1 * | 11/2009 | Azuma | B60R 21/231 |
| | | | 280/730.2 |
| 2016/0107598 A1 | 4/2016 | Fischer et al. | |
| 2017/0334387 A1 | 11/2017 | Fischer et al. | |
| 2019/0299899 A1 | 10/2019 | Einarsson et al. | |
| 2020/0122668 A1 * | 4/2020 | Ozaki | B60R 21/237 |
| 2021/0129785 A1 * | 5/2021 | Fischer | B60N 2/0025 |

(Continued)

FOREIGN PATENT DOCUMENTS

| | | | | |
|---|---|---|---|---|
| CN | 111152747 A | * | 5/2020 | ............. B60R 21/00 |
| CN | 111886160 A | * | 11/2020 | ........... B60R 21/214 |
| CN | 112744178 A | * | 5/2021 | ............. B60N 2/002 |

(Continued)

*Primary Examiner* — Nicole T Verley
(74) *Attorney, Agent, or Firm* — Posz Law Group, PLC

(57) ABSTRACT

An occupant protection device includes a seatbelt having a lap belt portion; an inflator; and an airbag that is provided in the lap belt portion. The airbag includes a main body portion, a conduit portion, and a tether. When inflation is completed the main body portion includes a rear wall portion to which one end portion of the tether is linked, a front wall portion that is disposed in front of the rear wall portion, and to which another end portion of the tether is linked, and an upper wall portion that connects the rear wall portion and the front wall portion above the tether. The main body portion is supported by a supporting body via the tether by the tether catching on and being engaged with the supporting body.

16 Claims, 40 Drawing Sheets

(56) References Cited

U.S. PATENT DOCUMENTS

2022/0048460 A1\* 2/2022 Yamada ................ B60R 21/207
2022/0355755 A1\* 11/2022 Fischer ............... B60R 21/2338

FOREIGN PATENT DOCUMENTS

| | | | | | |
|---|---|---|---|---|---|
| CN | 113459985 | A | \* | 10/2021 | ............ B60R 21/18 |
| CN | 114763120 | A | \* | 7/2022 | ........... B60R 21/013 |
| CN | 117087594 | A | \* | 11/2023 | |
| DE | 102019128376 | A1 | \* | 4/2020 | ............ B60R 21/00 |
| DE | 102022117404 | A1 | \* | 1/2023 | |
| JP | 2002-506401 | A | | 2/2002 | |
| JP | 2009269539 | A | \* | 11/2009 | ............ B60R 21/18 |
| JP | 2017-531592 | A | | 10/2017 | |
| JP | 2017213995 | A | \* | 12/2017 | |
| JP | 6587214 | B2 | \* | 10/2019 | |
| JP | 2020066425 | A | \* | 4/2020 | ............ B60R 21/00 |
| JP | 2022032920 | A | \* | 2/2022 | ............ B60R 21/18 |
| JP | 2023013840 | A | \* | 1/2023 | |
| JP | 7428121 | B2 | \* | 2/2024 | ............ B60R 21/18 |
| JP | 7505459 | B2 | \* | 6/2024 | |

\* cited by examiner

OCCUPANT PROTECTION DEVICE

CROSS-REFERENCE TO RELATED APPLICATIONS

The present application claims priority from Japanese Patent Application No. 2022-183890 of Yajima et al., filed on Nov. 17, 2022, Japanese Patent Application No. 2023-037747 of Yajima et al., filed on Mar. 10, 2023, and Japanese Patent Application No. 2023-052467 of Yajima et al., filed on Mar. 28, 2023, the disclosures of which are hereby incorporated into the present application by reference.

BACKGROUND

Technical Field

The present invention relates to an occupant protection device for protecting an occupant seated in a seat of a vehicle.

Description of Related Art

A configuration wherein an airbag is provided in a steering wheel is already widely known as a configuration for protecting an occupant seated in a driver's seat. Also, a configuration wherein an airbag is provided in a seatbelt lap belt portion that restrains a waist portion of an occupant, protecting the occupant, is described in JP2020-66425A.

As a driver's seat is commonly configured in such a way as to be able to move in a front-rear direction, a distance between an occupant seated in the driver's seat and the steering wheel changes in accordance with a position of the driver's seat. Herein, when the distance between an occupant seated in the driver's seat and the steering wheel is large, there is a possibility that the occupant can be more appropriately protected by protecting the occupant with an airbag provided in the lap belt portion, as in the configuration described in JP2020-66425A, than by protecting the occupant with an airbag provided in the steering wheel. In particular, this configuration is effective when employing a configuration wherein, in accompaniment to a trend toward autonomous driving of a vehicle, the driver's seat can be moved much farther to a rear than before in order to secure a large space in front of an occupant seated in the driver's seat.

Meanwhile, an airbag described in JP2020-66425A is of a form that spreads out with no gap on a front side of an occupant when inflation is completed, meaning that when the airbag expands in a state wherein the distance between the driver's seat and the steering wheel is small, there is concern that the airbag will interfere with the steering wheel, and it will be difficult for the airbag to spread out.

SUMMARY

An object of the invention is to provide an occupant protection device such that even when there is an obstruction in front of a seat, an airbag provided in a lap belt portion having difficulty in spreading out because of the obstruction can be restricted.

A representative configuration of the invention is as follows.

An occupant protection device includes the following: a seatbelt having at least a tongue, a buckle to which the tongue is joined, and a lap belt portion that restrains a waist portion of an occupant seated on a seat in a state where the tongue is joined to the buckle;
an inflator that discharges an inflating gas; and
an airbag that is provided in the lap belt portion, the airbag including a main body portion that expands owing to the inflating gas being supplied and receives the occupant, a conduit portion that is connected to the inflator, guides the inflating gas discharged from the inflator to the main body portion, and causes the inflating gas to flow into the main body portion, and a tether linked to an outer peripheral face of the main body portion,
wherein the main body portion when inflation is completed includes a rear wall portion that comes into contact with the occupant and to which one end portion of the tether is linked,
a front wall portion that is disposed in front of the rear wall portion, separated from the rear wall portion, and to which another end portion of the tether is linked, and
an upper wall portion that connects the rear wall portion and the front wall portion above the tether, and
wherein the main body portion is supported by a supporting body via the tether by the tether catching on and being engaged with the supporting body.

DESCRIPTION OF THE PREFERRED EMBODIMENTS

Figure 1:
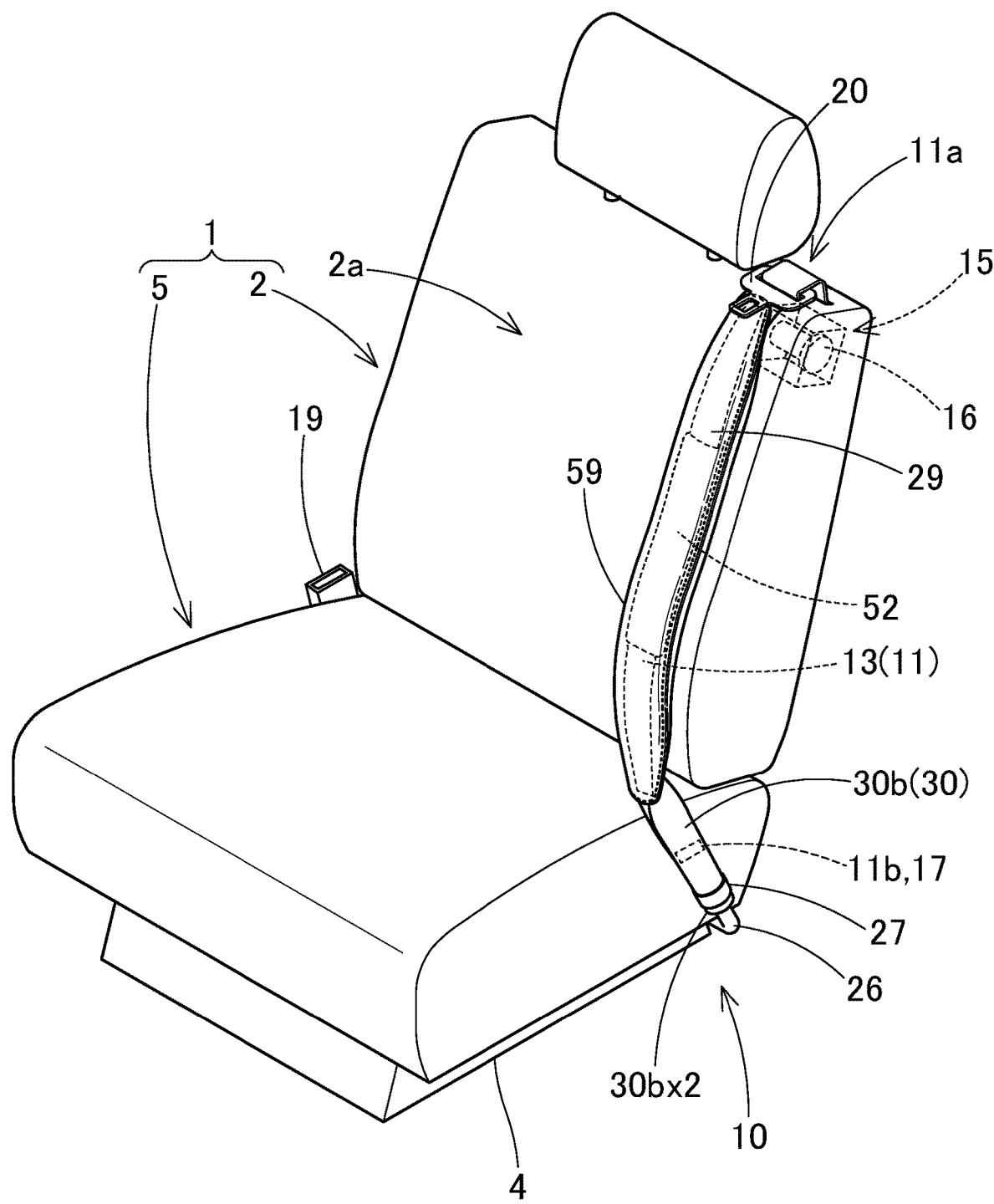
FIG. 1 is a perspective view of a seat on which an occupant protection device is mounted.

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

First Embodiment

Hereafter, firstly, an overall configuration of an occupant protection device 10 according to a first embodiment of the invention will be described, while referring to the drawings. Dimensions, materials, forms, relative dispositions, and the like of components described hereafter do not limit the scope of the invention, unless specifically stated otherwise. Also, in the following description, left and right directions mean a left direction and a right direction of a seat 1 on which the occupant protection device 10 is mounted, or more specifically, a left direction and a right direction as seen from an occupant M seated on the seat 1. Front and rear directions mean a front direction and a rear direction of the seat 1, or more specifically, a front direction and a rear direction as seen from the occupant M seated on the seat 1. Up and down directions mean a vertical up direction and down direction.

Figure 2:
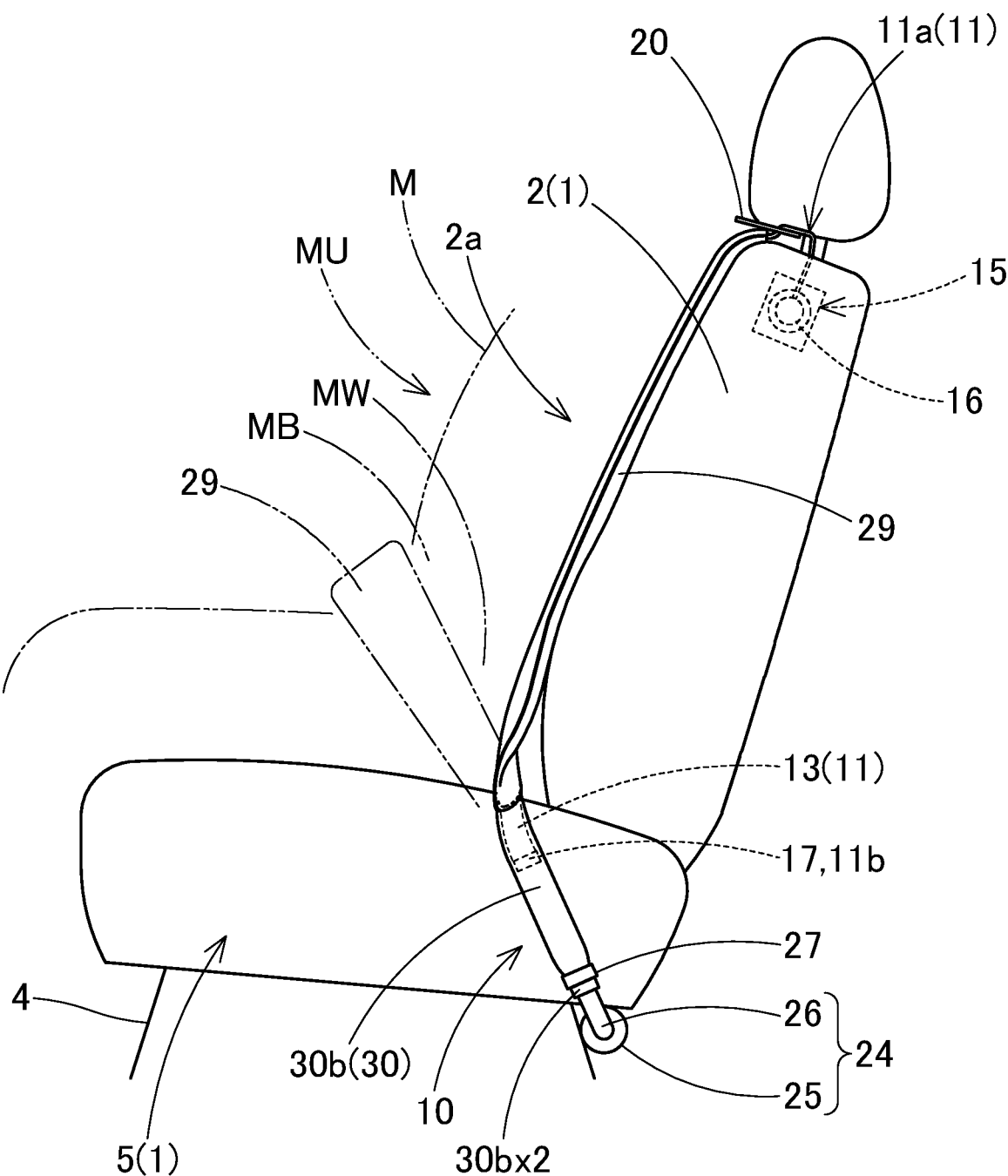
FIG. 2 is a left side view of the seat.
Figure 3:
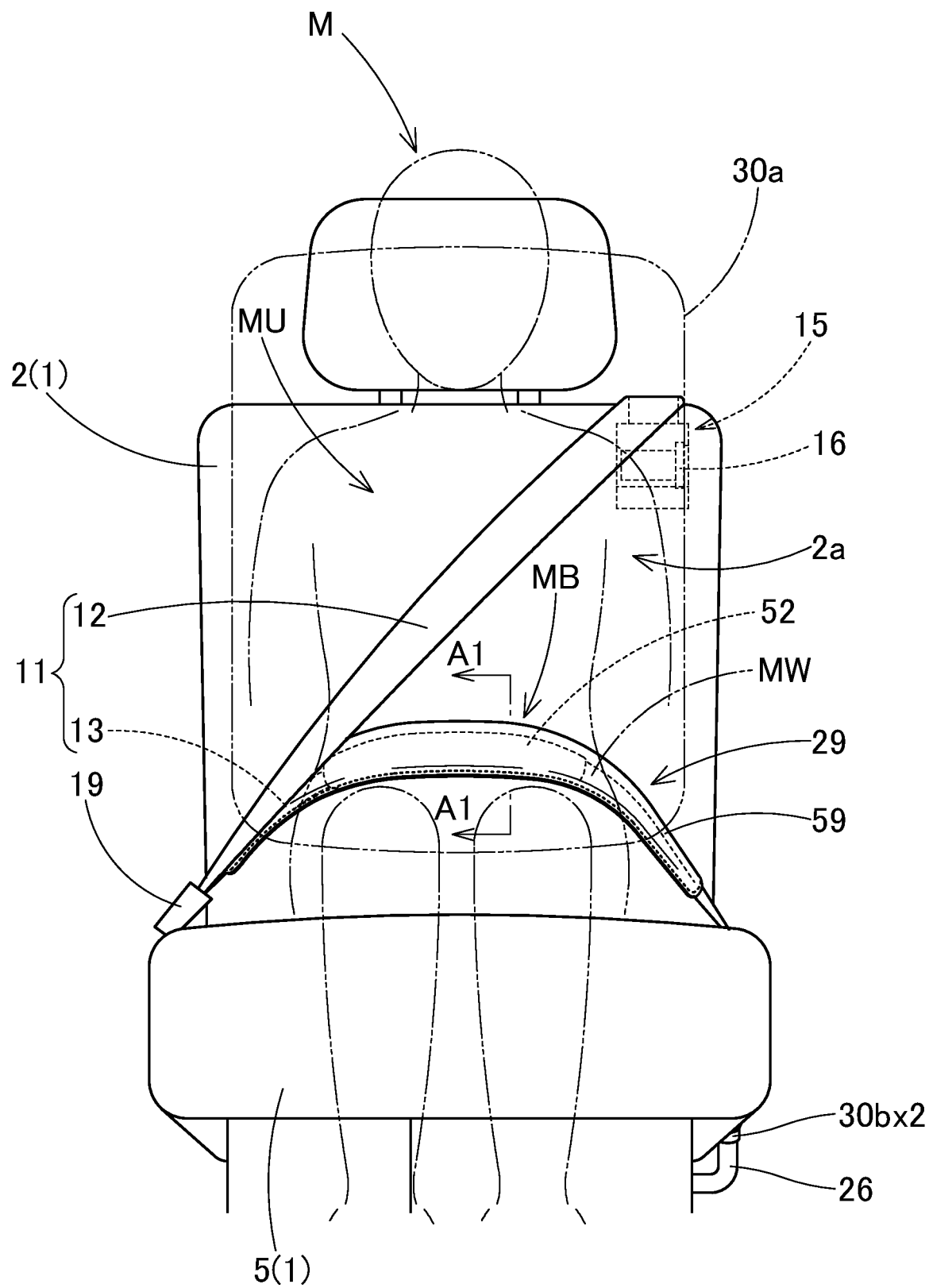
FIG. 3 is a front view of the seat.
Figure 4:
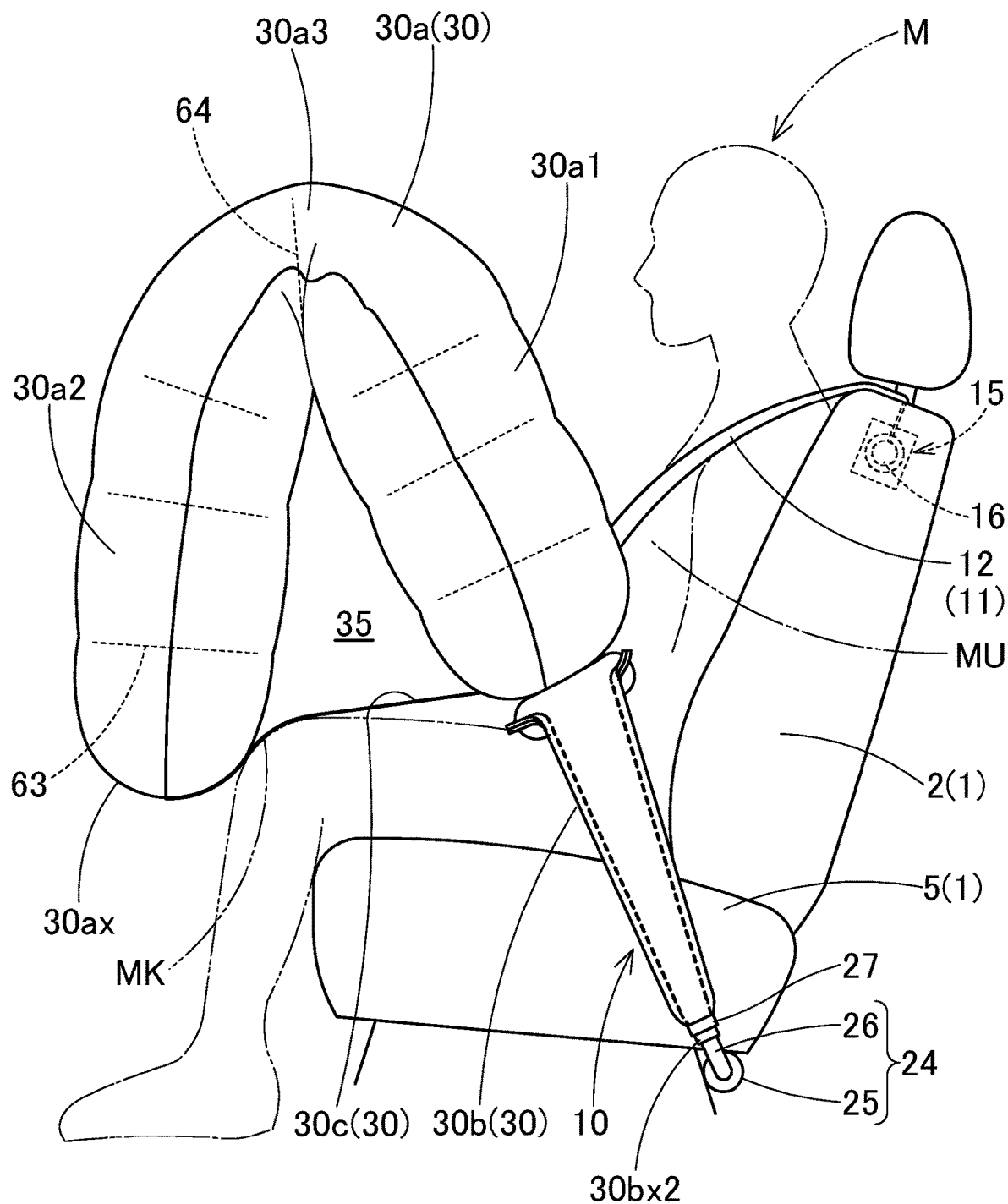
FIG. 4 is a left side view of the seat when an airbag is inflated.

FIG. 1 is a perspective view of the seat 1 on which the occupant protection device 10 is mounted. FIG. 2 is a left side view of the seat 1. FIG. 3 is a front view of the seat 1, and shows, as two-dotted chain lines, the occupant M in a state seated on the seat 1 and wearing a seatbelt 11, and an airbag 30 of the occupant protection device 10 in an inflated state. FIG. 4 is a left side view of the seat 1 when the airbag 30 is inflated, and shows, as a two-dotted chain line, the occupant M in a state seated on the seat 1 and wearing the seatbelt 11.

As shown in FIGS. 1 to 4, the occupant protection device 10 is mounted on the seat 1, which is a driver's seat of a vehicle, and is provided in order to protect the occupant M seated on the seat 1. The occupant protection device 10 is configured of the seatbelt 11, a bag assembly 29 including the airbag 30, and an inflator 24 that supplies an inflating gas to the airbag 30. The seat 1 includes a backrest portion 2 and a seat portion 5. Also, the seat 1 is configured in such a way as to be movable by sliding in the front and rear directions using an unshown seat slide.

The seat slide is such that two rails, a left rail and a right rail, are attached to a body of the vehicle below the seat 1, a rail that engages with the two rails is attached to a seat frame 4, and a locking mechanism is provided between the rail and the two rails. Although no autonomous driving mode is installed in the vehicle of the present embodiment, the seat 1 is configured in such a way as to be movable a significant distance to the rear using the unshown seat slide, and a large space can be secured at the feet of the occupant M, in order that the seat 1 is also compatible with a vehicle in which an autonomous driving mode is installed.

The seatbelt 11 is formed of a strip-form material wherein a polyester fiber, or the like, with good sliding properties is knitted. The seatbelt 11 is configured in such a way that an upper end 11a side thereof can be fed out from a take-up mechanism 15 provided in an interior in a vicinity of a left top edge of the backrest portion 2 in a vicinity of a left shoulder tip of the occupant M seated on the seat 1. A lower end 11b side of the seatbelt 11 forms a fixed end fixed to an anchor member 17 provided on a left side of the seat portion 5. Also, a tongue 20 is provided in an intermediate region of the seatbelt 11. The tongue 20 is fastened to a buckle 19 provided on the right side of the seat portion 5 of the seat 1. A state wherein the occupant M is seated on the seat 1 and the tongue 20 is fastened to the buckle 19 is a state wherein the seatbelt 11 is fastened to the occupant M.

The seatbelt 11 in a state fastened to the occupant M has a shoulder belt portion 12, which is a region that extends from the tongue 20 to the take-up mechanism 15 side, is disposed on a front face side of an upper body MU of the occupant M, and can restrain the upper body MU of the occupant M, and a lap belt portion 13, which is a region that extends from the tongue 20 to the lower end 11b side, is disposed on a front face side of a waist portion MW of the occupant M, and can restrain the waist portion MW. The occupant M can release the fastened state of the tongue 20 with respect to the buckle 19 by carrying out a pressing operation of an unshown release button provided on the buckle 19, and remove the tongue 20 from the buckle 19.

The take-up mechanism 15 has a pretensioner mechanism 16 configured in such a way as to, when there is an abrupt drawing out of the seatbelt 11, cause the drawing out to stop, and furthermore, in such a way as to be able to take up the drawn out seatbelt 11 when there is a collision or the like of the vehicle. The pretensioner mechanism 16 is a general purpose pretensioner mechanism, and instantaneously takes up the seatbelt 11 by causing a shaft around which the seatbelt 11 is wound to rotate by causing a built-in gas generator to operate.

The inflator 24 is configured of an inflator main body 25, which discharges an inflating gas, and a pipe portion 26 that guides the inflating gas discharged from the inflator main body 25 to the airbag 30. The inflator main body 25 is attached to the seat frame 4, which supports the seat portion 5 of the seat 1. The pipe portion 26 extends from the inflator main body 25, and is of a form bent into an approximate L-shape in such a way as to follow a side face from a bottom face of the seat portion 5.

The bag assembly 29 includes the airbag 30, which has a bag main body portion 30a and a conduit portion 30b, a bag linking portion 52, and a bag cover 59. In a state before the airbag 30 operates, the bag main body portion 30a is housed in an interior of the bag cover 59 in a folded state. The conduit portion 30b of the airbag 30 is connected to the pipe portion 26 of the inflator 24, takes in inflating gas discharged from the inflator 24, and guides the inflating gas to the bag main body portion 30a. A base end portion 30bx2 of the conduit portion 30b of the airbag 30 and the pipe portion 26 of the inflator 24 are linked by being fastened with a clamp 27.

Next, an operation of protecting the occupant M with the occupant protection device 10 will be described. Firstly, on the vehicle colliding, the pretensioner mechanism 16 of the take-up mechanism 15 operates, and the seatbelt 11 fastened to the occupant M is taken up in order to stabilize a seated posture of the occupant M on the seat 1. Because of this, the lap belt portion 13 of the seatbelt 11 is drawn to the tongue 20 side, and the shoulder belt portion 12 continuing from the lap belt portion 13 is drawn to the shoulder tip side of the occupant M. Subsequently, the inflator 24 operates, and on inflating gas being supplied from the inflator main body 25 via the pipe portion 26 and the conduit portion 30b of the airbag 30 to the bag main body portion 30a of the airbag 30, the bag main body portion 30a inflates. Because of this, the upper body MU of the occupant M, who is moving forward, is received by the bag main body portion 30a, whereby the occupant M is protected.

Figure 5:
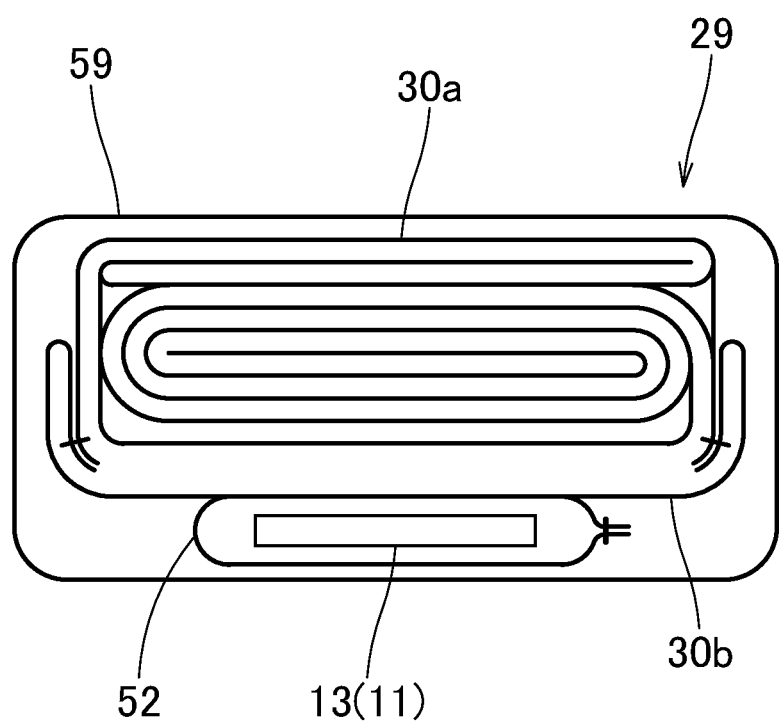
FIG. 5 is a sectional view of a bag assembly cut along an A1-A1 portion shown in FIG. 3.
Figure 6:
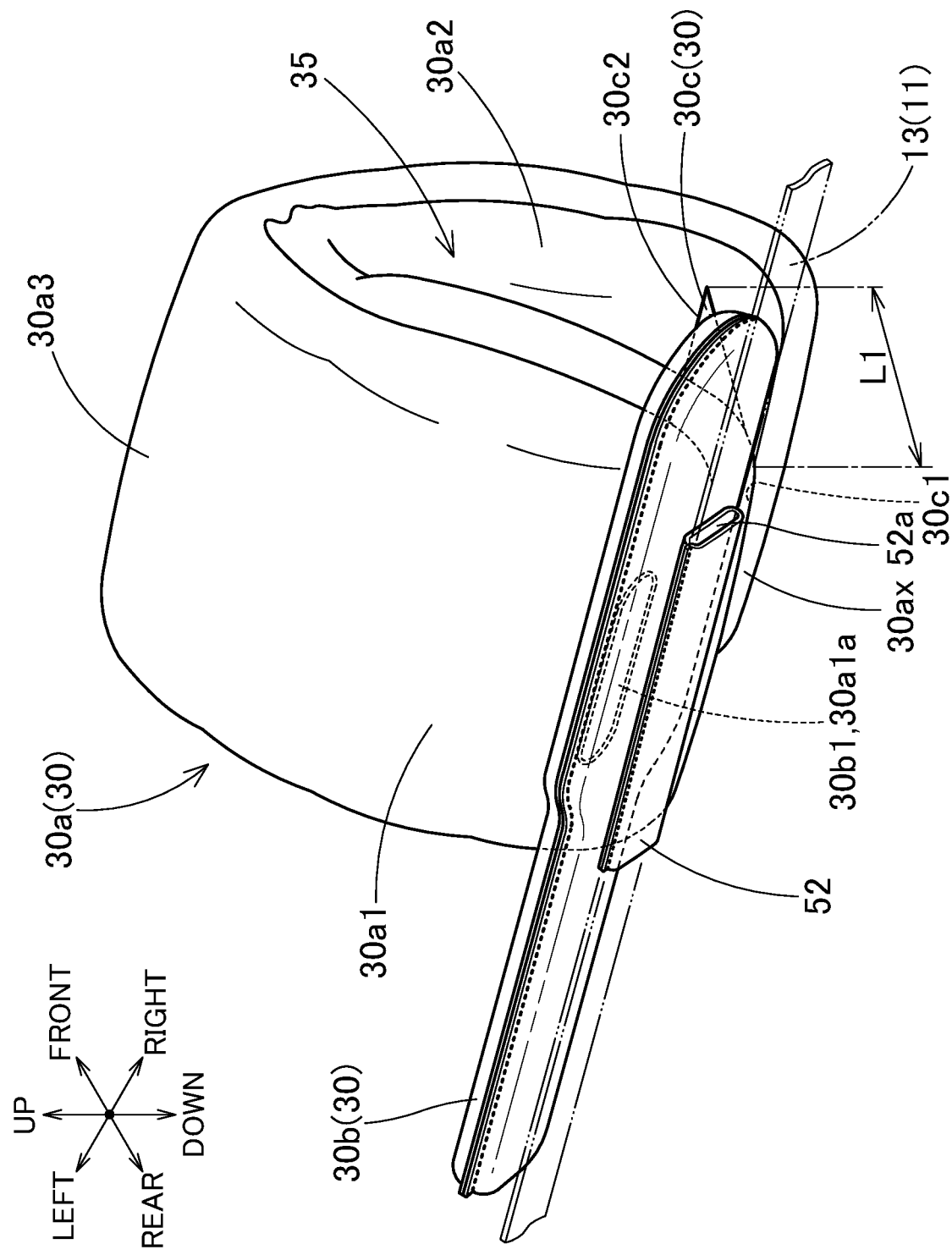
FIG. 6 is a perspective view wherein the bag assembly in a state wherein the airbag is inflated is seen from below.
Figure 7:
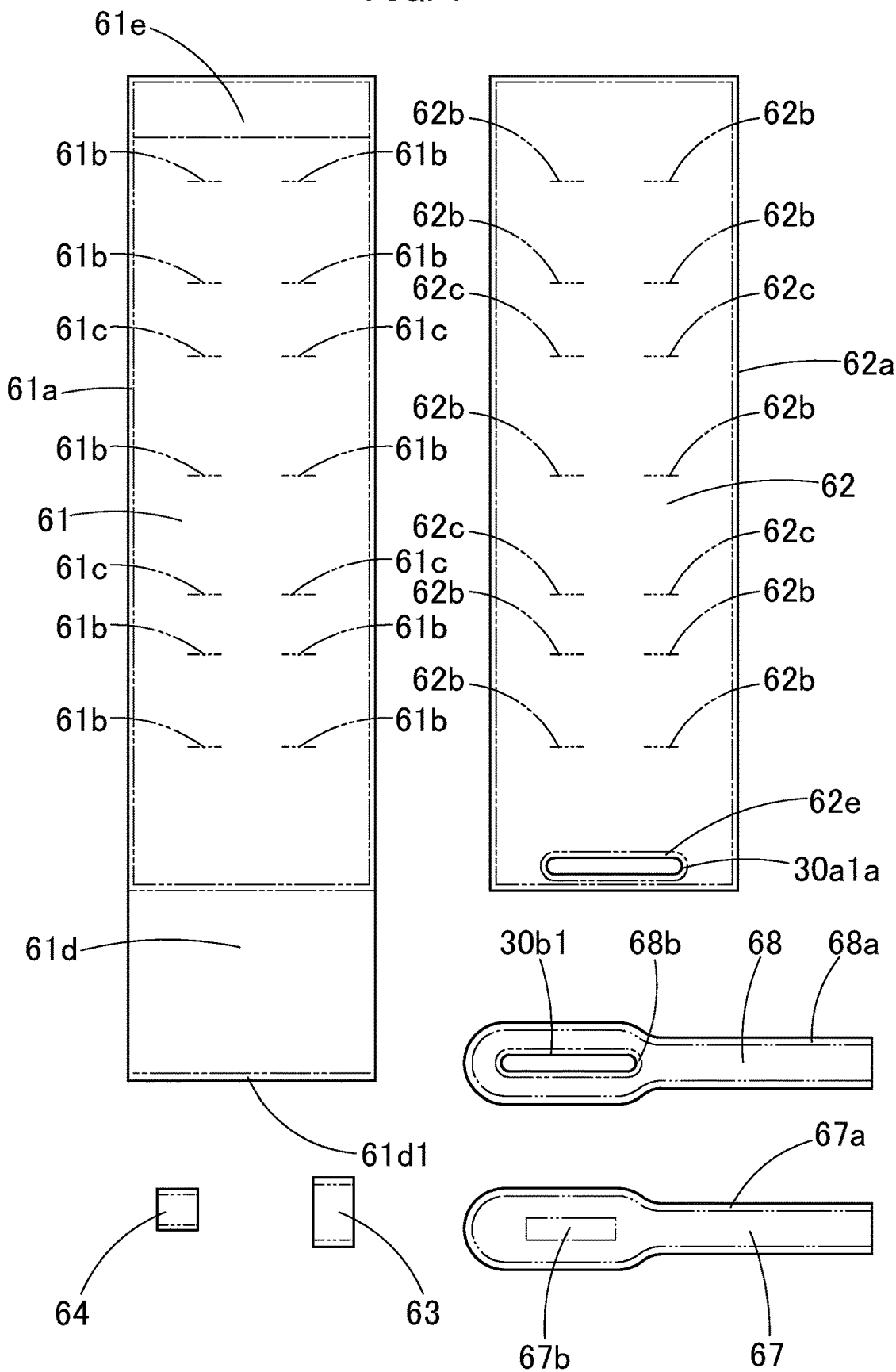
FIG. 7 is an exploded plan view of the airbag.

Next, a configuration of the bag assembly 29 will be described. FIG. 5 is a sectional view of the bag assembly 29 cut along an A1-A1 portion shown in FIG. 3. FIG. 6 is a perspective view wherein the bag assembly 29 in a state wherein the airbag 30 is inflated is seen from below, with the bag cover 59 being omitted. FIG. 7 is an exploded plan view of the airbag 30. As shown in FIGS. 5 to 7, the bag assembly 29 includes the airbag 30, the bag linking portion 52, and the bag cover 59.

The airbag 30 is configured of the bag main body portion 30a, which acts as a main body portion that receives the occupant M by inflating owing to inflating gas, the conduit portion 30b, which is connected to the pipe portion 26 of the inflator 24, and causes inflating gas to flow into the bag main body portion 30a by guiding the inflating gas discharged from the inflator 24 to an inflow port 30a1a of the bag main body portion 30a, and a tether 30c linked to an outer peripheral face of the bag main body portion 30a. The bag main body portion 30a and the conduit portion 30b are linked by being sewn together.

The bag main body portion 30a when inflation is completed has a rear wall portion 30a1, which is disposed immediately in front of the occupant M and receives the upper body MU of the occupant M, who moves forward, by coming into contact with the upper body MU, a front wall portion 30a2 disposed in front of the rear wall portion 30a1 but separated from the rear wall portion 30a1, and an upper wall portion 30a3 that connects an upper portion of the rear wall portion 30a1 and an upper portion of the front wall portion 30a2. The front wall portion 30a2 is disposed on a side of the rear wall portion 30a1 opposite to the occupant M side. Also, as the rear wall portion 30a1 and the front wall portion 30a2 are disposed separated in the front-rear direction, a gap 35 is formed between the rear wall portion 30a1 and the front wall portion 30a2 below the upper wall portion 30a3. Also, the tether 30c is such that one end portion 30c1 is linked to the rear wall portion 30a1, and another end portion 30c2 is linked to the front wall portion 30a2, below the upper wall portion 30a3, that is, in the gap 35 between the rear wall portion 30a1 and the front wall portion 30a2. That is, the upper wall portion 30a3 connects the front wall portion 30a2 and the rear wall portion 30al above the tether 30c. Also, the inflow port 30a1a, which is an aperture portion for causing inflating gas in the conduit portion 30b to flow therein, is provided in a lower portion of the rear wall portion 30a1. A form of the bag main body portion 30a is made by the bag main body portion 30a of an approximately cuboid form being bent by a tensile force of the tether 30c.

Also, the bag main body portion 30a is formed by sewing together edge portions 61a and 62a of two base fabrics 61 and 62 of approximately rectangular form (strip form), which are woven fabrics formed by plain weaving, or the like, a polyester fiber. The base fabric 61 is configured in such a way that a length in a longitudinal direction is long with respect to that of the base fabric 62, and a length in a lateral direction is the same. A long portion 61d of the base fabric 61 that is longer than the base fabric 62 forms the tether 30c by a leading end portion 61d1 thereof being sewn to a tether stitching portion 61e of the base fabric 61 in an exterior of the bag main body portion 30a. Owing to the bag main body portion 30a being formed of an approximately rectangular material in this way, yield of the airbag 30 improves. Also, owing to the tether 30c being formed using the base fabric 61 for forming the bag main body 30a, material for forming the airbag 30 can be reduced. When such a point is not taken into consideration, the tether 30c may be configured by linking a tether of a separate base fabric or another material to an outer peripheral face of the bag main body 30a. Also, in order to secure thicknesses of the rear wall portion 30a1, the front wall portion 30a2, and the upper wall portion 30a3, a multiple of two kinds of internal tethers 63 and 64 of an approximately rectangular form, for separating the two base fabrics 61 and 62, are provided in an interior of the bag main body portion 30a. The internal tether 63 is configured in such a way that a length in a longitudinal direction is long with respect to that of the internal tether 64, and a length in a lateral direction is the same. The internal tether 63 is sewn to tether stitching portions 61b and 62b of the base fabrics 61 and 62, and the internal tether 64 is sewn to tether stitching portions 61c and 62c of the base fabrics 61 and 62.

The conduit portion 30b is a tubular member that is linked to each of the pipe portion 26 of the inflator 24 and the bag main body portion 30a, and extends in a longitudinal direction of the lap belt portion 13. The conduit portion 30b has a communication port 30b1 that communicates with the inflow port 30a1a of the bag main body portion 30a. Inflating gas in an interior of the conduit portion 30b flows via the communication port 30b1 and the inflow port 30a1a into the interior of the bag main body portion 30a.

Also, the conduit portion 30b is formed by sewing together edge portions 67a and 68a of a lower side member 67 and an upper side member 68 formed of a bag base fabric that is a material the same as the material of the bag main body portion 30a. The lower side member 67 is linked to the bag linking portion 52 by being sewn to the bag linking portion 52 in a stitching portion 67b. The communication port 30b1 is formed in the upper side member 68, and a peripheral edge 68b of the communication port 30b1 is linked to the bag main body portion 30a by being sewn to a peripheral edge 62e of the inflow port 30a1a formed in the base fabric 62 forming the bag main body portion 30a. External dimensions of the lower side member 67 and the upper side member 68 are the same.

The bag linking portion 52 is a tubular member formed of a material the same as the bag base fabric forming the airbag 30, and is a member that links the airbag 30 to the lap belt portion 13. A space in an interior of the bag linking portion 52 forms a belt insertion portion 52a through which the lap belt portion 13 is inserted. After the lap belt portion 13 is inserted through the belt insertion portion 52a, the bag linking portion 52 and the lap belt portion 13 are linked by the two being sewn together. Also, an upper face of the bag linking portion 52 is linked by sewing to the stitching portion 67b of the lower side member 67 forming the conduit portion 30b of the airbag 30.

The bag cover 59 is a tubular member formed of a kind of fabric used as a material of the seat 1. The bag cover 59 houses the bag main body portion 30a of the airbag 30 in a state folded in an interior of the tube, one portion of the conduit portion 30b, the bag linking portion 52, and a portion of the lap belt portion 13 installed in the bag assembly 29. The bag cover 59 is subjected to pressure from the bag main body portion 30a when the bag main body portion 30a of the airbag 30 expands, and one portion thereof ruptures, causing the bag main body portion 30a to protrude from the bag cover 59.

Figure 8:
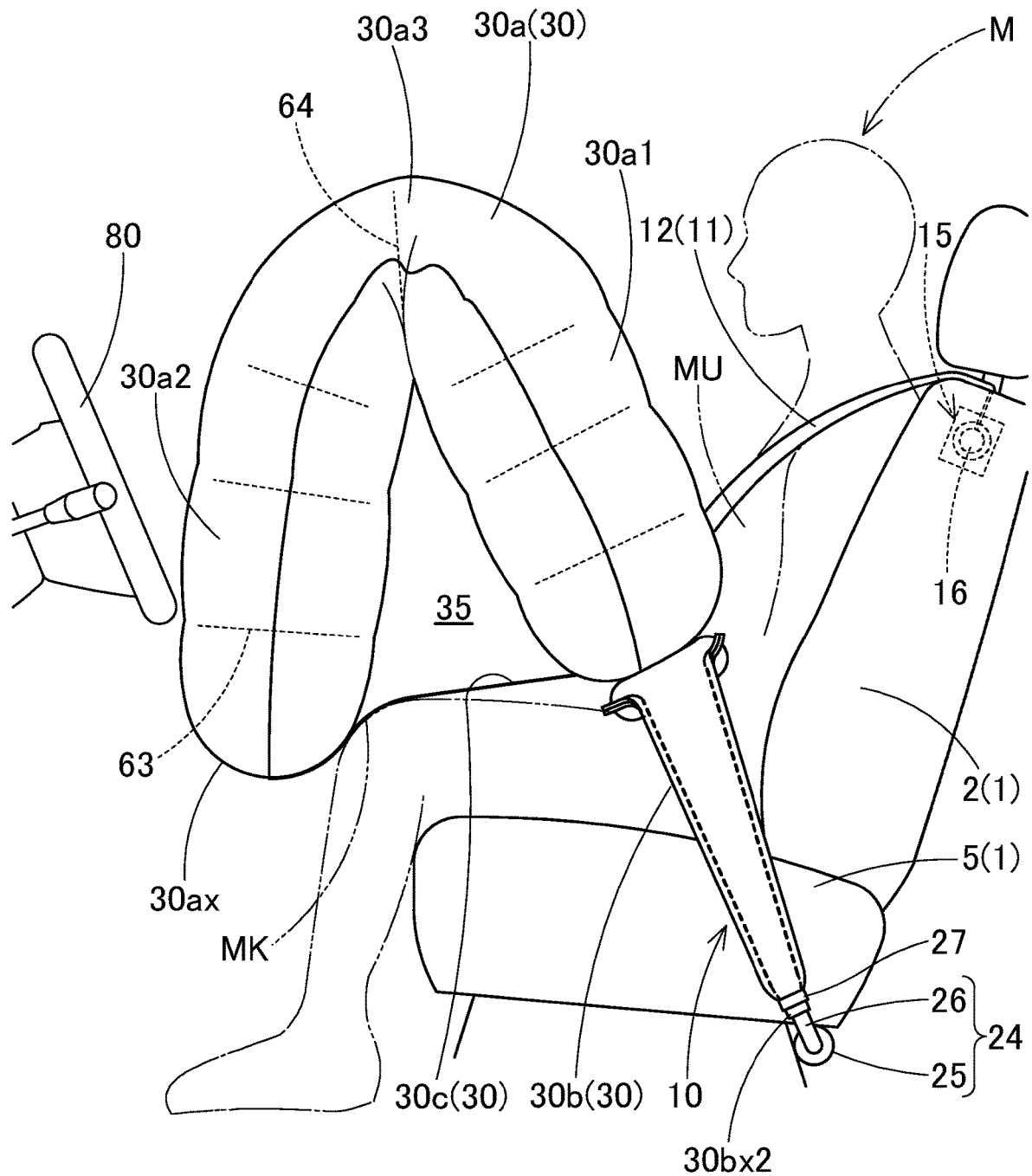
FIG. 8 is a drawing wherein a periphery of the seat when the airbag is inflated is seen from the left side.
Figure 9:
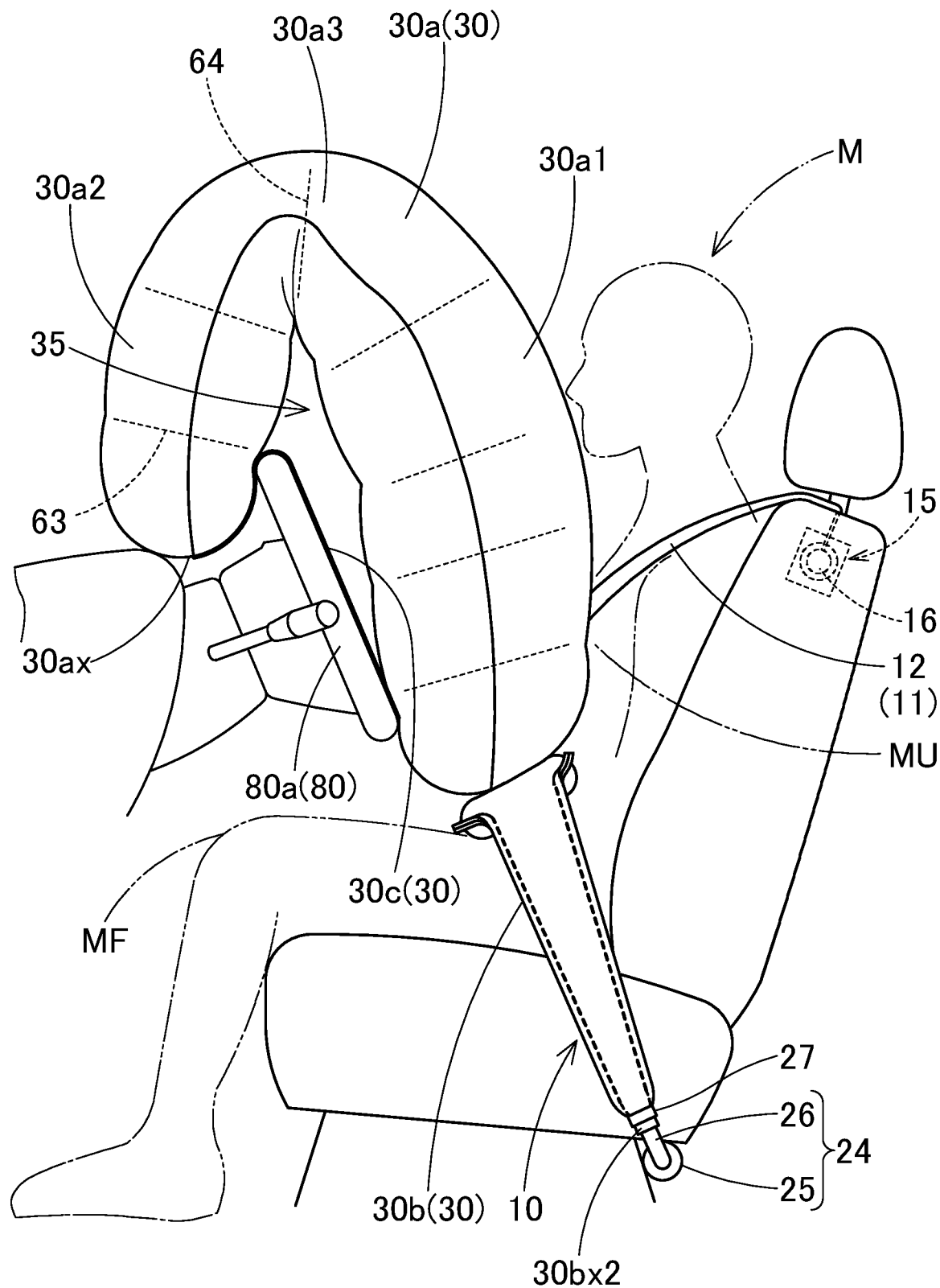
FIG. 9 is a drawing wherein a periphery of the seat when the airbag is inflated is seen from the left side.

Next, a positional relationship between the bag main body portion 30a and members in a periphery thereof when the airbag 30 is inflated will be described. FIG. 8 is a drawing wherein a periphery of the seat 1 when the airbag 30 is inflated in a state wherein the seat 1 is positioned toward the rear side, and a distance between the seat 1 and a steering wheel 80 is long, is seen from the left side. FIG. 9 is a drawing wherein a periphery of the seat 1 when the airbag 30 is inflated in a state wherein the seat 1 is positioned toward the front side, and a distance between the seat 1 and the steering wheel 80 is short, is seen from the left side.

When the distance between the seat 1 and the steering wheel 80 is long, as shown in FIG. 8, the bag main body portion 30a of the airbag 30 firstly expands upward and forward, after which a leading end 30ax side droops downward due to gravity. Because of this, the tether 30c catches on a knee portion MK (a supporting body) of the occupant M from above and is engaged therewith, and the bag main body portion 30a is supported by the knee portion MK of the occupant M via the tether 30c. By the tether 30c catching on and being engaged with the knee portion MK, and the bag main body portion 30a being supported via the tether 30c in this way, the bag main body portion 30a is stably supported by the knee portion MK of the occupant M, the bag main body portion 30a is more easily disposed in an intended position, and the bag main body portion 30a more easily obtains a reactive force from the knee portion MK or a thigh portion connected to the knee portion MK. That is, when the upper wall portion 30a3 is lower than the tether 30c, the upper wall portion 30a3 is more easily repelled from the knee portion MK due to a repulsive force of the upper wall portion 30a3 when the upper wall portion 30a3, into which inflating gas has flowed, comes into contact with the knee portion MK, and there is a possibility that the bag main body portion 30a is not stably supported by the knee portion MK. Meanwhile, when the upper wall portion 30a3 is disposed above the tether 30c, as in the present embodiment, the tether 30c, into which no inflating gas has flowed, catches on and is engaged in such a way as to follow an upper face of the knee portion MK, because of which a large area of contact between the tether 30c and the knee portion MK is secured, whereby friction is increased, and the bag main body portion 30a can be stably supported by the knee portion MK via the tether 30c. Because of this, the bag main body portion 30a is more easily disposed in an intended position, and the bag main body portion 30a more easily obtains a reactive force from the knee portion MK or a thigh portion connected to the knee portion MK. In order that the tether 30c more easily catches on the knee portion MK owing to the front wall portion 30a2 of the bag main body portion 30a being disposed in front of the knee portion MK of the occupant M, and in order to appropriately protect the knee portion MK of the occupant M, a length L1 between the one end portion 30c1 and the other end portion 30c2 of the tether 30c (FIG. 6) is preferably 300 mm or greater.

When the distance between the seat 1 and the steering wheel 80 is short, as shown in FIG. 9, the bag main body portion 30a of the airbag 30 firstly expands upward and forward in such a way as to surmount the steering wheel 80, after which the leading end 30ax side droops downward due to gravity. At this time, the steering wheel 80 is disposed in the gap 35 formed between the rear wall portion 30a1 and the front wall portion 30a2 of the bag main body portion 30a, because of which the bag main body portion 30a and the steering wheel 80 are unlikely to interfere with each other when the bag main body portion 30a expands and spreads out, and the spreading out of the bag main body portion 30a is unlikely to be impeded. In this way, this kind of occupant protection device 10 of the present embodiment is such that even when the steering wheel 80, which is an obstruction, is in front of the seat 1, interference between the bag main body portion 30a and the steering wheel 80 is restricted, and difficulty in the bag main body portion 30a of the airbag 30 spreading out due to the steering wheel 80 can be restricted.

Also, the tether 30c catches on and is engaged with an upper face of a ring portion 80a, which the occupant M grips and rotates to steer, of the steering wheel 80 (supporting body) from above, whereby the bag main body portion 30a that has surmounted the steering wheel 80 is supported by the ring portion 80a of the steering wheel 80 via the tether 30c. By the tether 30c catching on and being engaged with the steering wheel 80, and the bag main body portion 30a being supported via the tether 30c in this way, the bag main body portion 30a is stably supported by the steering wheel 80, the bag main body portion 30a is more easily disposed in an intended position, and the bag main body portion 30a more easily obtains a reactive force from the steering wheel 80. That is, when the upper wall portion 30a3 is lower than the tether 30c, the upper wall portion 30a3 is more easily repelled from the steering wheel 80 due to a repulsive force of the upper wall portion 30a3 when the upper wall portion 30a3, into which inflating gas has flowed, comes into contact with the steering wheel 80, and there is a possibility that the bag main body portion 30a is not stably supported by the steering wheel 80. Meanwhile, when the upper wall portion 30a3 is disposed above the tether 30c, as in the present embodiment, the tether 30c, into which no inflating gas has flowed, catches on and is engaged in such a way as to follow the upper face of the ring portion 80a of the steering wheel 80, because of which a large area of contact between the tether 30c and the steering wheel 80 is secured, whereby friction is increased, and the bag main body portion 30a can be stably supported by the steering wheel 80 via the tether 30c. Because of this, the bag main body portion 30a is more easily disposed in an intended position, and the bag main body portion 30a more easily obtains a reactive force from the steering wheel 80.

Figure 10:
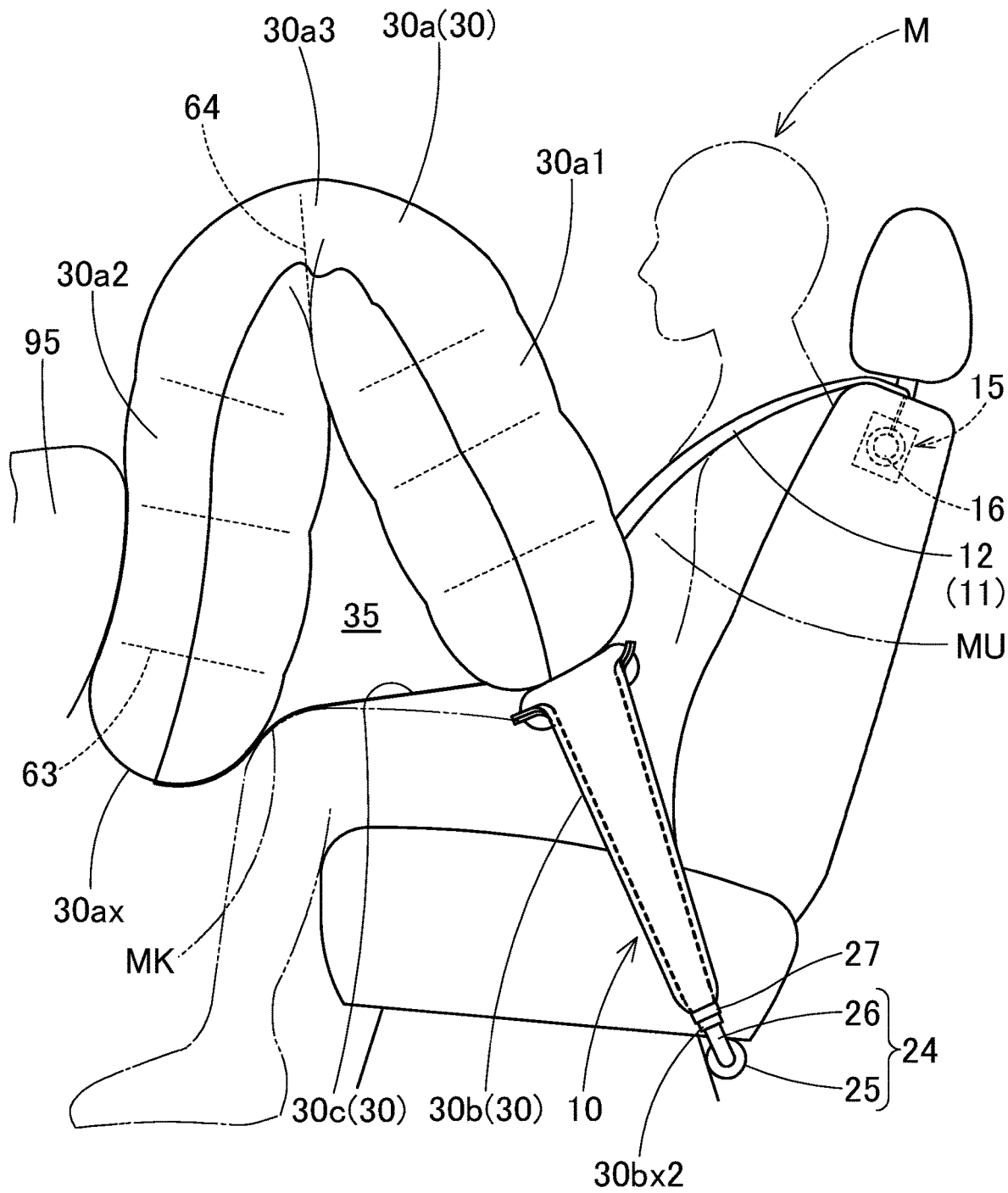
FIG. 10 is a drawing wherein a periphery of the seat when the airbag is inflated is seen from the left side in a configuration wherein the occupant protection device is mounted on a passenger seat.

In the present embodiment, a configuration wherein the occupant protection device 10 is provided in a driver's seat of a vehicle has been described, but the invention not being limited to this, the occupant protection device 10 can also be provided in a rear seat or a passenger seat of a vehicle. For example, a case wherein the occupant protection device 10 is provided in a passenger seat of a vehicle is such that on the airbag 30 inflating in a state wherein a distance between the seat 1 and an instrument panel 95 in front of the seat 1 is long, as shown in FIG. 10, the tether 30c catches on and is engaged with the knee portion MK of the occupant M seated in the passenger seat from above, and the bag main body portion 30a is supported by the knee portion MK of the occupant M via the tether 30c.

Also, in the present embodiment, the occupant protection device 10 is described with the so-called three-point seatbelt 11, wherein the seatbelt 11 includes the shoulder belt portion 12 and the lap belt portion 13, as an example, but the invention is not limited to this. That is, even when the invention is applied to the so-called two-point seatbelt 11, wherein the seatbelt 11 includes the lap belt portion 13 without including the shoulder belt portion 12, advantages the same as those heretofore described can be obtained.

Second Embodiment

Figure 11:
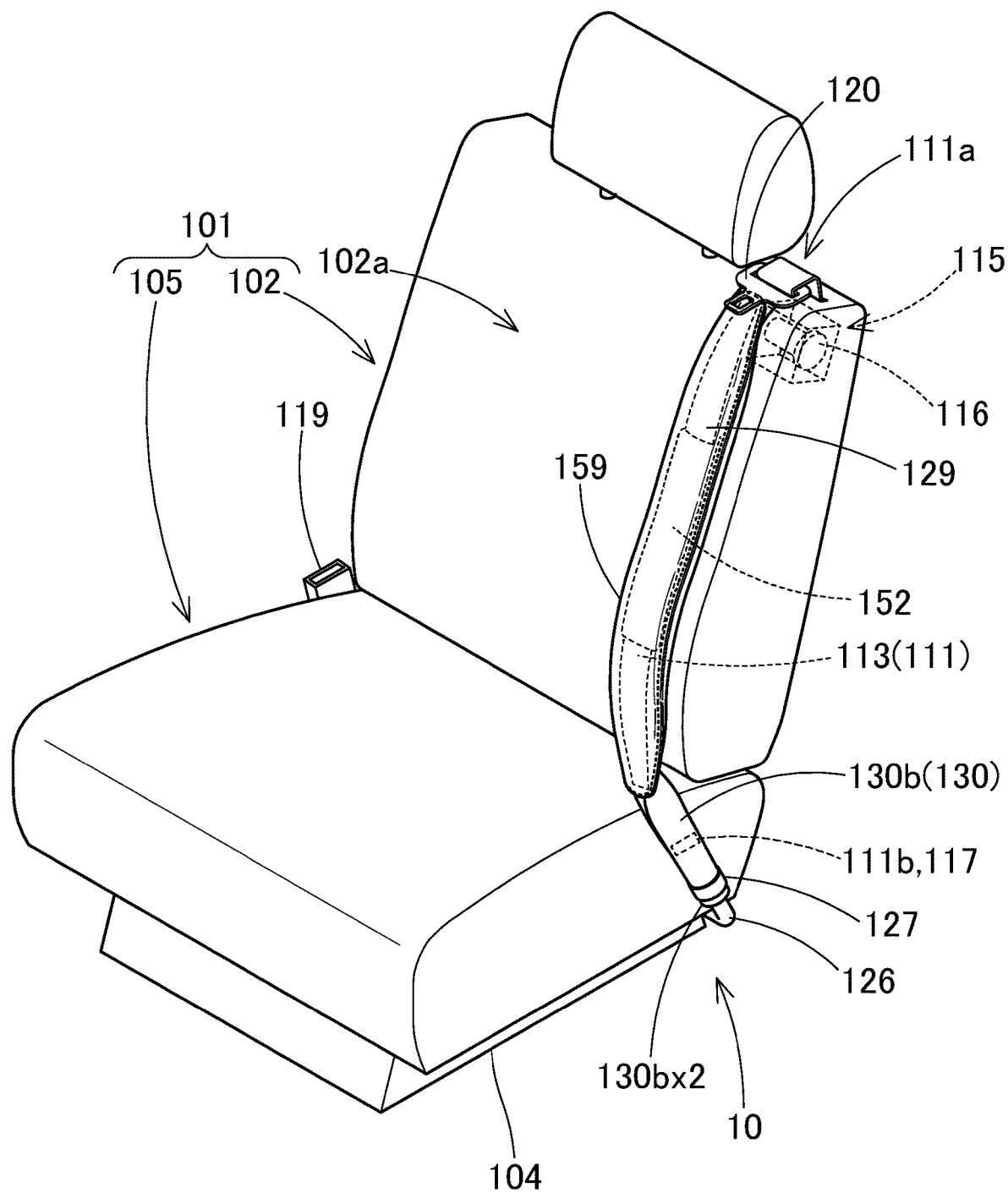
FIG. 11 is a perspective view of a seat on which the occupant protection device is mounted.
Figure 12:
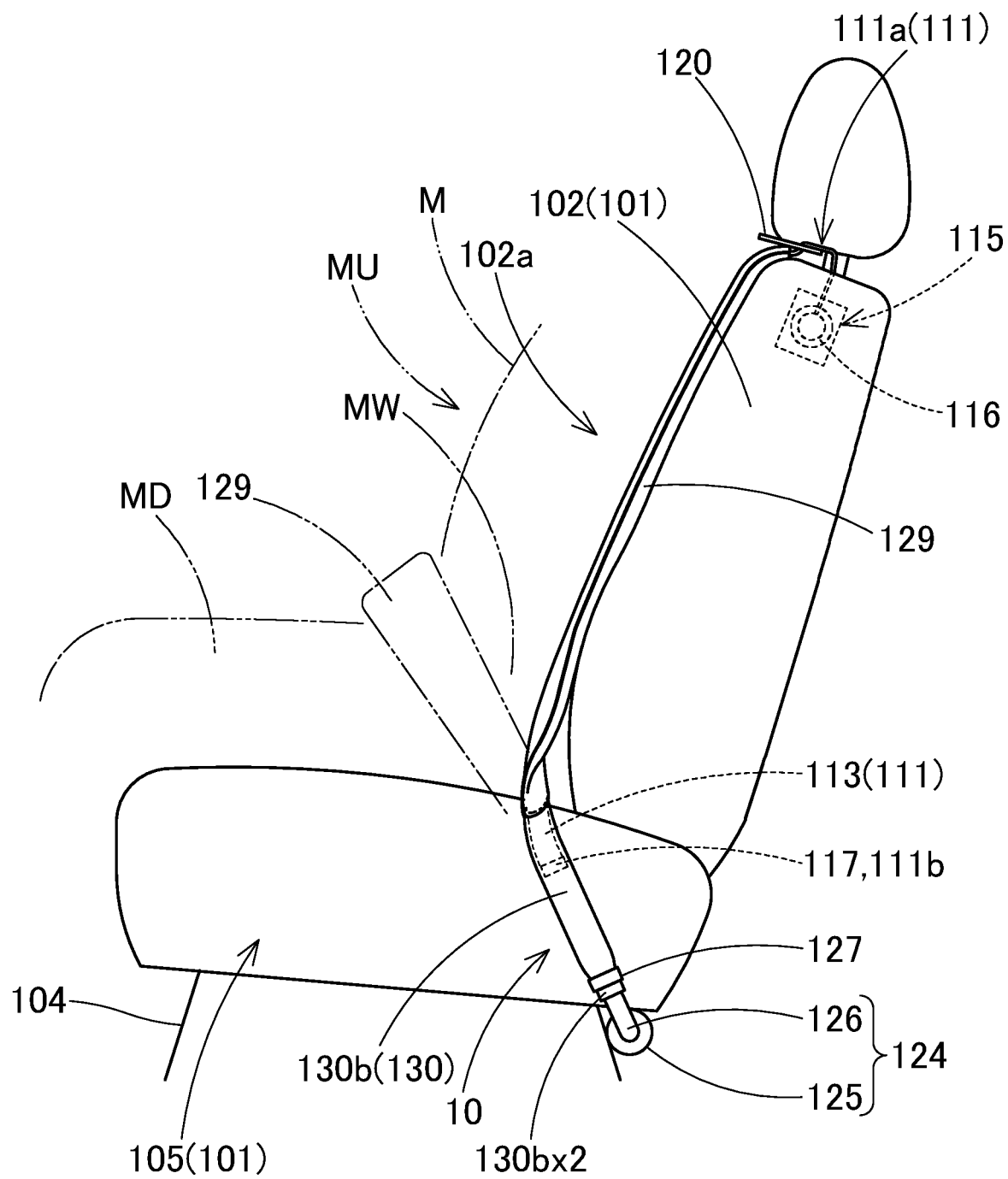
FIG. 12 is a left side view of the seat.
Figure 13:
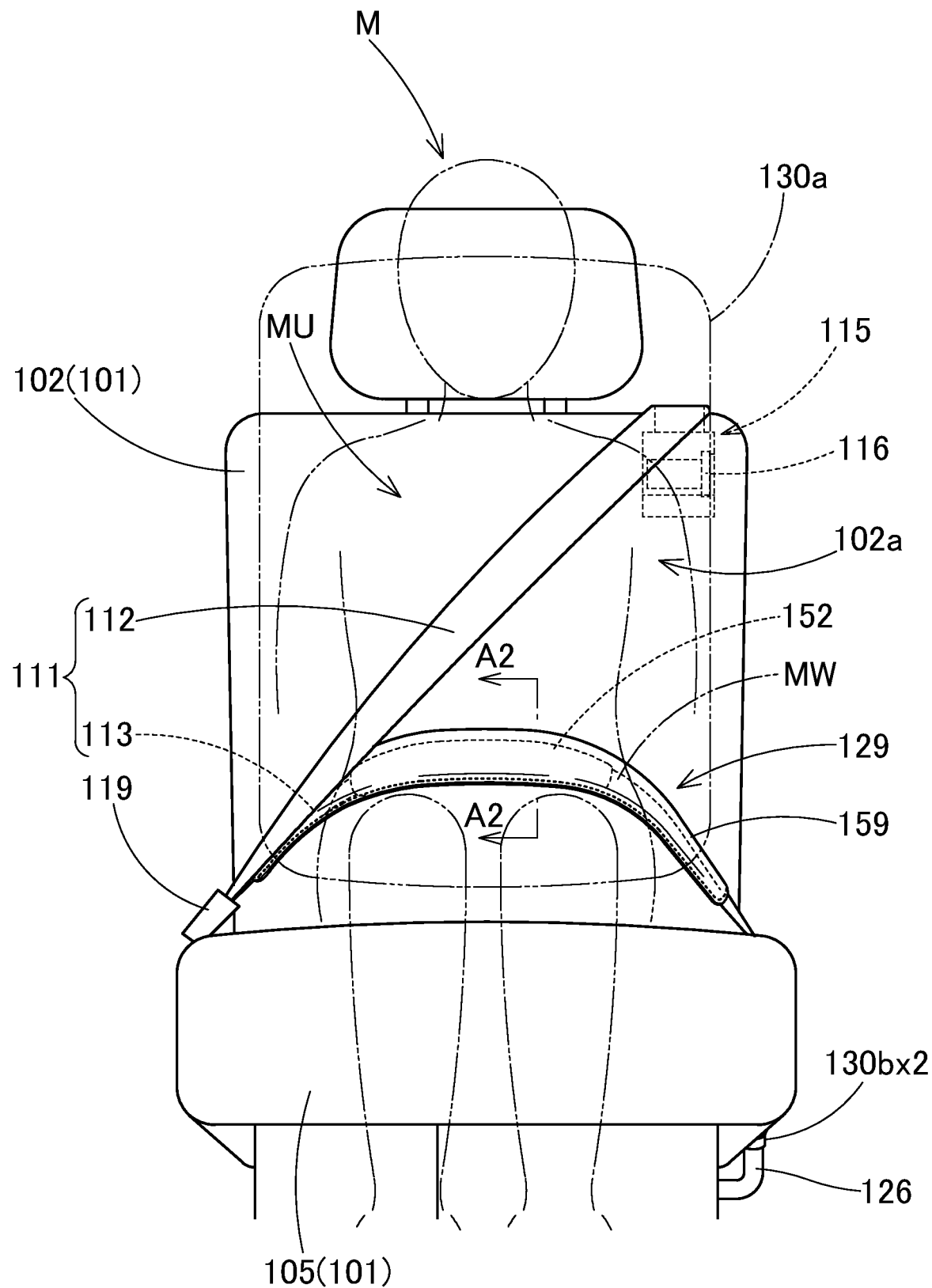
FIG. 13 is a front view of the seat.
Figure 14:
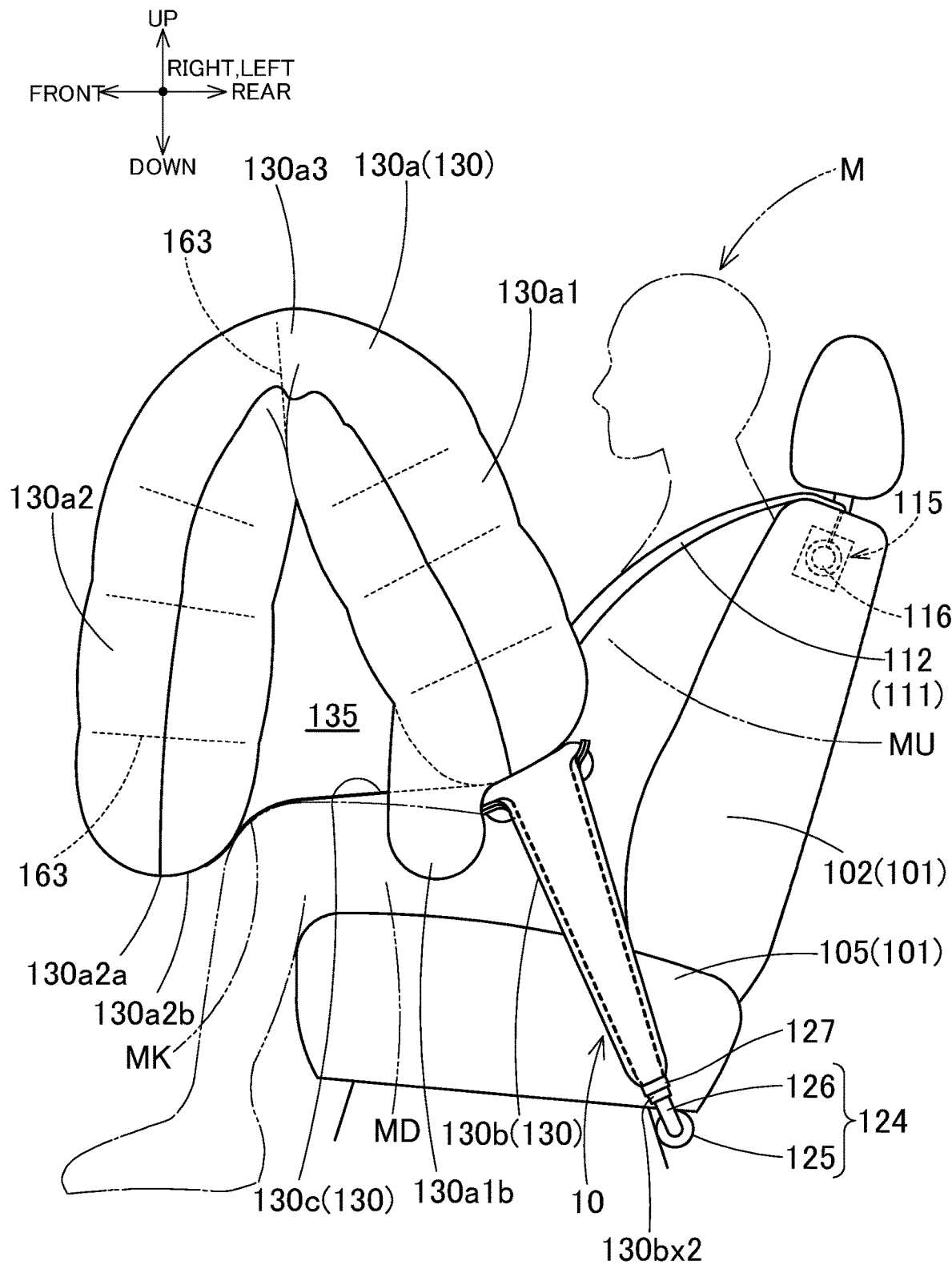
FIG. 14 is a left side view of the seat when an airbag is inflated.

Next, the occupant protection device 10 according to a second embodiment of the invention will be described. FIG. 11 is a perspective view of a seat 101 on which the occupant protection device 10 is mounted. FIG. 12 is a left side view of the seat 101. FIG. 13 is a front view of the seat 101, and shows, as two-dotted chain lines, the occupant M in a state seated on the seat 101 and wearing a seatbelt 111, and an airbag 130 of the occupant protection device 10 in an inflated state. FIG. 14 is a left side view of the seat 101 when the airbag 130 is inflated, and shows, as a two-dotted chain line, the occupant M in a state seated on the seat 101 and wearing the seatbelt 111.

As shown in FIGS. 11 to 14, the occupant protection device 10 is mounted on the seat 101, which is a driver's seat of a vehicle, and is provided in order to protect the occupant M seated on the seat 101. The occupant protection device 10 is configured of the seatbelt 111, a bag assembly 129 including the airbag 130, and an inflator 124 that supplies an inflating gas to the airbag 130. The seat 101 includes a backrest portion 102 and a seat portion 105. Also, the seat 101 is configured in such a way as to be movable by sliding in the front and rear directions using an unshown seat slide. The seat slide is such that two rails, a left rail and a right rail, are attached to a body of the vehicle below the seat 101, a rail that engages with the two rails is attached to a seat frame 104, and a locking mechanism is provided between the rail and the two rails. Although no autonomous driving mode is installed in the vehicle of the present embodiment, the seat 101 is configured in such a way as to be movable a significant distance to the rear using the unshown seat slide, and a large space can be secured at the feet of the occupant M, in order that the seat 101 is also compatible with a vehicle in which an autonomous driving mode is installed.

The seatbelt 111 is formed of a strip-form material wherein a polyester fiber, or the like, with good sliding properties is knitted. The seatbelt 111 is configured in such a way that an upper end 111a side thereof can be fed out from a take-up mechanism 115 provided in an interior in a vicinity of a left top edge of the backrest portion 102 in a vicinity of a left shoulder tip of the occupant M seated on the seat 101. A lower end 111b side of the seatbelt 111 forms a fixed end fixed to an anchor member 117 provided on a left side of the seat portion 105. Also, a tongue 120 is provided in an intermediate region of the seatbelt 111. The tongue 120 is fastened to a buckle 119 provided on the right side of the seat portion 105 of the seat 101. A state wherein the occupant M is seated on the seat 111 and the tongue 120 is fastened to the buckle 119 is a state wherein the seatbelt 111 is fastened to the occupant M.

The seatbelt 111 in a state fastened to the occupant M has a shoulder belt portion 112, which is a region that extends from the tongue 120 to the take-up mechanism 115 side, is disposed on a front face side of an upper body MU of the occupant M, and can restrain the upper body MU of the occupant M, and a lap belt portion 113, which is a region that extends from the tongue 120 to the lower end 111b side, is disposed on a front face side of a waist portion MW of the occupant M, and can restrain the waist portion MW. The occupant M can release the fastened state of the tongue 120 with respect to the buckle 119 by carrying out a pressing operation of an unshown release button provided on the buckle 119, and remove the tongue 120 from the buckle 119.

The take-up mechanism 115 has a pretensioner mechanism 116 configured in such a way as to, when there is an abrupt drawing out of the seatbelt 111, cause the drawing out to stop, and furthermore, in such a way as to be able to take up the drawn out seatbelt 111 when there is a collision or the like of the vehicle. The pretensioner mechanism 116 is a general purpose pretensioner mechanism, and instantaneously takes up the seatbelt 111 by causing a shaft around which the seatbelt 111 is wound to rotate by causing a built-in gas generator to operate.

The inflator 124 is configured of an inflator main body 125, which discharges an inflating gas, and a pipe portion 126 that guides the inflating gas discharged from the inflator main body 125 to the airbag 130. The inflator main body 125 is attached to the seat frame 104, which supports the seat portion 105 of the seat 101. The pipe portion 126 extends from the inflator main body 125, and is of a form bent into an approximate L-shape in such a way as to follow a side face from a bottom face of the seat portion 105.

The bag assembly 129 includes the airbag 130, which has a bag main body portion 130a and a conduit portion 130b, a bag linking portion 152, and a bag cover 159. In a state before the airbag 130 operates, the bag main body portion 130a is housed in an interior of the bag cover 159 in a folded state. The conduit portion 130b of the airbag 130 is connected to the pipe portion 126 of the inflator 124, takes in inflating gas discharged from the inflator 124, and guides the inflating gas to the bag main body portion 130a. A base end portion 130bx2 of the conduit portion 130b of the airbag 130 and the pipe portion 126 of the inflator 124 are linked by being fastened with a clamp 127.

Next, an operation of protecting the occupant M with the occupant protection device 10 will be described. Firstly, on the vehicle colliding, the pretensioner mechanism 116 of the take-up mechanism 115 operates, and the seatbelt 111 fastened to the occupant M is taken up in order to stabilize a seated posture of the occupant M on the seat 101. Because of this, the lap belt portion 113 of the seatbelt 111 is drawn to the tongue 120 side, and the shoulder belt portion 112 continuing from the lap belt portion 113 is drawn to the shoulder tip side of the occupant M. Subsequently, the inflator 124 operates, and on inflating gas being supplied from the inflator main body 125 via the pipe portion 126 and the conduit portion 130b of the airbag 130 to the bag main body portion 130a of the airbag 130, the bag main body portion 130a inflates. Because of this, the upper body MU of the occupant M, who is moving forward, is received by the bag main body portion 130a, whereby the occupant M is protected.

Figure 15:
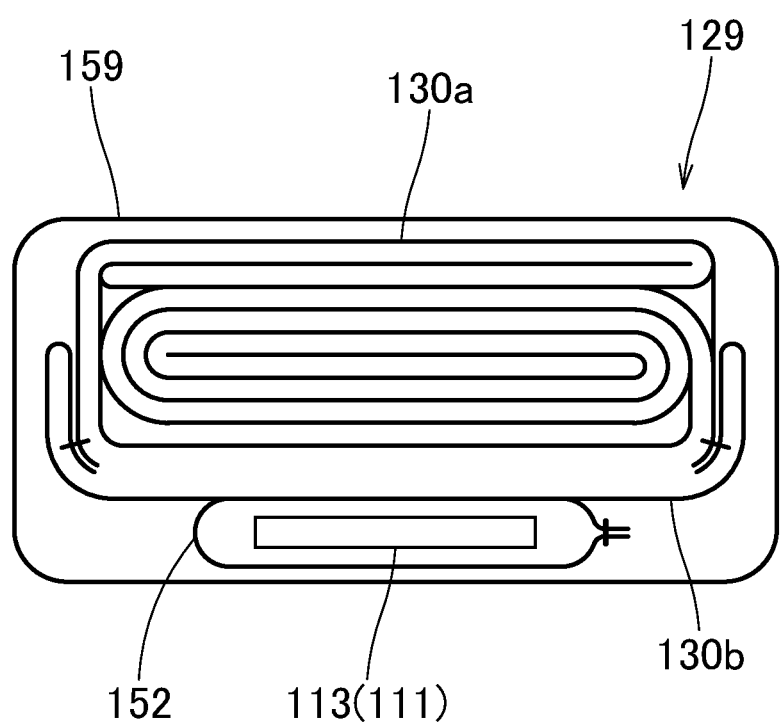
FIG. 15 is a sectional view of a bag assembly cut along an A2-A2 portion shown in FIG. 13.
Figure 16:
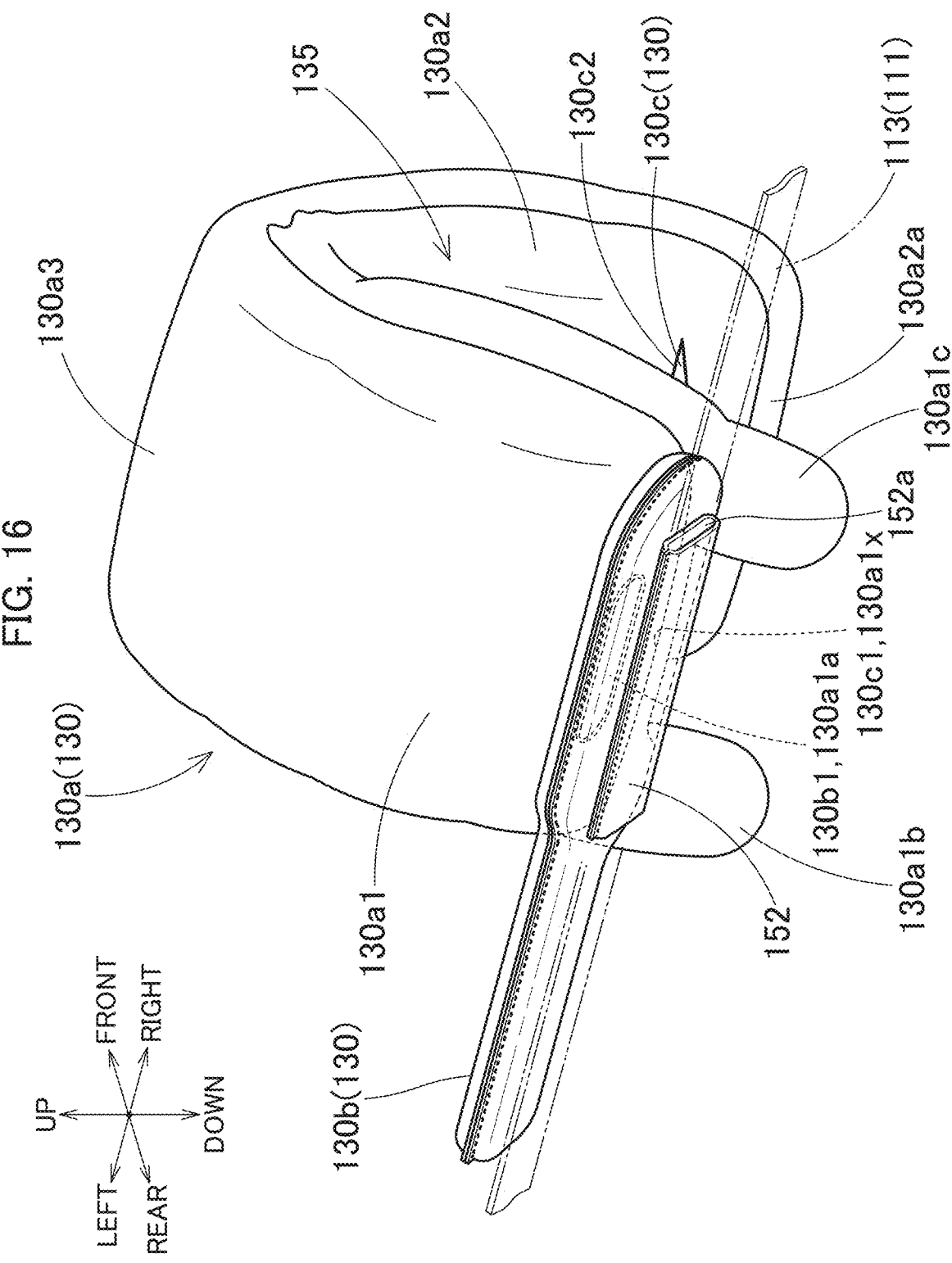
FIG. 16 is a perspective view wherein the bag assembly in a state wherein the airbag is inflated is seen from below.

Next, a configuration of the bag assembly 129 will be described. FIG. 15 is a sectional view of the bag assembly 129 cut along an A2-A2 portion shown in FIG. 13. FIG. 16 is a perspective view wherein the bag assembly 129 in a state wherein the airbag 130 is inflated is seen from below, with the bag cover 159 being omitted. As shown in FIGS. 15 and 16, the bag assembly 129 includes the airbag 130, the bag linking portion 152, and the bag cover 159.

The airbag 130 is formed of a bag base fabric that is a woven fabric formed by plain weaving, or the like, a polyester fiber, and is configured of the bag main body portion 130a, which acts as a main body portion that receives the occupant M by inflating owing to inflating gas, the conduit portion 130b, which is connected to the pipe portion 126 of the inflator 124, and causes inflating gas to flow into the bag main body portion 130a by guiding the inflating gas discharged from the inflator 124 to an inflow port 130a1a of the bag main body portion 130a, and a tether 130c linked to an outer peripheral face of the bag main body portion 130a. The bag main body portion 130a and the conduit portion 130b are linked by being sewn together.

The bag main body portion 130a when inflation is completed has a rear wall portion 130a1, which is disposed immediately in front of the occupant M and receives the upper body MU of the occupant M, who moves forward, by coming into contact with the upper body MU, a front wall portion 130a2 disposed in front of the rear wall portion 130a1 but separated from the rear wall portion 130a1, and an upper wall portion 130a3 that connects an upper portion of the rear wall portion 130a1 and an upper portion of the front wall portion 130a2. The front wall portion 130a2 is disposed on a side of the rear wall portion 130a1 opposite to the occupant M side. Also, as the rear wall portion 130a1 and the front wall portion 130a2 are disposed separated in the front-rear direction, a gap 135 is formed between the rear wall portion 130a1 and the front wall portion 130a2 below the upper wall portion 130a3. Also, the inflow port 130a1a, which is an aperture portion for causing inflating gas in the conduit portion 130b to flow therein, is provided in a lower portion of the rear wall portion 130a1. A form of the bag main body portion 130a is made by the bag main body portion 130a of an approximately cuboid form being bent by a tensile force of the tether 130c.

Also, two protruding portions 130a1b and 130a1c that protrude downward are provided in the rear wall portion 130a1. The protruding portion 130a1b (a first protruding portion) protrudes downward from a left end portion of the rear wall portion 130a1, and is disposed lower than a linking region 130a1x of the tether 130c in the rear wall portion 130a1. The protruding portion 130a1c (a second protruding portion) protrudes downward from a right end portion of the rear wall portion 130a1, and is disposed lower than the linking region 130a1x of the tether 130c in the rear wall portion 130a1. Also, the protruding portions 130a1b and 130a1c are disposed in approximately symmetrical positions with a left-right direction center of the rear wall portion 130a1 as a reference, and are of a form having approximate bilateral symmetry. Herein, being disposed in approximately symmetrical positions includes a configuration wherein the two deviate within an allowable range in addition to a configuration wherein the two are positioned in absolutely identical positions. Also, a form having approximate bilateral symmetry includes a form that deviates within an allowable range in addition to a form having bilateral symmetry. The protruding portions 130a1b and 130a1c not necessarily needing to be disposed on the left and right ends of the rear wall portion 130a1, it is sufficient that the protruding portion 130a1b is disposed to a left side with respect to a left-right direction central portion of the rear wall portion 130a1, and the protruding portion 130a1c is disposed in a position to a right side with respect to the left-right direction central portion of the rear wall portion 130a1 separated from the protruding portion 130a1b. Also, a whole of the protruding portions 130a1b and 130a1c may be positioned below the linking region 130a1x of the tether 130c in the rear wall portion 130a1, or one portion may be positioned below the linking region 130a1x.

The tether 130c is such that one end portion 130c1 is linked by sewing to an outer peripheral portion of the rear wall portion 130a1, and another end portion 130c2 is linked by sewing to an outer peripheral portion of the front wall portion 130a2, in the gap 135 below the upper wall portion 130a3. That is, the upper wall portion 130a3 connects the front wall portion 130a2 and the rear wall portion 130a1 above the tether 130c. Also, the other end portion 130c2 of the tether 130c is linked in a position farther to the upper wall portion 130a3 side than a leading end portion 130a2a of the front wall portion 130a2. The tether 130c may be of a configuration formed integrated with the rear wall portion 130a1 or the front wall portion 130a2. That is, the tether 130c being linked includes a configuration wherein the tether 130c is formed integrated with the rear wall portion 130a1 or the front wall portion 130a2, in addition to a configuration wherein the tether 130c is linked to the rear wall portion 130a1 or the front wall portion 130a2 using a method such as sewing. Also, the bag main body portion 130a is such that in order to secure thicknesses of the rear wall portion 130a1, the front wall portion 130a2, and the upper wall portion 130a3, a multiple of internal tethers 163 (refer to FIGS. 17 and 18) are provided in an interior of the bag main body portion 130a.

The conduit portion 130b is a tubular member that is linked to each of the pipe portion 126 of the inflator 124 and the bag main body portion 130a, and extends in a longitudinal direction of the lap belt portion 113. The conduit portion 130b has a communication port 130b1 that communicates with the inflow port 130a1a of the bag main body portion 130a. Inflating gas in an interior of the conduit portion 130b flows via the communication port 130b1 and the inflow port 130a1a into the interior of the bag main body portion 130a.

The bag linking portion 152 is a tubular member formed of a material the same as the bag base fabric forming the airbag 130, and is a member that links the airbag 130 to the lap belt portion 113. A space in an interior of the bag linking portion 152 forms a belt insertion portion 152a through which the lap belt portion 113 is inserted. After the lap belt portion 113 is inserted through the belt insertion portion 152a, the bag linking portion 152 and the lap belt portion 113 are linked by the two being sewn together. Also, an upper face of the bag linking portion 152 is linked by sewing to a lower face of the conduit portion 130b of the airbag 130.

The bag cover 159 is a tubular member formed of a kind of fabric used as a material of the seat 101. The bag cover 159 houses the bag main body portion 130a of the airbag 130 in a state folded in an interior of the tube, one portion of the conduit portion 130*b*, the bag linking portion 152, and a portion of the lap belt portion 113 installed in the bag assembly 129. The bag cover 159 is subjected to pressure from the bag main body portion 130*a* when the bag main body portion 130*a* of the airbag 130 expands, and one portion thereof ruptures, causing the bag main body portion 130*a* to protrude from the bag cover 159.

Figure 17:
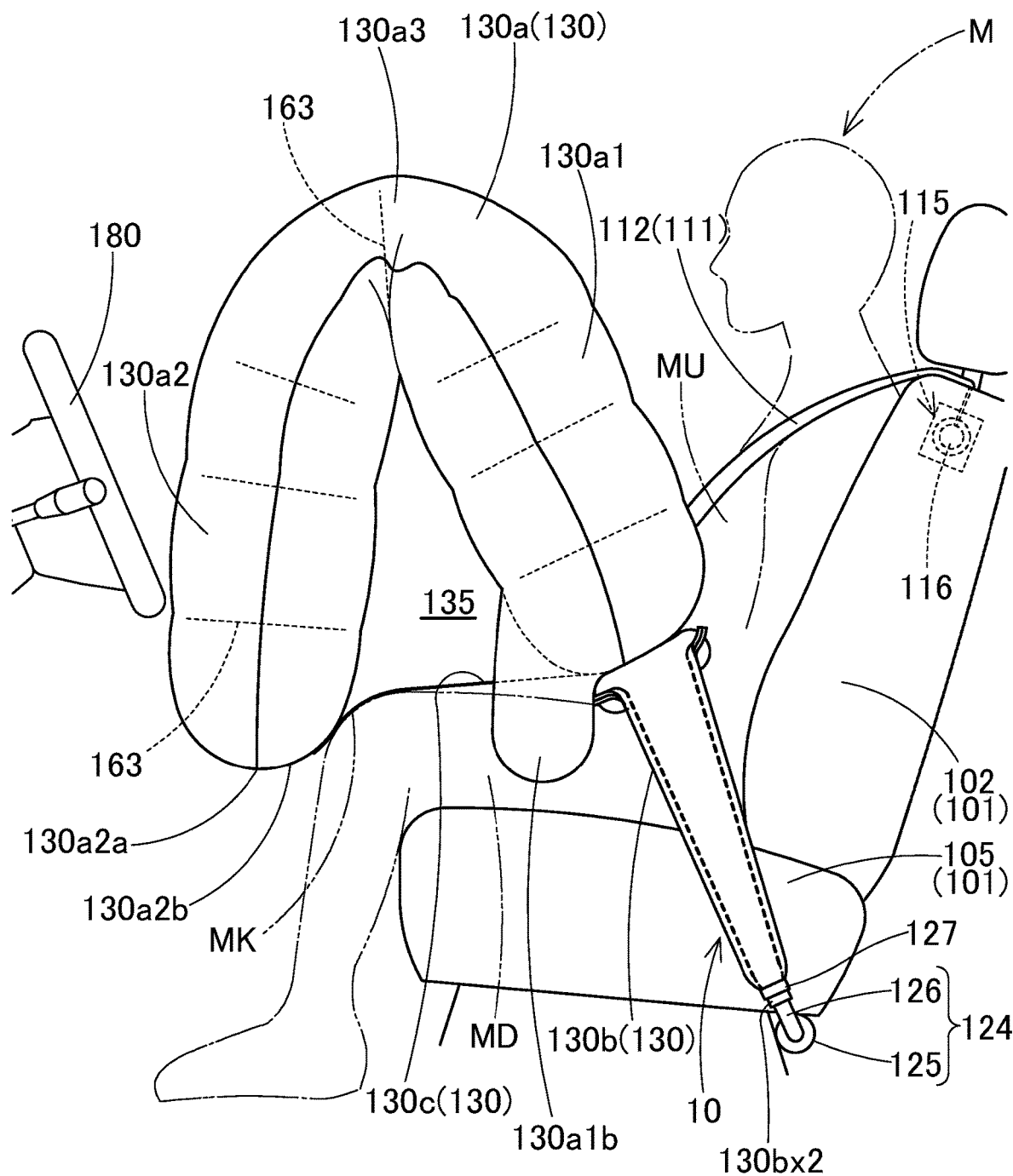
FIG. 17 is a drawing wherein a periphery of the seat when the airbag is inflated is seen from the left side.
Figure 18:
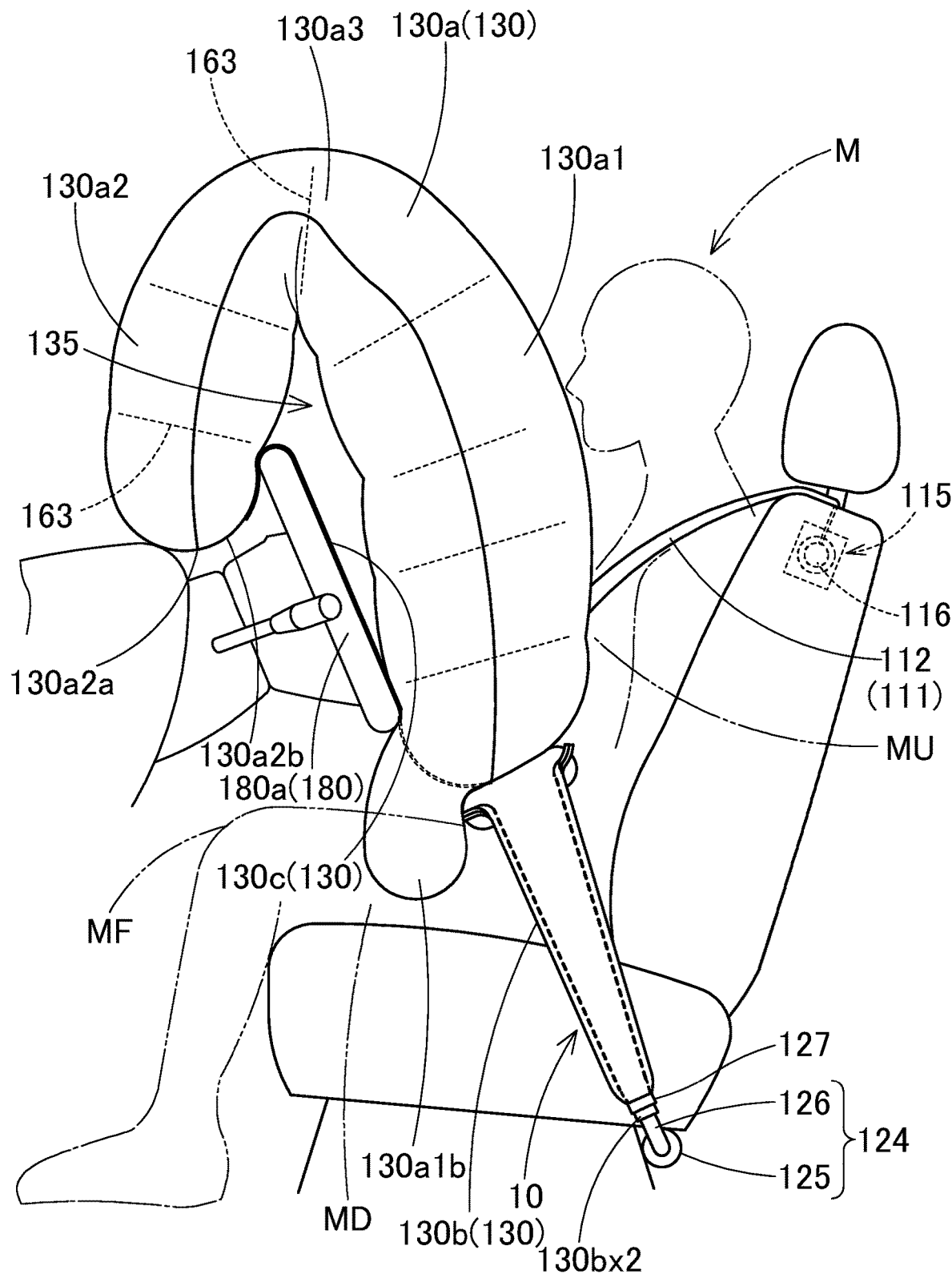
FIG. 18 is a drawing wherein a periphery of the seat when the airbag is inflated is seen from the left side.
Figure 19:
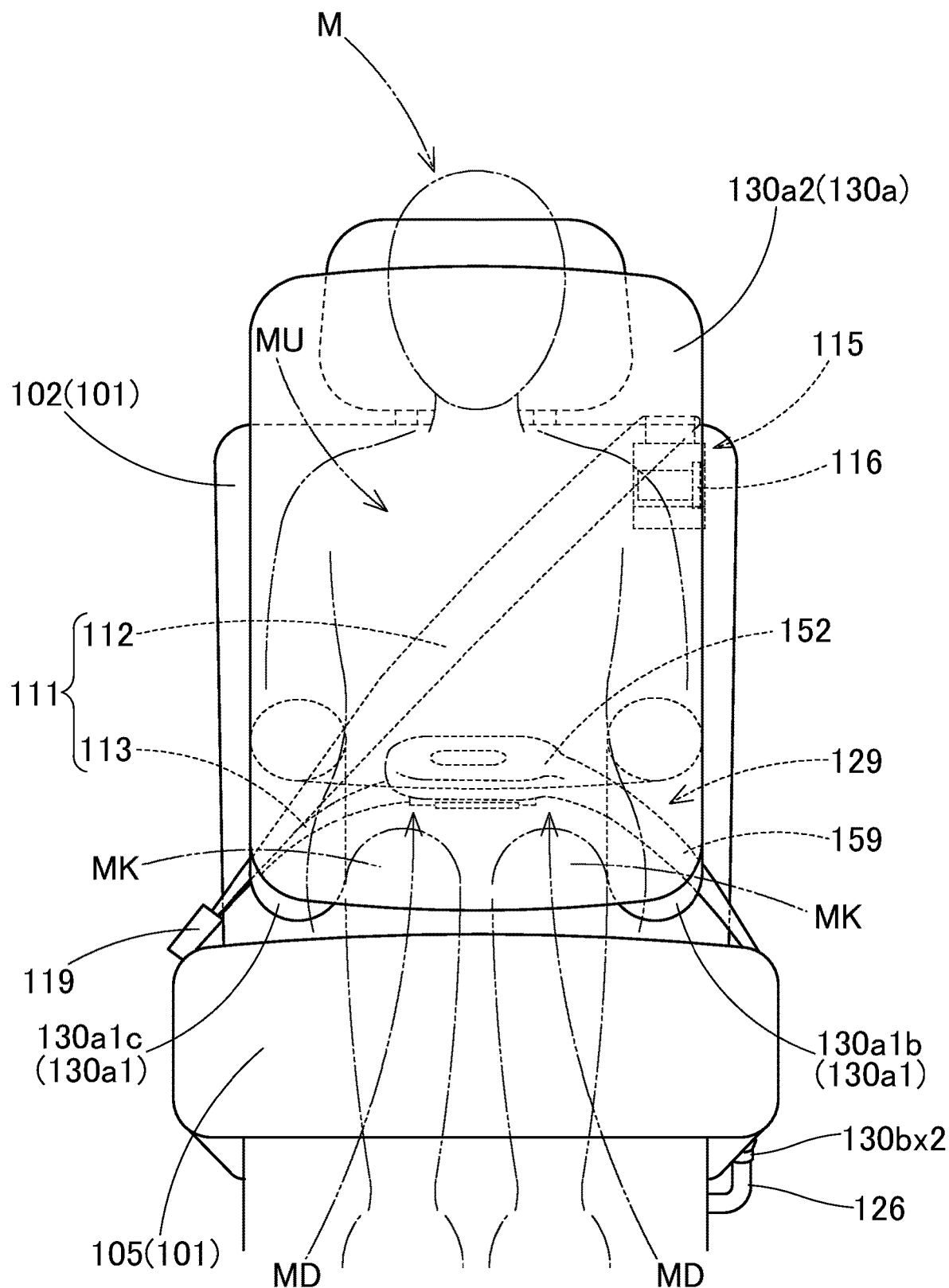
FIG. 19 is a drawing wherein a periphery of the seat when the airbag is inflated is seen from the front.

Next, a positional relationship between the bag main body portion 130*a* and members in a periphery thereof or the occupant M when the airbag 130 is inflated will be described. FIG. 17 is a drawing wherein a periphery of the seat 101 when the airbag 130 is inflated in a state wherein the seat 101 is positioned toward the rear side, and a distance between the seat 101 and a steering wheel 180 is long, is seen from the left side. FIG. 18 is a drawing wherein a periphery of the seat 101 when the airbag 130 is inflated in a state wherein the seat 101 is positioned toward the front side, and a distance between the seat 101 and the steering wheel 180 is short, is seen from the left side. FIG. 19 is a drawing wherein a periphery of the seat 101 when the airbag 130 is inflated is seen from the front.

When the distance between the seat 101 and the steering wheel 180 is long, as shown in FIG. 17, the bag main body portion 130*a* of the airbag 130 firstly expands upward and forward, after which a leading end portion 130*a*2*a* side of the front wall portion 130*a*2 droops downward due to gravity. Because of this, the tether 130*c* catches on the knee portion MK (a supporting body) of the occupant M from above and is engaged therewith, and the bag main body portion 130*a* is supported by the knee portion MK of the occupant M via the tether 130*c*. By the tether 130*c* catching on and being engaged with the knee portion MK, and the bag main body portion 130*a* being supported via the tether 130*c* in this way, the bag main body portion 130*a* is stably supported by the knee portion MK of the occupant M, the bag main body portion 130*a* is more easily disposed in an intended position, and the bag main body portion 130*a* more easily obtains a reactive force from the knee portion MK or a thigh portion MD connected to the knee portion MK. That is, when the upper wall portion 130*a*3, which is a portion connecting the rear wall portion 130*a*1 and the front wall portion 130*a*2, is lower than the tether 130*c*, the upper wall portion 130*a*3 is more easily repelled from the knee portion MK due to a repulsive force of the upper wall portion 130*a*3 when the upper wall portion 130*a*3, into which inflating gas has flowed, comes into contact with the knee portion MK, and there is a possibility that the bag main body portion 130*a* is not stably supported by the knee portion MK. Meanwhile, when the upper wall portion 130*a*3 is disposed above the tether 130*c*, as in the present embodiment, the tether 130*c*, into which no inflating gas has flowed, catches on and is engaged in such a way as to follow the upper face of the knee portion MK, because of which a large area of contact between the tether 130*c* and the knee portion MK is secured, whereby friction is increased, and the bag main body portion 130*a* can be stably supported by the knee portion MK via the tether 130*c*. Because of this, the bag main body portion 130*a* is more easily disposed in an intended position, and the bag main body portion 130*a* more easily obtains a reactive force from the knee portion MK or the thigh portion MD connected to the knee portion MK. Also, as the other end portion 130*c*2 of the tether 130*c* is linked in a position farther to the upper wall portion 130*a*3 side than the leading end portion 130*a*2*a* of the front wall portion 130*a*2, a leading end region 130*a*2*b* of the front wall portion 130*a*2 from the linking portion to the leading end portion 130*a*2*a* can be disposed immediately in front of the knee portion MK of the occupant M. Because of this, the knee portion MK of the occupant M is more easily protected by the bag main body portion 130*a*, and the tether 130*c* can more easily catch on the knee portion MK.

When the distance between the seat 101 and the steering wheel 180 is short, as shown in FIG. 18, the bag main body portion 130*a* of the airbag 130 firstly expands upward and forward in such a way as to surmount the steering wheel 180, after which the leading end portion 130*a*2*a* side droops downward due to gravity. At this time, the steering wheel 180 is disposed in the gap 135 formed between the rear wall portion 130*a*1 and the front wall portion 130*a*2 of the bag main body portion 130*a*, because of which the bag main body portion 130*a* and the steering wheel 180 are unlikely to interfere with each other when the bag main body portion 130*a* expands and spreads out, and the spreading out of the bag main body portion 130*a* is unlikely to be impeded. In this way, the occupant protection device 10 of the present embodiment is such that even when the steering wheel 180, which is an obstruction, is in front of the seat 101, interference between the bag main body portion 130*a* and the steering wheel 180 is restricted, and difficulty in the bag main body portion 130*a* of the airbag 130 spreading out due to the steering wheel 180 can be restricted.

Also, the tether 130*c* catches on and is engaged with an upper face of a ring portion 180*a*, which the occupant M grips and rotates to steer, of the steering wheel 180 (supporting body) from above, whereby the bag main body portion 130*a* that has surmounted the steering wheel 180 is supported by the ring portion 180*a* of the steering wheel 180 via the tether 130*c*. By the tether 130*c* catching on and being engaged with the steering wheel 180, and the bag main body portion 130*a* being supported via the tether 130*c* in this way, the bag main body portion 130*a* is stably supported by the steering wheel 180, the bag main body portion 130*a* is more easily disposed in an intended position, and the bag main body portion 130*a* more easily obtains a reactive force from the steering wheel 180. That is, when the upper wall portion 130*a*3, which is a portion connecting the rear wall portion 130*a*1 and the front wall portion 130*a*2, is lower than the tether 130*c*, the upper wall portion 130*a*3 is more easily repelled from the steering wheel 180 due to a repulsive force of the upper wall portion 130*a*3 when the upper wall portion 130*a*3, into which inflating gas has flowed, comes into contact with the steering wheel 180, and there is a possibility that the bag main body portion 130*a* is not stably supported by the steering wheel 180.

Meanwhile, when the upper wall portion 130*a*3 is disposed above the tether 130*c*, as in the present embodiment, the tether 130*c*, into which no inflating gas has flowed, catches on and is engaged in such a way as to follow the upper face of the ring portion 180*a* of the steering wheel 180, because of which a large area of contact between the tether 130*c* and the steering wheel 180 is secured, whereby friction is increased, and the bag main body portion 130*a* can be stably supported by the steering wheel 180 via the tether 130*c*. Because of this, the bag main body portion 130*a* is more easily disposed in an intended position, and the bag main body portion 130*a* more easily obtains a reactive force from the steering wheel 180. Also, as the other end portion 130*c*2 of the tether 130*c* is linked in a position farther to the upper wall portion 130*a*3 side than the leading end portion 130*a*2*a* of the front wall portion 130*a*2, the leading end region 130*a*2*b* of the front wall portion 130*a*2 can be disposed immediately in front of the steering wheel 180, and the tether 130*c* can more easily catch on the steering wheel 180.

Also, as the protruding portions 130a1b and 130a1c are provided in the rear wall portion 130a1 of the bag main body portion 130a, as shown in FIG. 19, the thigh portion MD of the occupant M is sandwiched from both left and right sides by the protruding portions 130a1b and 130a1c when inflation of the bag main body portion 130a is completed. Because of this, positioning in the left-right direction of the bag main body portion 130a with respect to the occupant M when inflation is completed is carried out, because of which the bag main body portion 130a more easily receives the occupant M in an intended position, and the occupant M can be stably protected.

Also, the protruding portions 130a1b and 130a1c of the rear wall portion 130a1 are of a configuration sandwiching the thigh portion MD of the occupant M by protruding downward, meaning that a body of the occupant M receiving damage when positioning due to pressure received by the occupant M from the protruding portions 130a1b and 130a1c can be restricted. That is, assuming a case wherein a protruding portion protrudes rearward from a position higher than a vertical direction central portion of the rear wall portion 130a1, a position in the left-right direction of the bag main body portion 130a with respect to the occupant M is conceivably decided by the protruding portion and a head portion or a neck portion of the occupant M coming into contact, but the head portion or the neck portion, which is a vital point of the occupant M, is liable to be subjected to a load when positioning, and there is concern that the body of the occupant M will receive damage. In response to this, the configuration of the present embodiment is such that the protruding portions 130a1b and 130a1c are of a configuration sandwiching the thigh portion MD of the occupant M by protruding downward, because of which the body of the occupant M receiving damage can be restricted.

Also, as the bag main body portion 130a has the gap 135, a capacity of a portion of the bag main body portion 130a into which inflating gas flows can be reduced in comparison with a form such that the bag main body portion 130a spreads out without a gap on the front side of the occupant M. Because of this, a time from the bag main body portion 130a starting to expand until completion can be shortened, and the occupant M can be more safely protected by the bag main body portion 130a.

Third Embodiment

Next, the occupant protection device 10 according to a third embodiment of the invention will be described. With regard to portions whose description duplicates that of the second embodiment, a description will be simplified or omitted using the same drawings or using the same reference signs.

Figure 20:
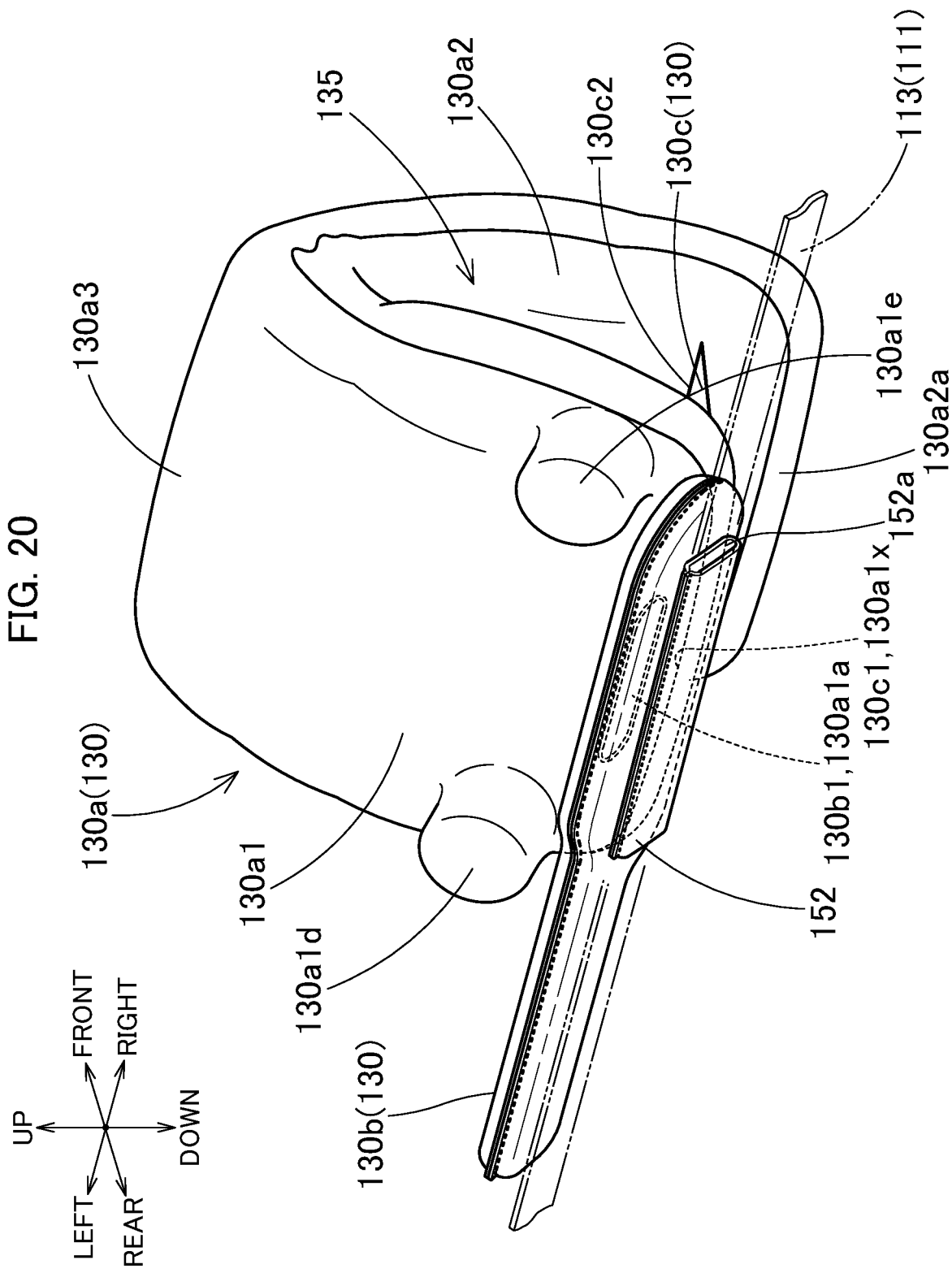
FIG. 20 is a perspective view wherein the bag assembly in a state wherein the airbag is inflated is seen from below.
Figure 21:
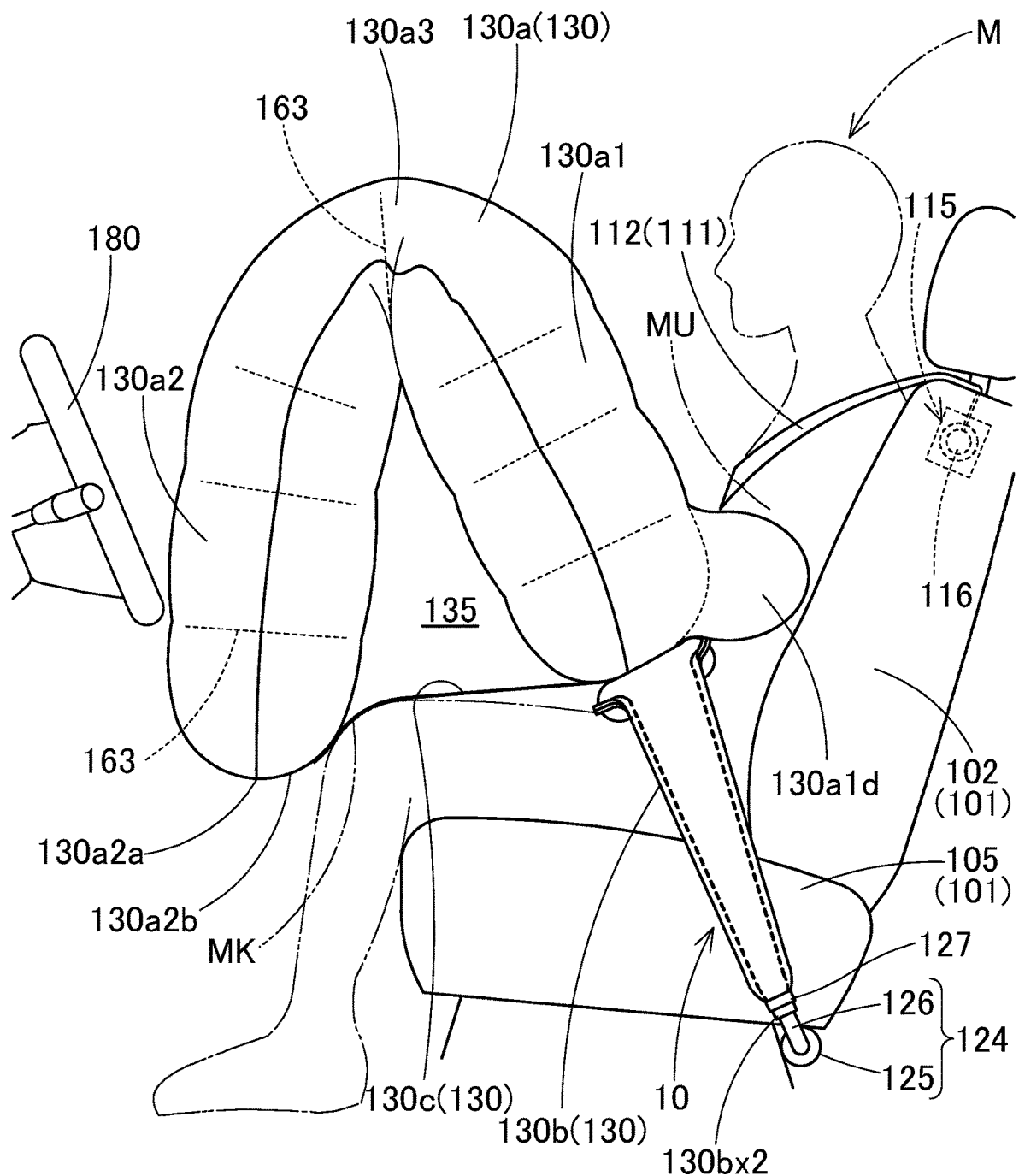
FIG. 21 is a drawing wherein a periphery of the seat when the airbag is inflated is seen from the left side.
Figure 22:
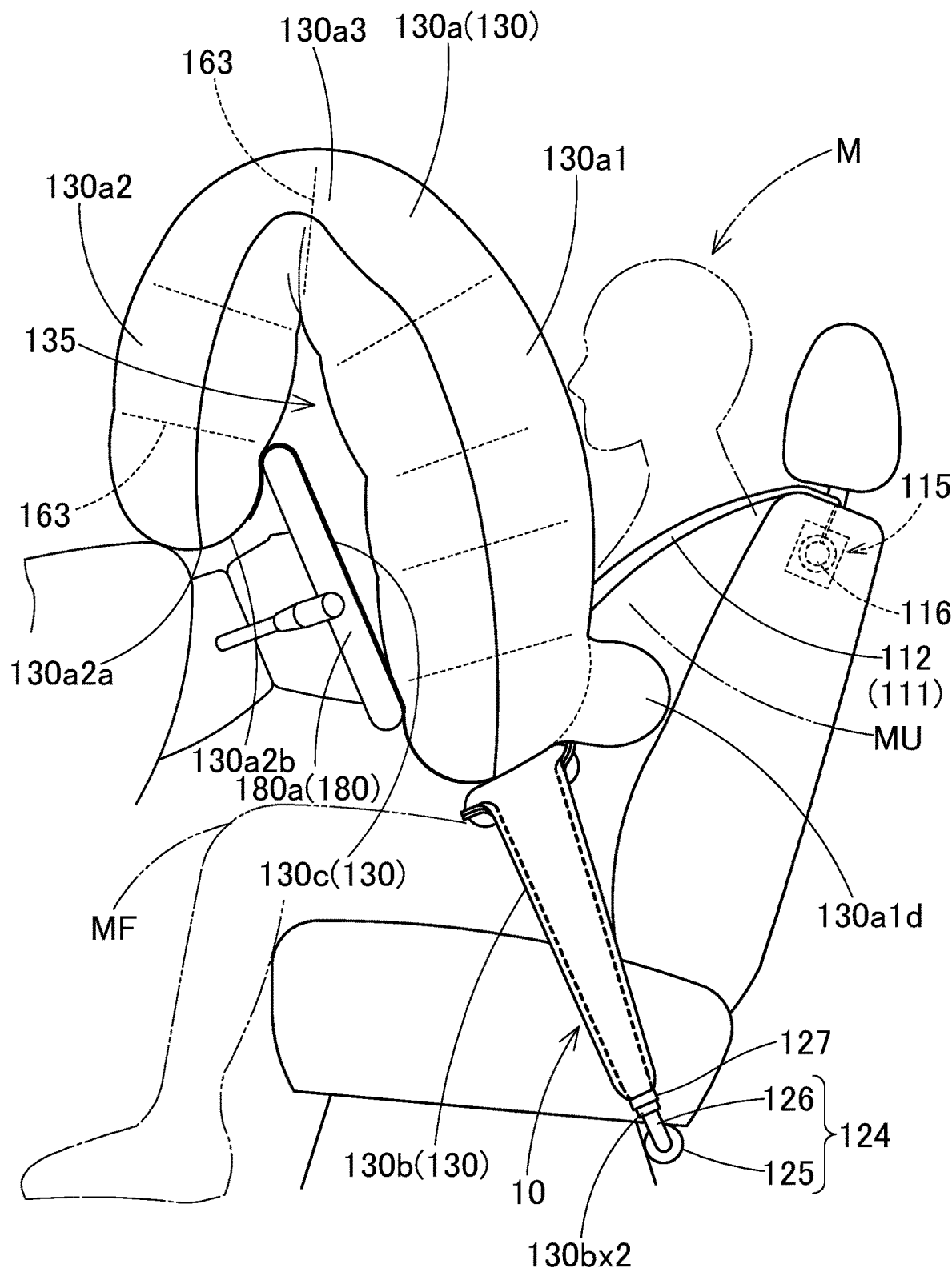
FIG. 22 is a drawing wherein a periphery of the seat when the airbag is inflated is seen from the left side.

FIG. 20 is a perspective view wherein the bag assembly 129 in a state wherein the airbag 130 of the occupant protection device 10 according to the present embodiment is inflated is seen from below, with the bag cover 159 being omitted. FIG. 21 is a drawing wherein a periphery of the seat 101 when the airbag 130 is inflated in a state wherein the seat 101 is positioned toward the rear side, and the distance between the seat 101 and the steering wheel 180 is long, is seen from the left side. FIG. 22 is a drawing wherein a periphery of the seat 101 when the airbag 130 is inflated in a state wherein the seat 101 is positioned toward the front side, and the distance between the seat 101 and the steering wheel 180 is short, is seen from the left side.

As shown in FIG. 20, the occupant protection device 10 of the present embodiment differs from the configuration of the second embodiment only in a form of the bag main body portion 130a of the airbag 130. Specifically, the occupant protection device 10 of the present embodiment does not have the protruding portions 130a1b and 130a1c provided in the rear wall portion 130a1 of the bag main body portion 130a of the occupant protection device 10 of the second embodiment, but protruding portions 130a1d and 130a1e are provided in the rear wall portion 130a1 instead.

The protruding portion 130a1d (a first protruding portion) protrudes rearward from a left end portion of the rear wall portion 130a1, and the protruding portion 130a1e (a second protruding portion) protrudes rearward from a right end portion of the rear wall portion 130a1. Also, the protruding portions 130a1d and 130a1e are disposed lower than the vertical direction central portion of the rear wall portion 130a1. Also, the protruding portions 130a1d and 130a1e are disposed in approximately symmetrical positions with the left-right direction center of the rear wall portion 130a1 as a reference, and are of a form having approximate bilateral symmetry. Herein, being disposed in approximately symmetrical positions includes a configuration wherein the two deviate within an allowable range in addition to a configuration wherein the two are positioned in absolutely identical positions. Also, a form having approximate bilateral symmetry includes a form that deviates within an allowable range in addition to a form having bilateral symmetry. The protruding portions 130a1d and 130a1e not necessarily needing to be disposed on the left and right ends of the rear wall portion 130a1, it is sufficient that the protruding portion 130a1d is disposed to the left side with respect to the left-right direction central portion of the rear wall portion 130a1, and the protruding portion 130a1e is disposed in a position to the right side with respect to the left-right direction central portion of the rear wall portion 130a1 separated from the protruding portion 130a1d. Also, as other configurations of the occupant protection device 10 according to the present embodiment are the same as the configurations of the occupant protection device 10 of the second embodiment, a description thereof will be omitted.

The occupant protection device 10 of the present embodiment is such that, according to the same mechanism as that of the second embodiment, when the distance between the seat 101 and the steering wheel 180 is long, the tether 130c catches on and is engaged in such a way as to follow the upper face of the knee portion MK of the occupant M on the airbag 130 inflating, and the bag main body portion 130a is supported via the tether 130c (FIG. 21). Because of this, the bag main body portion 130a is stably supported by the knee portion MK of the occupant M, the bag main body portion 130a is more easily disposed in an intended position, and the bag main body portion 130a more easily obtains a reactive force from the knee portion MK or the thigh portion MD connected to the knee portion MK. Also, as the leading end region 130a2b of the front wall portion 130a2 is disposed immediately in front of the knee portion MK of the occupant M, the knee portion MK of the occupant M is more easily protected by the bag main body portion 130a, and the tether 130c can more easily catch on the knee portion MK.

Also, as shown in FIG. 22, according to the same mechanism as that of the second embodiment, on the airbag 130 inflating when the distance between the seat 101 and the steering wheel 180 is short, the steering wheel 180 is disposed in the gap 135 formed between the rear wall portion 130a1 and the front wall portion 130a2 of the bag main body portion 130a. This means that even when the steering wheel 180, which is an obstruction, is in front of the seat 101, interference between the bag main body portion 130a and the steering wheel 180 is restricted, and difficulty in the bag main body portion 130a of the airbag 130 spreading out due to the steering wheel 180 can be restricted. Also, as the tether 130c catches on and is engaged with the upper face of the ring portion 180a of the steering wheel 180 from above, the bag main body portion 130a is supported by the ring portion 180a of the steering wheel 180 via the tether 130c. Because of this, the bag main body portion 130a is stably supported by the steering wheel 180, the bag main body portion 130a is more easily disposed in an intended position, and the bag main body portion 130a more easily obtains a reactive force from the steering wheel 180. Also, as the leading end region 130a2b of the front wall portion 130a2 is disposed immediately in front of the steering wheel 180, the tether 130c can more easily catch on the steering wheel 180.

Also, as the protruding portions 130a1d and 130a1e are provided in the rear wall portion 130a1 of the bag main body portion 130a, the upper body MU of the occupant M is sandwiched from both left and right sides by the protruding portions 130a1d and 130a1e when inflation of the bag main body portion 130a is completed. Because of this, positioning in the left-right direction of the bag main body portion 130a with respect to the occupant M when inflation is completed is carried out, because of which the bag main body portion 130a more easily receives the occupant M in an intended position, and the occupant M can be stably protected.

Also, the protruding portions 130a1d and 130a1e of the rear wall portion 130a1 are disposed lower than the vertical direction central portion of the rear wall portion 130a1, and are of a configuration sandwiching a vicinity of a lower abdominal portion of the occupant M, meaning that a body of the occupant M receiving damage when positioning due to pressure received by the occupant M from the protruding portions 130a1d and 130a1e can be restricted. That is, assuming a case wherein a protruding portion protrudes rearward from a position higher than the vertical direction central portion of the rear wall portion 130a1, a position in the left-right direction of the bag main body portion 130a with respect to the occupant M is conceivably decided by the protruding portion and the head portion or the neck portion of the occupant M coming into contact, but the head portion or the neck portion, which is a vital point of the occupant M, is liable to be subjected to a load when positioning, and there is concern that the body of the occupant M will receive damage. In response to this, the configuration of the present embodiment is such that the protruding portions 130a1d and 130a1e are disposed lower than the vertical direction central portion of the rear wall portion 130a1, and are of a configuration sandwiching a vicinity of the lower abdominal portion of the occupant M, because of which the body of the occupant M receiving damage can be restricted.

Also, as the bag main body portion 130a has the gap 135, a capacity of a portion of the bag main body portion 130a into which inflating gas flows can be reduced in comparison with a form such that the bag main body portion 130a spreads out without a gap on the front side of the occupant M. Because of this, a time from the bag main body portion 130a starting to expand until completion can be shortened, and the occupant M can be more safely protected by the bag main body portion 130a.

Fourth Embodiment

Next, the occupant protection device 10 according to a fourth embodiment of the invention will be described. With regard to portions whose description duplicates that of the second embodiment and the third embodiment, a description will be simplified or omitted using the same drawings or using the same reference signs.

Figure 23:
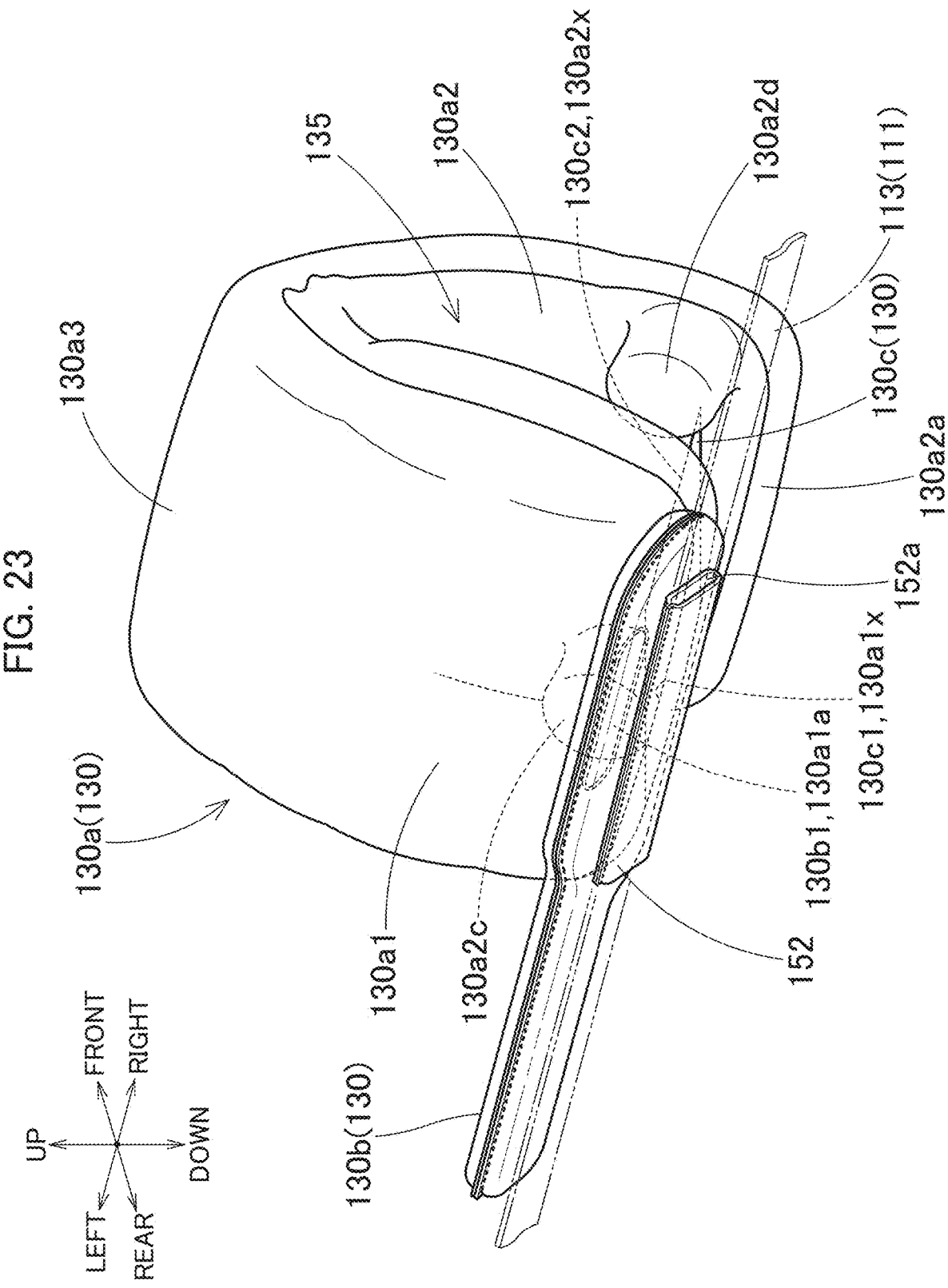
FIG. 23 is a perspective view wherein the bag assembly in a state wherein the airbag is inflated is seen from below.
Figure 24:
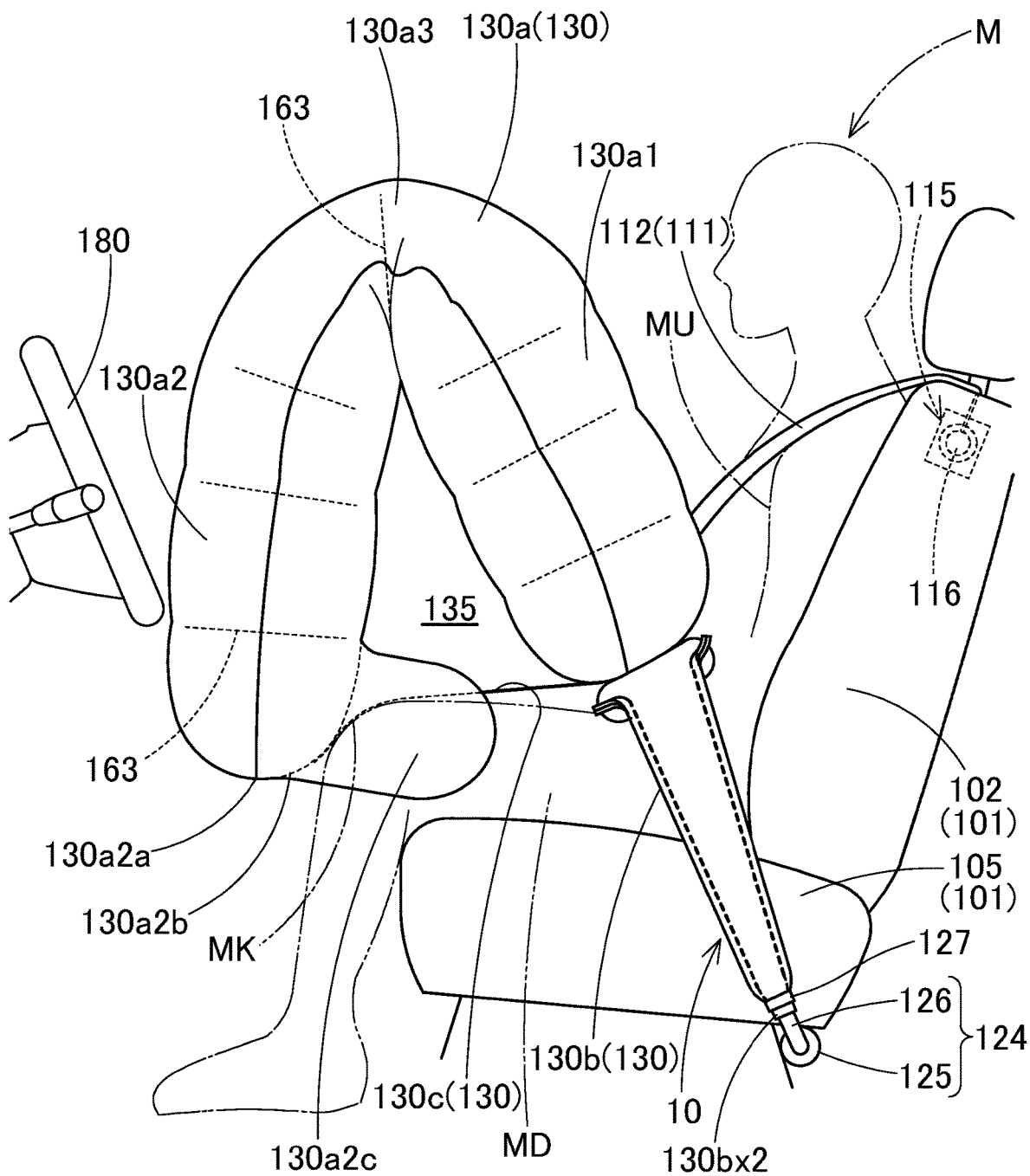
FIG. 24 is a drawing wherein a periphery of the seat when the airbag is inflated is seen from the left side.
Figure 25:
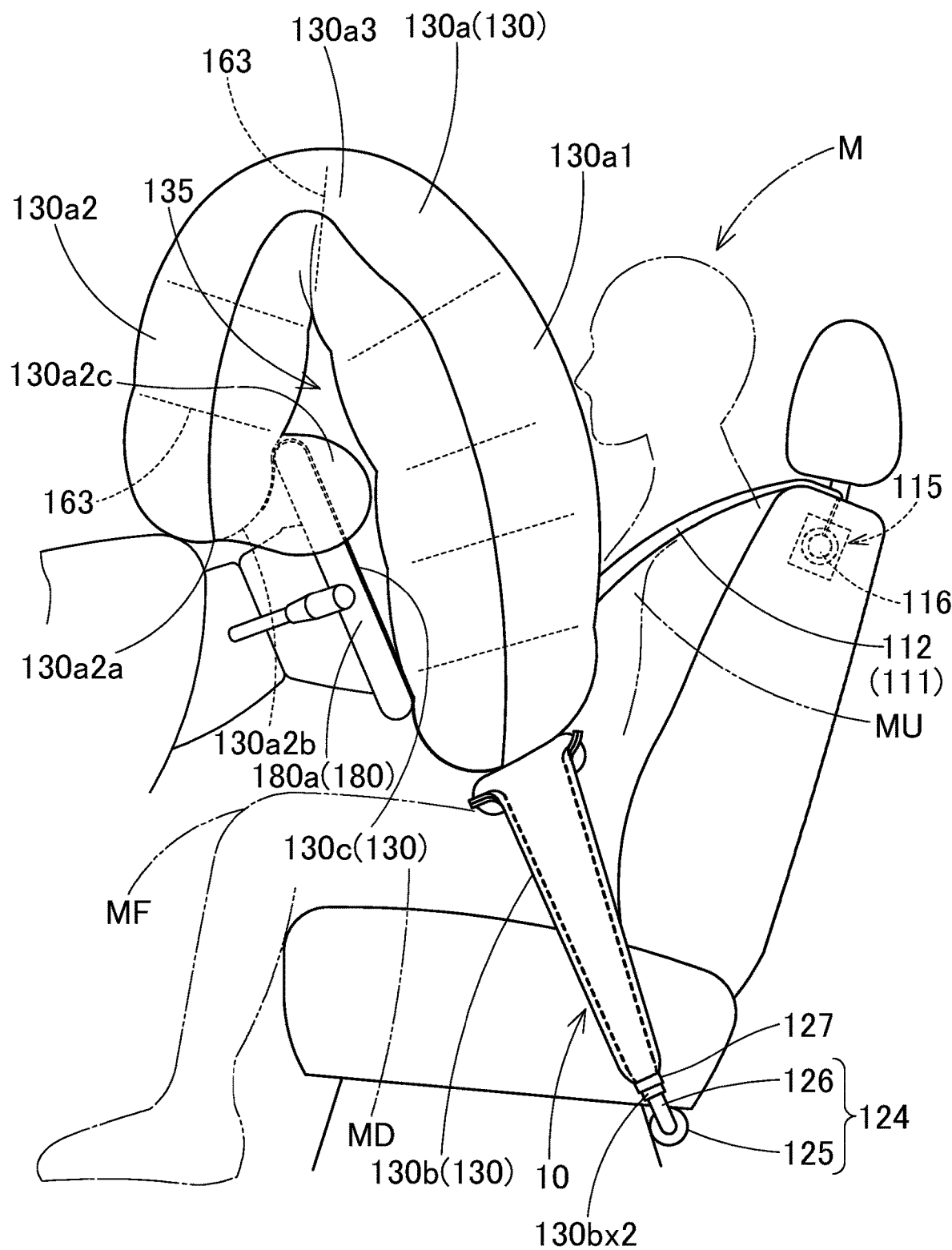
FIG. 25 is a drawing wherein a periphery of the seat when the airbag is inflated is seen from the left side.

FIG. 23 is a perspective view wherein the bag assembly 129 in a state wherein the airbag 130 of the occupant protection device 10 according to the present embodiment is inflated is seen from below, with the bag cover 159 being omitted. FIG. 24 is a drawing wherein a periphery of the seat 101 when the airbag 130 is inflated in a state wherein the seat 101 is positioned toward the rear side, and the distance between the seat 101 and the steering wheel 180 is long, is seen from the left side. FIG. 25 is a drawing wherein a periphery of the seat 101 when the airbag 130 is inflated in a state wherein the seat 101 is positioned toward the front side, and the distance between the seat 101 and the steering wheel 180 is short, is seen from the left side.

As shown in FIG. 23, the occupant protection device 10 of the present embodiment differs from the configuration of the second embodiment only in a form of the bag main body portion 130a of the airbag 130. Specifically, the occupant protection device 10 of the present embodiment does not have the protruding portions 130a1b and 130a1c provided in the rear wall portion 130a1 of the bag main body portion 130a of the occupant protection device 10 of the second embodiment, but protruding portions 130a2c and 130a2d are provided in the front wall portion 130a2 instead.

The protruding portion 130a2c (a first protruding portion) protrudes rearward from a left end portion of the front wall portion 130a2, and one portion thereof is disposed lower in the front wall portion 130a2 than a linking region 130a2x of the tether 130c. The protruding portion 130a2d (a second protruding portion) protrudes rearward from a right end portion of the front wall portion 130a2, and one portion thereof is disposed lower in the front wall portion 130a2 than the linking region 130a2x of the tether 130c. Also, the protruding portions 130a2c and 130a2d are disposed in approximately symmetrical positions with a left-right direction center of the front wall portion 130a2 as a reference, and are of a form having approximate bilateral symmetry. Herein, being disposed in approximately symmetrical positions includes a configuration wherein the two deviate within an allowable range in addition to a configuration wherein the two are positioned in absolutely identical positions. Also, a form having approximate bilateral symmetry includes a form that deviates within an allowable range in addition to a form having bilateral symmetry. The protruding portions 130a2c and 130a2d not necessarily needing to be disposed on the left and right ends of the front wall portion 130a2, it is sufficient that the protruding portion 130a2c is disposed to the left side with respect to the left-right direction central portion of the front wall portion 130a2, and the protruding portion 130a2d is disposed in a position to the right side with respect to the left-right direction central portion of the front wall portion 130a2 separated from the protruding portion 130a2c. Also, a whole of the protruding portions 130a2c and 130a2d may be positioned below the linking region 130a2x of the tether 130c in the front wall portion 130a2, or one portion may be positioned below the linking region 130a2x. Also, as other configurations of the occupant protection device 10 according to the present embodiment are the same as the configurations of the occupant protection device 10 of the second embodiment, a description thereof will be omitted.

The occupant protection device 10 of the present embodiment is such that, according to the same mechanism as that of the second embodiment, when the distance between the seat 101 and the steering wheel 180 is long, the tether 130c catches on and is engaged in such a way as to follow the upper face of the knee portion MK of the occupant M on the airbag 130 inflating, and the bag main body portion 130a is supported via the tether 130c (FIG. 24). Because of this, the bag main body portion 130a is stably supported by the knee portion MK of the occupant M, the bag main body portion 130a is more easily disposed in an intended position, and the bag main body portion 130a more easily obtains a reactive force from the knee portion MK or the thigh portion MD connected to the knee portion MK. Also, as the leading end region 130a2b of the front wall portion 130a2 is disposed immediately in front of the knee portion MK of the occupant M, the knee portion MK of the occupant M is more easily protected by the bag main body portion 130a, and the tether 130c can more easily catch on the knee portion MK.

Also, as the protruding portions 130a2c and 130a2d are provided in the front wall portion 130a2 of the bag main body portion 130a, the thigh portion MD of the occupant M is sandwiched from both left and right sides by the protruding portions 130a2c and 130a2d when inflation of the bag main body portion 130a is completed. Because of this, positioning in the left-right direction of the bag main body portion 130a with respect to the occupant M when inflation is completed is carried out, because of which the bag main body portion 130a more easily receives the occupant M in an intended position, and the occupant M can be stably protected.

Also, as shown in FIG. 25, according to the same mechanism as that of the second embodiment, on the airbag 130 inflating when the distance between the seat 101 and the steering wheel 180 is short, the steering wheel 180 is disposed in the gap 135 formed between the rear wall portion 130a1 and the front wall portion 130a2 of the bag main body portion 130a. This means that even when the steering wheel 180, which is an obstruction, is in front of the seat 101, interference between the bag main body portion 130a and the steering wheel 180 is restricted, and difficulty in the bag main body portion 130a of the airbag 130 spreading out due to the steering wheel 180 can be restricted. Also, as the tether 130c catches on and is engaged with the upper face of the ring portion 180a of the steering wheel 180 from above, the bag main body portion 130a is supported by the ring portion 180a of the steering wheel 180 via the tether 130c. Because of this, the bag main body portion 130a is stably supported by the steering wheel 180, the bag main body portion 130a is more easily disposed in an intended position, and the bag main body portion 130a more easily obtains a reactive force from the steering wheel 180. Also, as the leading end region 130a2b of the front wall portion 130a2 is disposed immediately in front of the steering wheel 180, the tether 130c can more easily catch on the steering wheel 180.

Also, as the protruding portions 130a2c and 130a2d are provided in the front wall portion 130a2 of the bag main body portion 130a, the ring portion 180a of the steering wheel 180 is sandwiched from both left and right sides by the protruding portions 130a2c and 130a2d when inflation of the bag main body portion 130a is completed. Because of this, positioning in the left-right direction of the bag main body portion 130a with respect to the steering wheel 180 when inflation is completed is carried out. Further, as a center of the body of the occupant M is commonly positioned in a vicinity directly in front of the steering wheel 180, positioning of the bag main body portion 130a and the occupant M is indirectly carried out by positioning of the bag main body portion 130a and the steering wheel 180 being carried out. Because of this, the bag main body portion 130a more easily receives the occupant M in an intended position, and the occupant M can be stably protected.

Also, as the bag main body portion 130a has the gap 135, a capacity of a portion of the bag main body portion 130a into which inflating gas flows can be reduced in comparison with a form such that the bag main body portion 130a spreads out without a gap on the front side of the occupant M. Because of this, a time from the bag main body portion 130a starting to expand until completion can be shortened, and the occupant M can be more safely protected by the bag main body portion 130a.

The configurations of the second embodiment, the third embodiment, and the fourth embodiment can be combined as appropriate in accordance with a required capability of positioning between the bag main body portion 130a of the airbag 130 and the occupant M. That is, for example, a configuration wherein the rear wall portion 130a1 of the bag main body portion 130a has the protruding portions 130a1b, 130a1c, 130a1d, and 130a1e may be adopted by combining the configurations of the second embodiment and the third embodiment. Also, a configuration wherein the rear wall portion 130a1 of the bag main body portion 130a has the protruding portions 130a1b and 130a1c (a first protruding portion and a second protruding portion) and the front wall portion 130a2 has the protruding portions 130a2c and 130a2d (a third protruding portion and a fourth protruding portion) may be adopted by combining the configurations of the second embodiment and the fourth embodiment. Also, a configuration wherein the rear wall portion 130a1 of the bag main body portion 130a has the protruding portions 130a1b and 130a1c (a first protruding portion and a second protruding portion) and the front wall portion 130a2 has the protruding portions 130a2c and 130a2d (a third protruding portion and a fourth protruding portion) may be adopted by combining the configurations of the third embodiment and the fourth embodiment.

Figure 26:
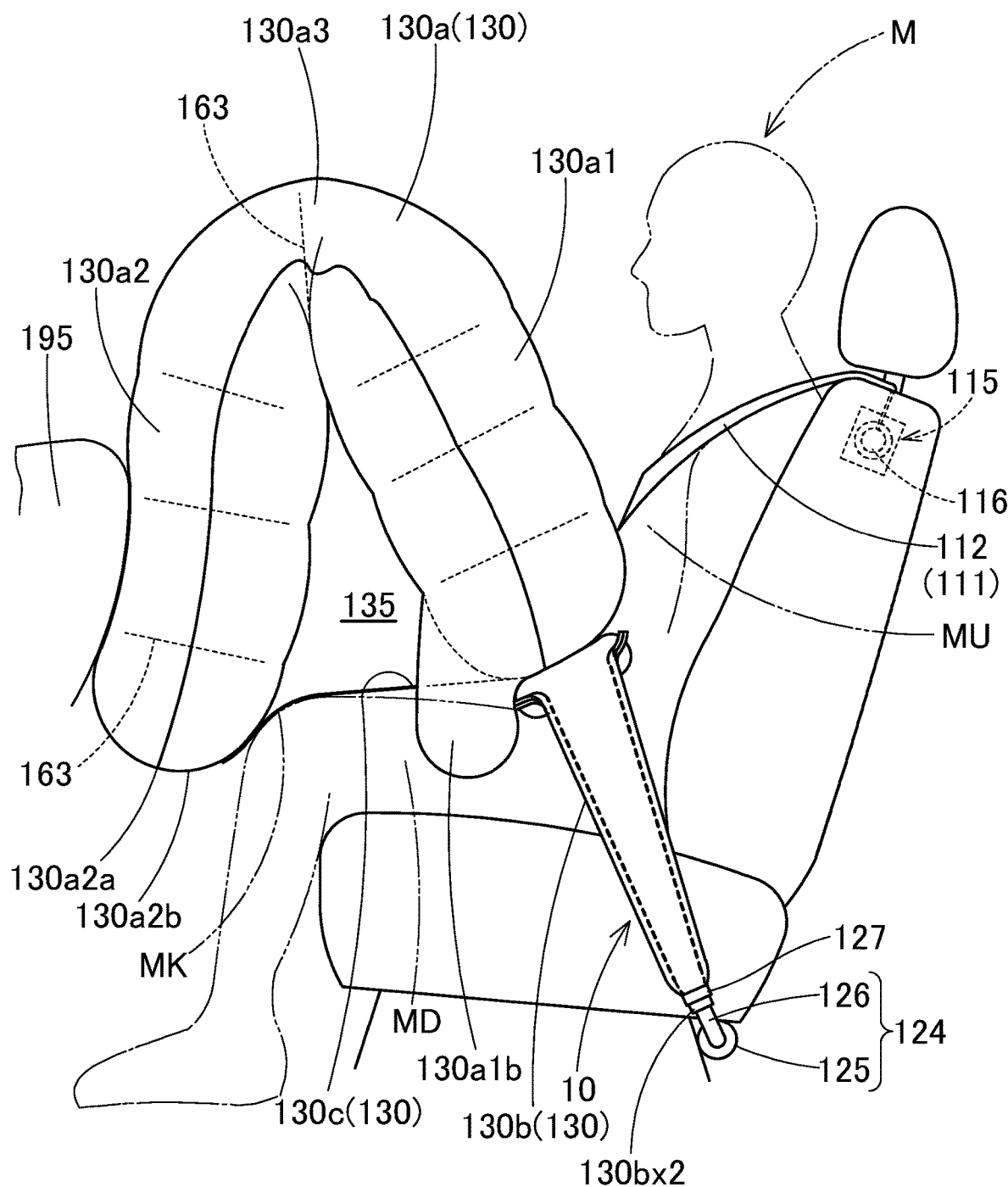
FIG. 26 is a drawing wherein a periphery of the seat when the airbag is inflated is seen from the left side in a configuration wherein the occupant protection device is mounted on a passenger seat.

In the second embodiment, the third embodiment, and the fourth embodiment, a configuration wherein the occupant protection device 10 is provided in a driver's seat of a vehicle has been described, but the invention not being limited to this, the occupant protection device 10 can also be provided in a rear seat or a passenger seat of a vehicle. For example, a case wherein the occupant protection device 10 of the second embodiment is provided in a passenger seat of a vehicle is such that on the airbag 130 inflating in a state wherein a distance between the seat 101 and an instrument panel 195 in front of the seat 101 is long, as shown in FIG. 26, the tether 130c catches on and is engaged with the knee portion MK of the occupant M seated in the passenger seat from above, and the bag main body portion 130a is supported by the knee portion MK of the occupant M via the tether 130c.

Also, in the second embodiment, the third embodiment, and the fourth embodiment, the occupant protection device 10 is described with the so-called three-point seatbelt 111, wherein the seatbelt 111 includes the shoulder belt portion 112 and the lap belt portion 113, as an example, but the invention is not limited to this. That is, even when the invention is applied to the so-called two-point seatbelt 111, wherein the seatbelt 111 includes the lap belt portion 113 without including the shoulder belt portion 112, advantages the same as those heretofore described can be obtained.

Fifth Embodiment

Figure 27:
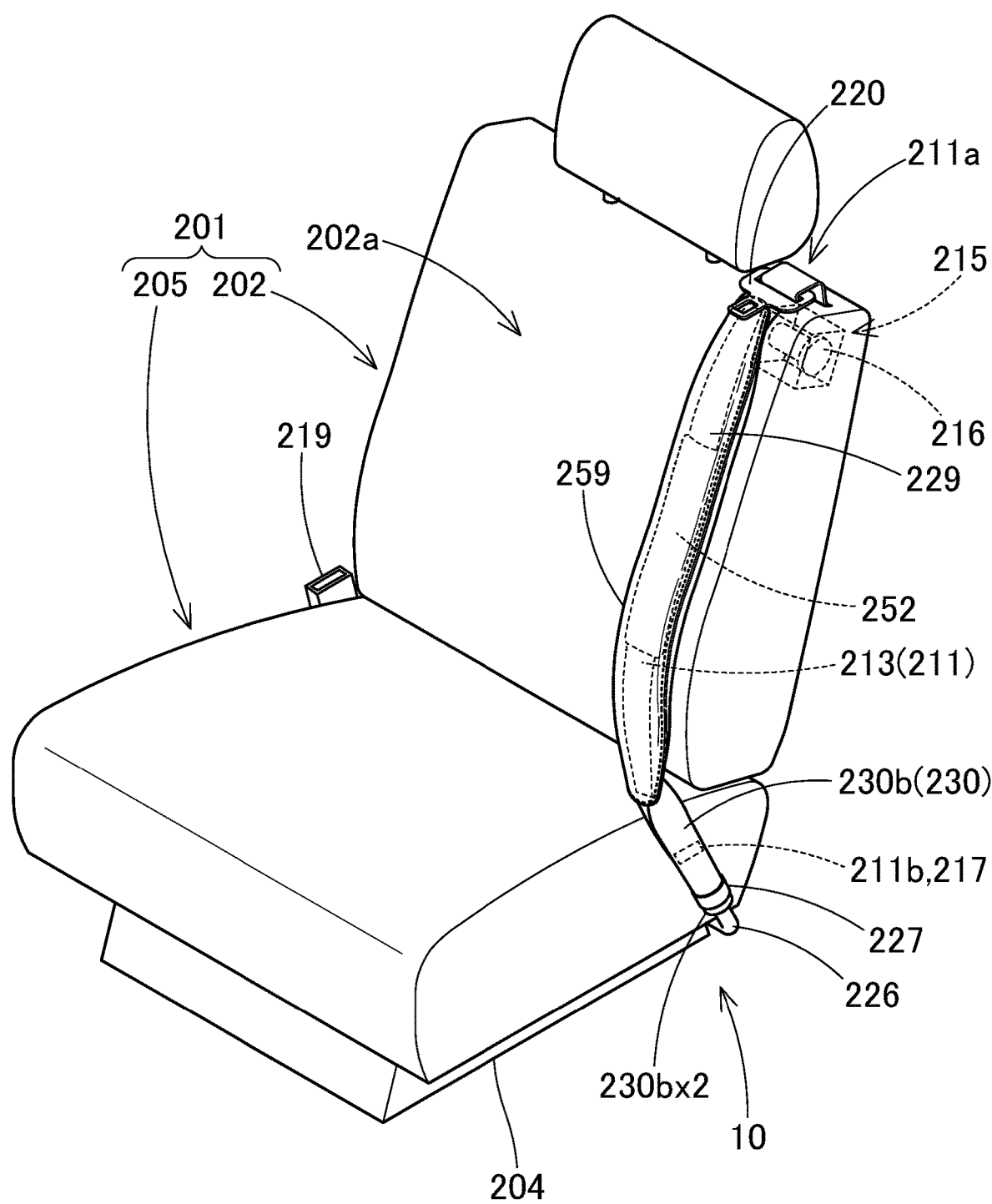
FIG. 27 is a perspective view of a seat on which the occupant protection device is mounted.
Figure 28:
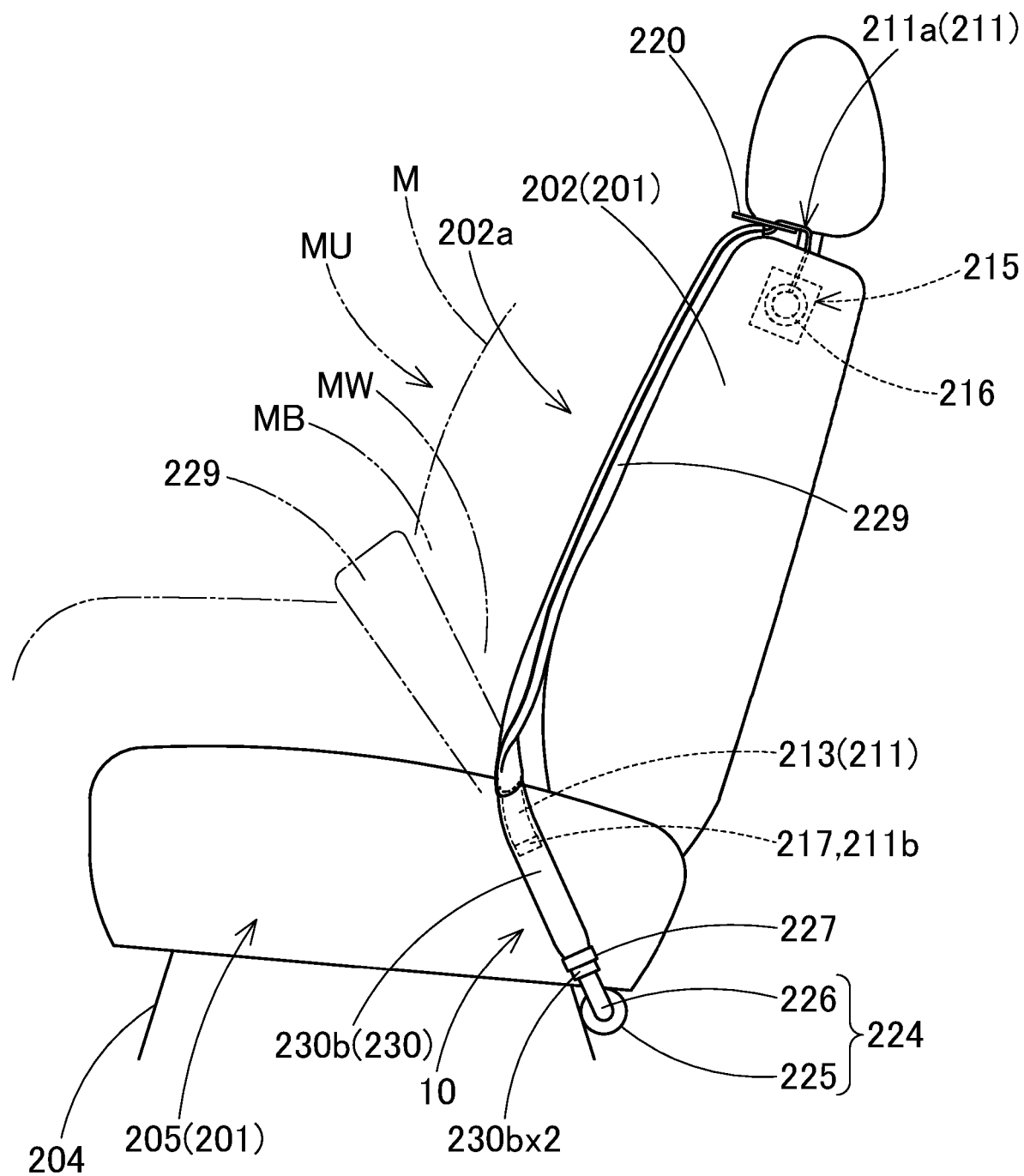
FIG. 28 is a left side view of the seat.
Figure 29:
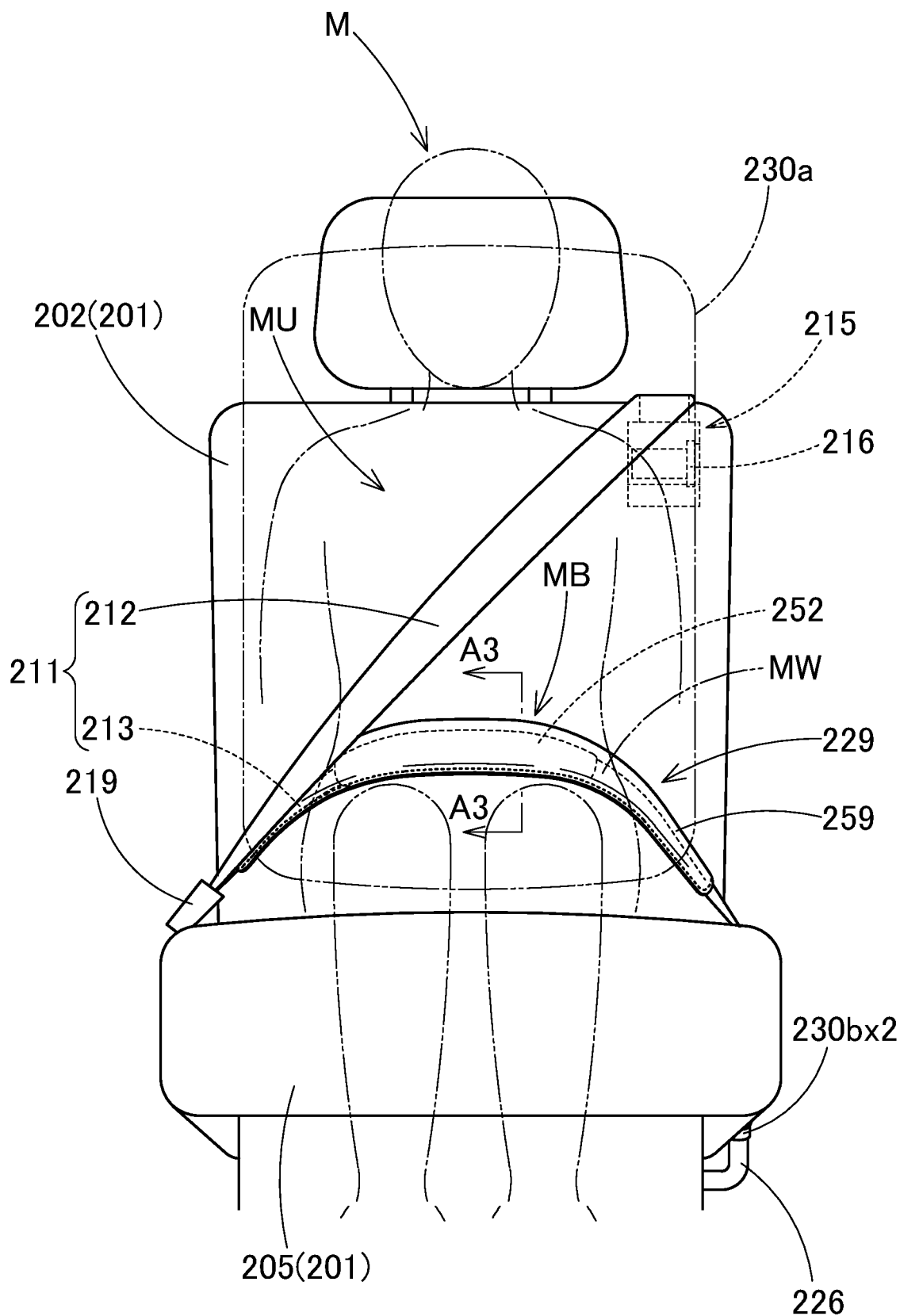
FIG. 29 is a front view of the seat.
Figure 30:
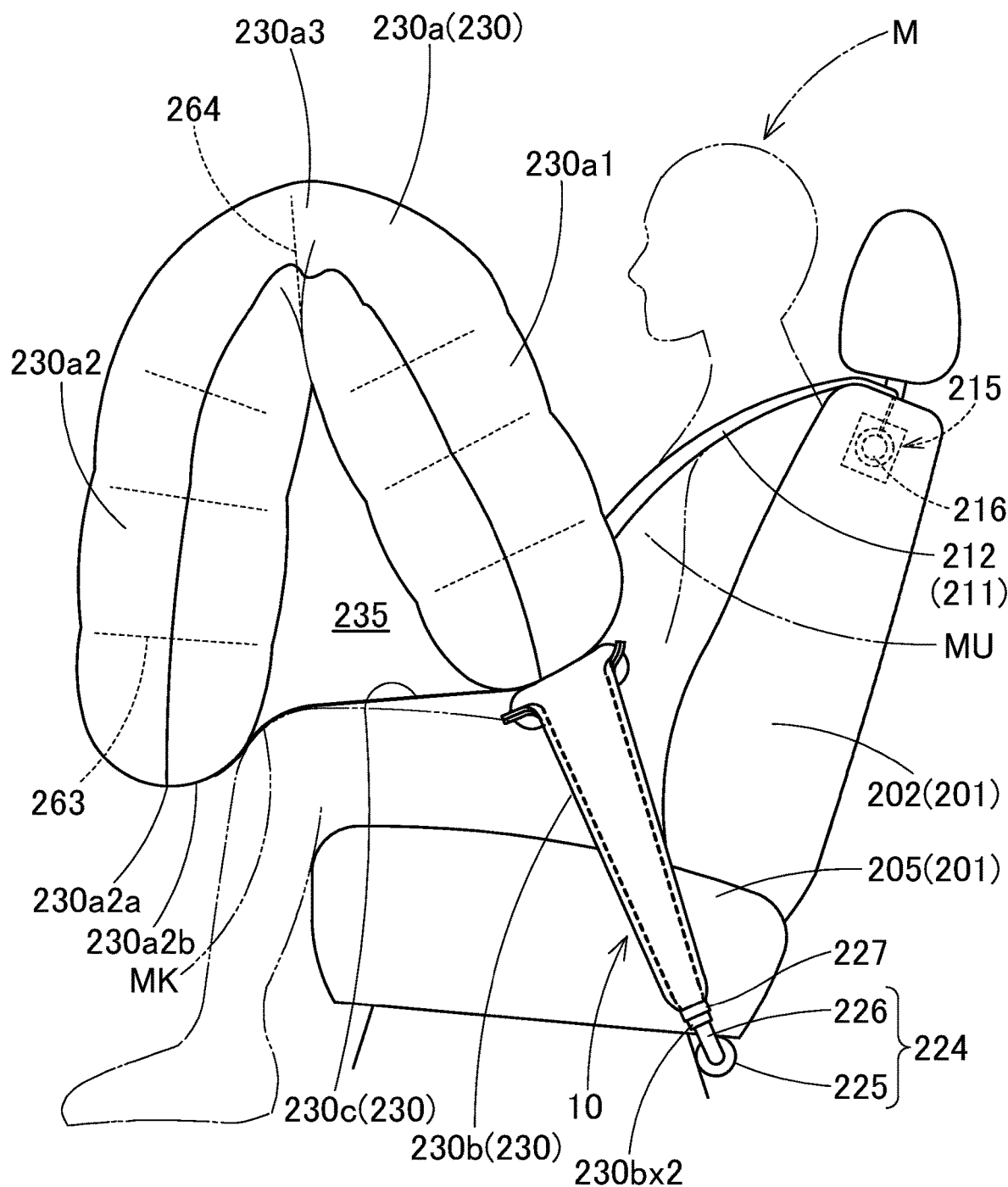
FIG. 30 is a left side view of the seat when an airbag is inflated.

Next, the occupant protection device 10 according to a fifth embodiment of the invention will be described. FIG. 27 is a perspective view of a seat 201 on which the occupant protection device 10 is mounted. FIG. 28 is a left side view of the seat 201. FIG. 29 is a front view of the seat 201, and shows, as two-dotted chain lines, the occupant M in a state seated on the seat 201 and wearing a seatbelt 211, and an airbag 230 of the occupant protection device 10 in an inflated state. FIG. 30 is a left side view of the seat 201 when the airbag 230 is inflated, and shows, as a two-dotted chain line, the occupant M in a state seated on the seat 201 and wearing the seatbelt 211.

As shown in FIGS. 27 to 30, the occupant protection device 10 is mounted on the seat 201, which is a driver's seat of a vehicle, and is provided in order to protect the occupant M seated on the seat 201. The occupant protection device 10 is configured of the seatbelt 211, a bag assembly 229 including the airbag 230, and an inflator 224 that supplies an inflating gas to the airbag 230. The seat 201 includes a backrest portion 202 and a seat portion 205. Also, the seat 201 is configured in such a way as to be movable by sliding in the front and rear directions using an unshown seat slide. The seat slide is such that two rails, a left rail and a right rail, are attached to a body of the vehicle below the seat 201, a rail that engages with the two rails is attached to a seat frame 204, and a locking mechanism is provided between the rail and the two rails. Although no autonomous driving mode is installed in the vehicle of the present embodiment, the seat 201 is configured in such a way as to be movable a significant distance to the rear using the unshown seat slide, and a large space can be secured at the feet of the occupant M, in order that the seat 201 is also compatible with a vehicle in which an autonomous driving mode is installed.

The seatbelt 211 is formed of a strip-form material wherein a polyester fiber, or the like, with good sliding properties is knitted. The seatbelt 211 is configured in such a way that an upper end 211a side thereof can be fed out from a take-up mechanism 215 provided in an interior in a vicinity of a left top edge of the backrest portion 202 in a vicinity of a left shoulder tip of the occupant M seated on the seat 201. A lower end 211b side of the seatbelt 211 forms a fixed end fixed to an anchor member 217 provided on a left side of the seat portion 205. Also, a tongue 220 is provided in an intermediate region of the seatbelt 211. The tongue 220 is fastened to a buckle 219 provided on the right side of the seat portion 205 of the seat 201. A state wherein the occupant M is seated on the seat 201 and the tongue 220 is fastened to the buckle 219 is a state wherein the seatbelt 211 is fastened to the occupant M.

The seatbelt 211 in a state fastened to the occupant M has a shoulder belt portion 212, which is a region that extends from the tongue 220 to the take-up mechanism 215 side, is disposed on a front face side of an upper body MU of the occupant M, and can restrain the upper body MU of the occupant M, and a lap belt portion 213, which is a region that extends from the tongue 220 to the lower end 211b side, is disposed on a front face side of a waist portion MW of the occupant M, and can restrain the waist portion MW. The occupant M can release the fastened state of the tongue 220 with respect to the buckle 219 by carrying out a pressing operation of an unshown release button provided on the buckle 219, and remove the tongue 220 from the buckle 219.

The take-up mechanism 215 has a pretensioner mechanism 216 configured in such a way as to cause, when there is an abrupt drawing out of the seatbelt 211, the drawing out to stop, and furthermore, in such a way as to be able to take up the drawn out seatbelt 211 when there is a collision or the like of the vehicle. The pretensioner mechanism 216 is a general purpose pretensioner mechanism, and instantaneously takes up the seatbelt 211 by causing a shaft around which the seatbelt 211 is wound to rotate by causing a built-in gas generator to operate.

The inflator 224 is configured of an inflator main body 225, which discharges an inflating gas, and a pipe portion 226 that guides the inflating gas discharged from the inflator main body 225 to the airbag 230. The inflator main body 225 is attached to the seat frame 204, which supports the seat portion 205 of the seat 201. The pipe portion 226 extends from the inflator main body 225, and is of a form bent into an approximate L-shape in such a way as to follow a side face from a bottom face of the seat portion 205.

The bag assembly 229 includes the airbag 230, which has a bag main body portion 230a and a conduit portion 230b, a bag linking portion 252, and a bag cover 259. In a state before the airbag 230 operates, the bag main body portion 230a is housed in an interior of the bag cover 259 in a folded state. The conduit portion 230b of the airbag 230 is connected to the pipe portion 226 of the inflator 224, takes in inflating gas discharged from the inflator 224, and guides the inflating gas to the bag main body portion 230a. A base end portion 230bx2 of the conduit portion 230b of the airbag 230 and the pipe portion 226 of the inflator 224 are linked by being fastened with a clamp 227.

Next, an operation of protecting the occupant M with the occupant protection device 10 will be described. Firstly, on the vehicle colliding, the pretensioner mechanism 216 of the take-up mechanism 215 operates, and the seatbelt 211 fastened to the occupant M is taken up in order to stabilize a seated posture of the occupant M on the seat 201. Because of this, the lap belt portion 213 of the seatbelt 211 is drawn to the tongue 220 side, and the shoulder belt portion 212 continuing from the lap belt portion 213 is drawn to the shoulder tip side of the occupant M. Subsequently, the inflator 224 operates, and on inflating gas being supplied from the inflator main body 225 via the pipe portion 226 and the conduit portion 230b of the airbag 230 to the bag main body portion 230a of the airbag 230, the bag main body portion 230a inflates. Because of this, the upper body MU of the occupant M, who is moving forward, is received by the bag main body portion 230a, whereby the occupant M is protected.

Figure 31:
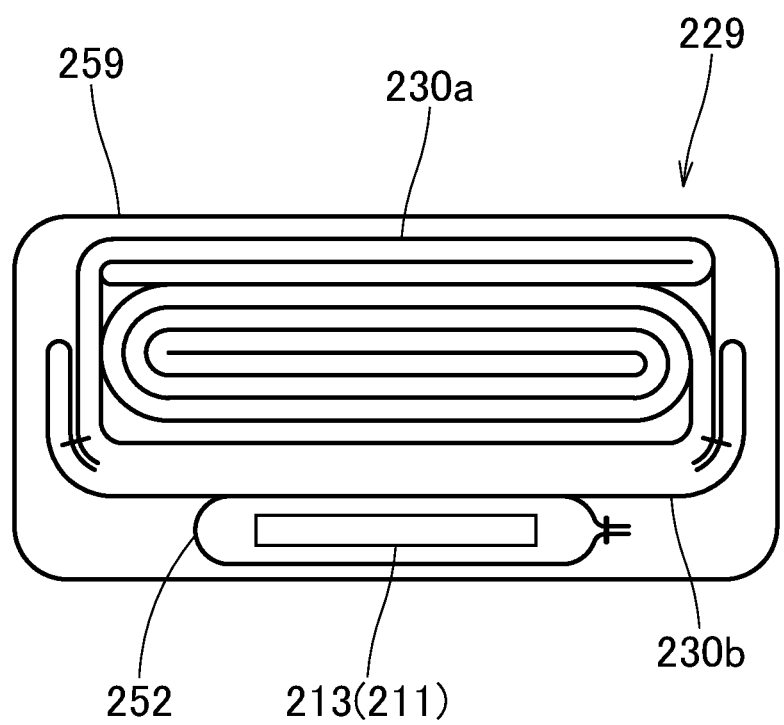
FIG. 31 is a sectional view of a bag assembly cut along an A3-A3 portion shown in FIG. 29.
Figure 32:
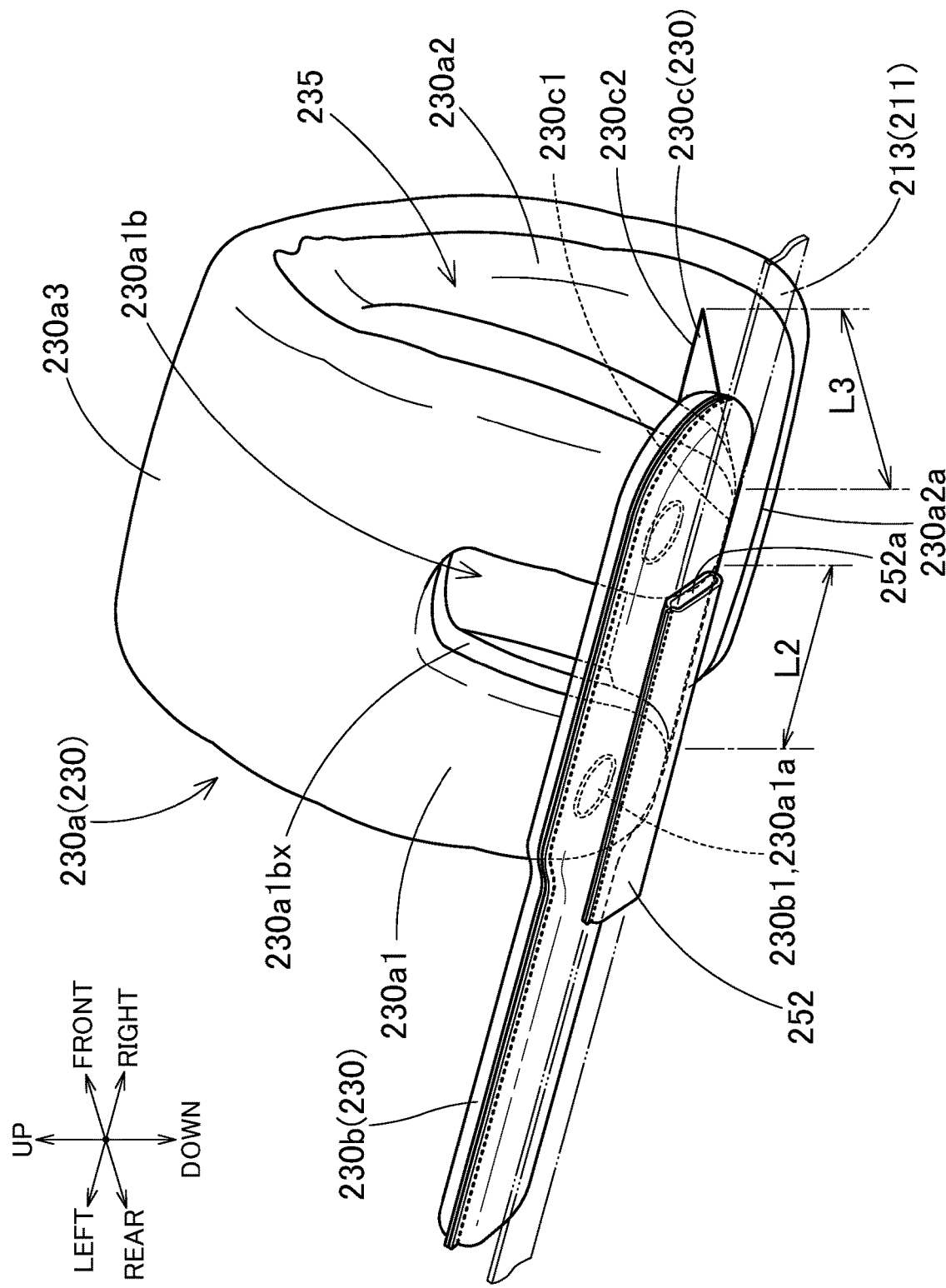
FIG. 32 is a perspective view wherein the bag assembly in a state wherein the airbag is inflated is seen from below.
Figure 33:
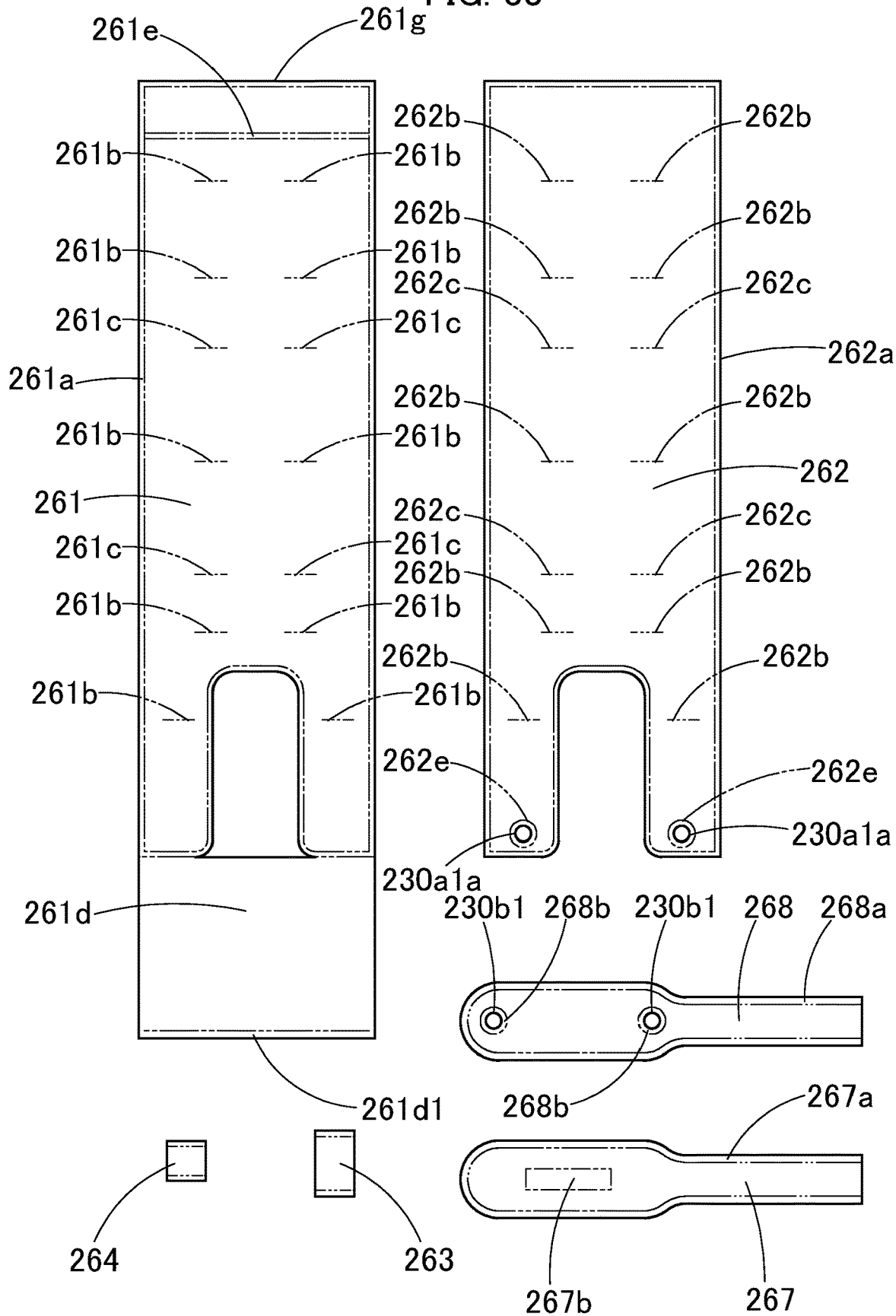
FIG. 33 is an exploded plan view of the airbag.

Next, a configuration of the bag assembly 229 will be described. FIG. 31 is a sectional view of the bag assembly 229 cut along an A3-A3 portion shown in FIG. 29. FIG. 32 is a perspective view wherein the bag assembly 229 in a state wherein the airbag 230 is inflated is seen from below, with the bag cover 259 being omitted. FIG. 33 is an exploded plan view of the airbag 230. As shown in FIGS. 31 to 33, the bag assembly 229 includes the airbag 230, the bag linking portion 252, and the bag cover 259.

The airbag 230 is configured of the bag main body portion 230a, which acts as a main body portion that receives the occupant M by inflating owing to inflating gas, the conduit portion 230b, which is connected to the pipe portion 226 of the inflator 224, and causes inflating gas to flow into the bag main body portion 230a by guiding the inflating gas discharged from the inflator 224 to an inflow port 230a1a of the bag main body portion 230a, and a tether 230c linked to an outer peripheral face of the bag main body portion 230a. The bag main body portion 230a and the conduit portion 230b are linked by being sewn together.

The bag main body portion 230a when inflation is completed has a rear wall portion 230a1, which is disposed immediately in front of the occupant M and receives the upper body MU of the occupant M, who moves forward, by coming into contact with the upper body MU, a front wall portion 230a2 disposed in front of the rear wall portion 230a1 but separated from the rear wall portion 230a1, and an upper wall portion 230a3 that connects an upper portion of the rear wall portion 230a1 and an upper portion of the front wall portion 230a2. The front wall portion 230a2 is disposed on a side of the rear wall portion 230a1 opposite to the occupant M side. Also, as the rear wall portion 230a1 and the front wall portion 230a2 are disposed separated in the front-rear direction, a gap 235 is formed between the rear wall portion 230a1 and the front wall portion 230a2 below the upper wall portion 230a3. Also, two inflow ports 230a1a, which are aperture portions for causing inflating gas in the conduit portion 230b to flow thereto, are provided in a lower portion of the rear wall portion 230a1. A form of the bag main body portion 230a is made by the bag main body portion 230a of an approximately cuboid form being bent by a tensile force of the tether 230c.

Also, a through hole 230a1b that penetrates in the front-rear direction is formed in the rear wall portion 230a1 of the bag main body portion 230a. The through hole 230a1b is provided in order to reduce a load exerted on a lower abdominal portion MB (FIG. 29) of the occupant M when the bag main body portion 230a expands. The through hole 230a1b extends in a left-right direction center of the rear wall portion 230a1, and upward from a lower end in a vertical direction. Also, an upper end portion of the through hole 230a1b is disposed above the tether 230c in the vertical direction. A width in the left-right direction of the through hole 230a1b is of a tapered form that narrows from bottom to top. A left-right direction width L2 of a lower end portion of the through hole 230a1b is preferably set to be 100 mm or greater in order that the lower abdominal portion MB of the occupant M is easily housed, and in the present embodiment is set to be 100 mm. Also, an inner peripheral face 230a1bx of the through hole 230a1b is curved. That is, the through hole 230a1b is of an approximate inverted U form whose lower side is an aperture portion when seen from the front-rear direction.

Also, the tether 230c is such that one end portion 230c1 is linked to the rear wall portion 230a1, and another end portion 230c2 is linked to the front wall portion 230a2, in the gap 235 below the upper wall portion 230a3. That is, the upper wall portion 230a3 connects the front wall portion 230a2 and the rear wall portion 230a1 above the tether 230c. Also, in the present embodiment, the tether 230c is formed of a base fabric 261 configuring one portion of the bag main body portion 230a, as will be described hereafter, because of which the one end portion 230c1 of the tether 230c is formed integrated with the rear wall portion 230a1. That is, the tether 230c being linked also includes a configuration wherein the tether 230c is formed integrated with the rear wall portion 230a1 or the front wall portion 230a2, in addition to a configuration wherein the tether 230c is linked to the rear wall portion 230a1 or the front wall portion 230a2 using a method such as sewing. Also, the other end portion 230c2 of the tether 230c is linked in a position farther to the upper wall portion 230a3 side than a leading end portion 230a2a of the front wall portion 230a2.

Also, the bag main body portion 230a is formed by sewing together edge portions 261a and 262a of two base fabrics 261 and 262 of approximately rectangular form, which are woven fabrics formed by plain weaving, or the like, a polyester fiber. The base fabric 261 is configured in such a way that a length in a longitudinal direction is long with respect to that of the base fabric 262, and a length in a lateral direction is the same. A long portion 261d of the base fabric 261 that is longer than the base fabric 262 forms the tether 230c by a leading end portion 261d1 thereof being sewn to a tether stitching portion 261e of the base fabric 261 in an exterior of the bag main body portion 230a. Owing to the tether 230c being formed using the base fabric 261 for forming the bag main body 230a in this way, material for forming the airbag 230 can be reduced. When such a point is not taken into consideration, the tether 230c may be configured by linking a tether of a separate base fabric or another material to an outer peripheral face of the bag main body 230a. Also, the tether stitching portion 261e of the base fabric 261 is a linking portion of the other end portion 230c2 of the tether 230c in the front wall portion 230a2, and is disposed farther to an inner side than an end portion 261g of the base fabric 261 corresponding to the leading end portion 230a2a of the front wall portion 230a2.

Also, cutout portions 261f and 262f wherein the base fabrics 261 and 262 are cut out are provided in the base fabrics 261 and 262 in order to form the through hole 230a1b. Also, in order to secure thicknesses of the rear wall portion 230a1, the front wall portion 230a2, and the upper wall portion 230a3, a multiple of two kinds of internal tethers 263 and 264 of an approximately rectangular form, for separating the two base fabrics 261 and 262, are provided in an interior of the bag main body portion 230a. The internal tether 263 is configured in such a way that a length in a longitudinal direction is long with respect to that of the internal tether 264, and a length in a lateral direction is the same. The internal tether 263 is sewn to tether stitching portions 261b and 262b of the base fabrics 261 and 262, and the internal tether 264 is sewn to tether stitching portions 261c and 262c of the base fabrics 261 and 262.

The conduit portion 230b is a tubular member that is linked to each of the pipe portion 226 of the inflator 224 and the bag main body portion 230a, and extends in a longitudinal direction of the lap belt portion 213. The conduit portion 230b has two communication ports 230b1 that communicate with one each of the two inflow ports 230a1a of the bag main body portion 230a. Inflating gas in an interior of the conduit portion 230b flows via the communication port 230b1 and the inflow port 230a1a into the interior of the bag main body portion 230a.

Also, the conduit portion 230b is formed by sewing together edge portions 267a and 268a of a lower side member 267 and an upper side member 268 formed of a bag base fabric that is a material the same as the material of the bag main body portion 230a. The lower side member 267 is linked to the bag linking portion 252 by being sewn to the bag linking portion 252 in a stitching portion 267b. The communication port 230b1 is formed in the upper side member 268, and a peripheral edge 268b of the communication port 230b1 is linked to the bag main body portion 230a by being sewn to a peripheral edge 262e of the inflow port 230a1a formed in the base fabric 262 forming the bag main body portion 230a. External dimensions of the lower side member 267 and the upper side member 268 are the same.

The bag linking portion 252 is a tubular member formed of a material the same as the bag base fabric forming the airbag 230, and is a member that links the airbag 230 to the lap belt portion 213. A space in an interior of the bag linking portion 252 forms a belt insertion portion 252a through which the lap belt portion 213 is inserted. After the lap belt portion 213 is inserted through the belt insertion portion 252a, the bag linking portion 252 and the lap belt portion 213 are linked by the two being sewn together. Also, an upper face of the bag linking portion 252 is linked by sewing to the stitching portion 267b of the lower side member 267 forming the conduit portion 230b of the airbag 230.

The bag cover 259 is a tubular member formed of a kind of fabric used as a material of the seat 201. The bag cover 259 houses the bag main body portion 230a of the airbag 230 in a state folded in an interior of the tube, one portion of the conduit portion 230b, the bag linking portion 252, and a portion of the lap belt portion 213 installed in the bag assembly 229. The bag cover 259 is subjected to pressure from the bag main body portion 230a when the bag main body portion 230a of the airbag 230 expands, and one portion thereof ruptures, causing the bag main body portion 230a to protrude from the bag cover 259.

Figure 34:
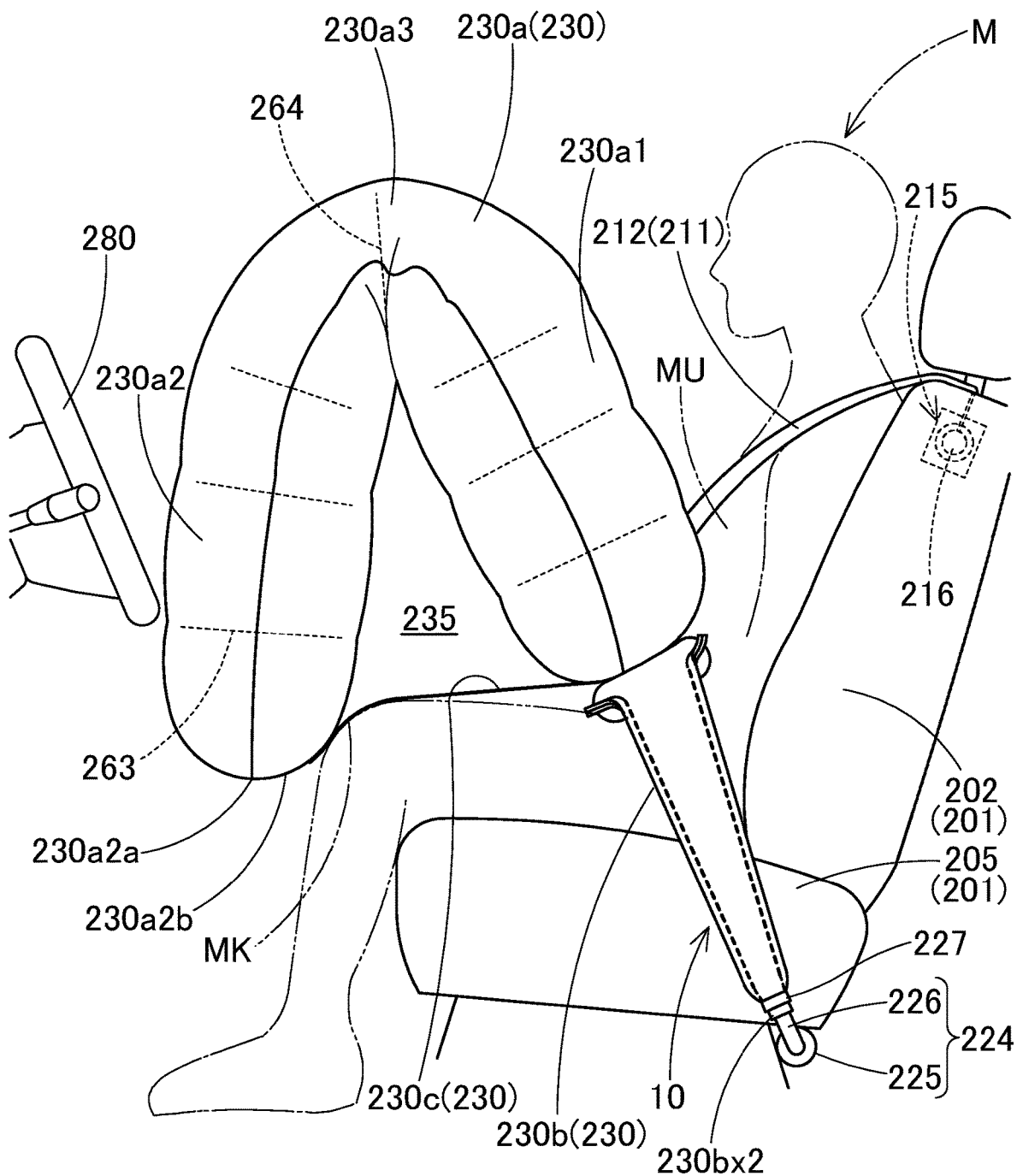
FIG. 34 is a drawing wherein a periphery of the seat when the airbag is inflated is seen from the left side.
Figure 35:
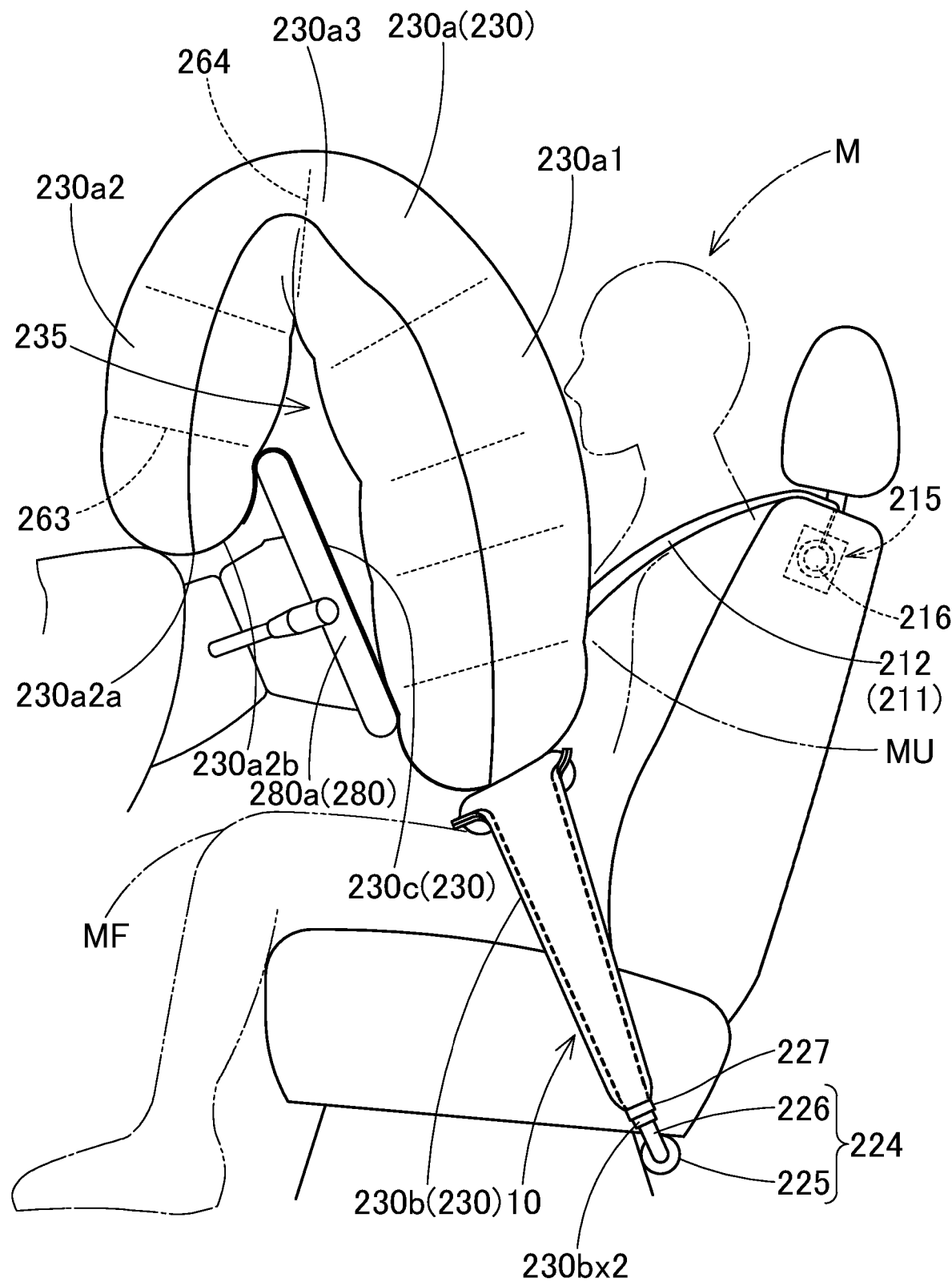
FIG. 35 is a drawing wherein a periphery of the seat when the airbag is inflated is seen from the left side.
Figure 36:
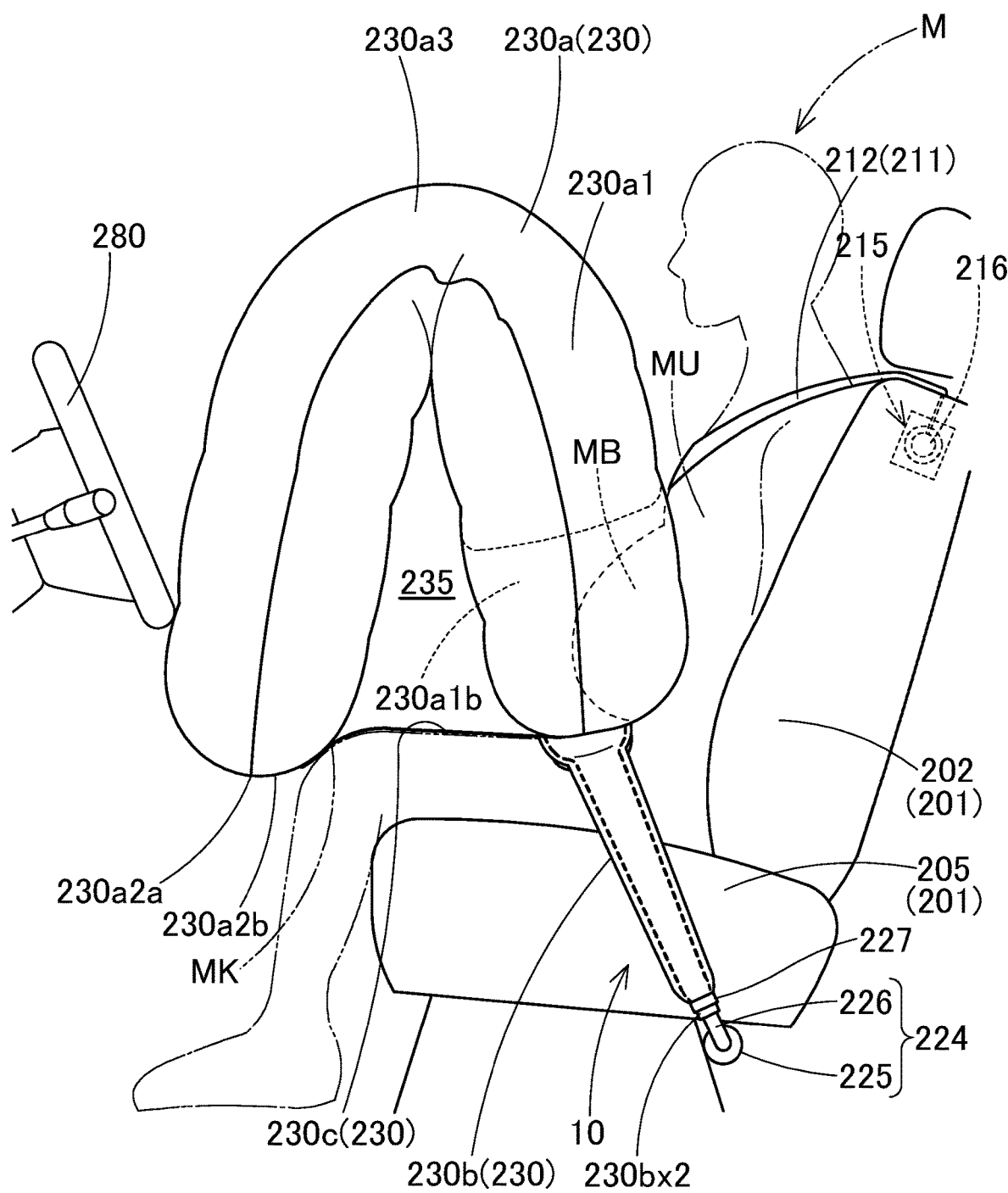
FIG. 36 is a drawing wherein a periphery of the seat when the airbag is inflated is seen from the left side.

Next, a positional relationship between the bag main body portion 230a and the occupant M or members in a periphery thereof when the airbag 230 is inflated will be described. FIG. 34 is a drawing wherein a periphery of the seat 201 when the airbag 230 is inflated in a state wherein the seat 201 is positioned toward the rear side, and a distance between the seat 201 and a steering wheel 280 is long, is seen from the left side. FIG. 35 is a drawing wherein a periphery of the seat 201 when the airbag 230 is inflated in a state wherein the seat 201 is positioned toward the front side, and the distance between the seat 201 and the steering wheel 280 is short, is seen from the left side. FIG. 36 is a drawing wherein a periphery of the seat 201 when the airbag 230 is inflated in a state wherein the seat 201 is positioned toward the rear side, and the distance between the seat 201 and the steering wheel 280 is long, is seen from the left side, and shows a state wherein the occupant M whose circumference of the lower abdominal portion MB is large, such as a pregnant woman, is seated on the seat 201.

When the distance between the seat 201 and the steering wheel 280 is long, as shown in FIG. 34, the bag main body portion 230a of the airbag 230 firstly expands upward and forward, after which a leading end portion 230a2a side of the front wall portion 230a2 droops downward due to gravity. Because of this, the tether 230c catches on the knee portion MK (a supporting body) of the occupant M from above and is engaged therewith, and the bag main body portion 230a is supported by the knee portion MK of the occupant M via the tether 230c. By the tether 230c catching on and being engaged with the knee portion MK, and the bag main body portion 230a being supported via the tether 230c in this way, the bag main body portion 230a is stably supported by the knee portion MK of the occupant M, the bag main body portion 230a is more easily disposed in an intended position, and the bag main body portion 230a more easily obtains a reactive force from the knee portion MK or a thigh portion connected to the knee portion MK. That is, when the upper wall portion 230a3, which is a portion connecting the rear wall portion 230a1 and the front wall portion 230a2, is lower than the tether 230c, the upper wall portion 230a3 is more easily repelled from the knee portion MK due to a repulsive force of the upper wall portion 230a3 when the upper wall portion 230a3, into which inflating gas has flowed, comes into contact with the knee portion MK, and there is a possibility that the bag main body portion 230a is not stably supported by the knee portion MK. Meanwhile, when the upper wall portion 230a3 is disposed above the tether 230c, as in the present embodiment, the tether 230c, into which no inflating gas has flowed, catches on and is engaged in such a way as to follow the upper face of the knee portion MK, because of which a large area of contact between the tether 230c and the knee portion MK is secured, whereby friction is increased, and the bag main body portion 230a can be stably supported by the knee portion MK via the tether 230c. Because of this, the bag main body portion 230a is more easily disposed in an intended position, and the bag main body portion 230a more easily obtains a reactive force from the knee portion MK or the thigh portion connected to the knee portion MK. Also, as the other end portion 230c2 of the tether 230c is linked in a position farther to the upper wall portion 230a3 side than the leading end portion 230a2a of the front wall portion 230a2, a leading end region 230a2b of the front wall portion 230a2 from the linking portion to the leading end portion 230a2a can be disposed immediately in front of the knee portion MK of the occupant M. Because of this, the knee portion MK of the occupant M is more easily protected by the bag main body portion 230a, and the tether 230c can more easily catch on the knee portion MK. In order that the tether 230c more easily catches on the knee portion MK owing to the front wall portion 230a2 of the bag main body portion 230a being disposed in front of the knee portion MK of the occupant M, and in order to appropriately protect the knee portion MK of the occupant M, a length L3 between the one end portion 230c1 and the other end portion 230c2 of the tether 230c (FIG. 32) is preferably 300 mm or greater.

When the distance between the seat 201 and the steering wheel 280 is short, as shown in FIG. 35, the bag main body portion 230a of the airbag 230 firstly expands upward and forward in such a way as to surmount the steering wheel 280, after which the leading end portion 230a2a side of the front wall portion 230a2 droops downward due to gravity. At this time, the steering wheel 280 is disposed in the gap 235 formed between the rear wall portion 230a1 and the front wall portion 230a2 of the bag main body portion 230a, because of which the bag main body portion 230a and the steering wheel 280 are unlikely to interfere with each other when the bag main body portion 230a expands and spreads out, and the spreading out of the bag main body portion 230a is unlikely to be impeded. In this way, the occupant protection device 10 of the present embodiment is such that even when the steering wheel 280, which is an obstruction, is in front of the seat 201, interference between the bag main body portion 230a and the steering wheel 280 is restricted, and difficulty in the bag main body portion 230a of the airbag 230 spreading out due to the steering wheel 280 can be restricted.

Also, the tether 230c catches on and is engaged with an upper face of a ring portion 280a, which the occupant M grips and rotates to steer, of the steering wheel 280 (supporting body) from above, whereby the bag main body portion 230a that has surmounted the steering wheel 280 is supported by the ring portion 280a of the steering wheel 280 via the tether 230c. By the tether 230c catching on and being engaged with the steering wheel 280, and the bag main body portion 230a being supported via the tether 230c in this way, the bag main body portion 230a is stably supported by the steering wheel 280, the bag main body portion 230a is more easily disposed in an intended position, and the bag main body portion 230a more easily obtains a reactive force from the steering wheel 280. That is, when the upper wall portion 230a3, which is a portion connecting the rear wall portion 230a1 and the front wall portion 230a2, is lower than the tether 230c, the upper wall portion 230a3 is more easily repelled from the steering wheel 280 due to a repulsive force of the upper wall portion 230a3 when the upper wall portion 230a3, into which inflating gas has flowed, comes into contact with the steering wheel 280, and there is a possibility that the bag main body portion 230a is not stably supported by the steering wheel 280. Meanwhile, when the upper wall portion 230a3 is disposed above the tether 230c, as in the present embodiment, the tether 230c, into which no inflating gas has flowed, catches on and is engaged in such a way as to follow the upper face of the ring portion 280a of the steering wheel 280, because of which a large area of contact between the tether 230c and the steering wheel 280 is secured, whereby friction is increased, and the bag main body portion 230a can be stably supported by the steering wheel 280 via the tether 230c. Because of this, the bag main body portion 230a is more easily disposed in an intended position, and the bag main body portion 230a more easily obtains a reactive force from the steering wheel 280. Also, as the other end portion 230c2 of the tether 230c is linked in a position farther to the upper wall portion 230a3 side than the leading end portion 230a2a of the front wall portion 230a2, the leading end region 230a2b of the front wall portion 230a2 is more easily disposed immediately in front of the steering wheel 280, and the tether 230c can more easily catch on the steering wheel 280.

Also, as shown in FIG. 36, the through hole 230a1b is formed in the aforementioned position in the rear wall portion 230a1 of the bag main body portion 230a, meaning that when the bag main body portion 230a expands, an area of the bag main body portion 230a, which comes into contact with a vicinity of the lower abdominal portion MB of the occupant M, decreases, because of which the load exerted on the lower abdominal portion MB of the occupant M can be reduced. That is, assuming a case wherein a recessed portion is formed in the rear wall portion 230a1 rather than the through hole 230a1b, there is concern that, unless a depth of the recessed portion is sufficient with respect to the circumference of the lower abdominal portion MB of the occupant M, the lower abdominal portion MB of the occupant M will come into contact with a bottom face of the recessed portion, and the load exerted on the lower abdominal portion MB of the occupant M cannot be sufficiently reduced. In response to this, the present embodiment is such that the rear wall portion 230a1 has the through hole 230a1b, and the gap 235 is formed between the rear wall portion 230al and the front wall portion 230a2, because of which a space in which the lower abdominal portion MB of the occupant M is housed is expanded as far as the position of the front wall portion 230a2. Because of this, the bag main body portion 230a is less likely to come into contact with a vicinity of the lower abdominal portion MB of the occupant M than in the case of a configuration wherein a recessed portion is formed in the rear wall portion 230a1, because of which a load exerted on the lower abdominal portion MB of the occupant M due to the expansion of the airbag 230 can be effectively reduced. This configuration is particularly effective for the occupant M whose circumference is large, such as a pregnant woman, and who needs protection of the lower abdominal portion MB.

Also, the bag main body portion 230a is such that the rear wall portion 230a1 and the front wall portion 230a2 are connected by the upper wall portion 230a3 above the two, and the inflow port 230a1 is disposed in the rear wall portion 230a1. Because of this, the bag main body portion 230a firstly protrudes upward when inflating gas flows in, as heretofore described, because of which the load exerted on the lower abdominal portion MB of the occupant M when the bag main body portion 230a starts to expand can be reduced in comparison with a configuration wherein the bag main body portion 230a spreads out with no gap on the front side of the occupant M.

Also, as the bag main body portion 230a has the gap 235 and the through hole 230a1b, a capacity of a portion of the bag main body portion 230a into which inflating gas flows can be reduced in comparison with a form such that the bag main body portion 230a spreads out without a gap on the front side of the occupant M. Because of this, a time from the bag main body portion 230a starting to expand until completion can be shortened, and the occupant M can be more safely protected by the bag main body portion 230a.

Sixth Embodiment

Next, the occupant protection device 10 according to a sixth embodiment of the invention will be described. With regard to portions whose description duplicates that of the fifth embodiment, a description will be simplified or omitted using the same drawings or using the same reference signs.

Figure 37:
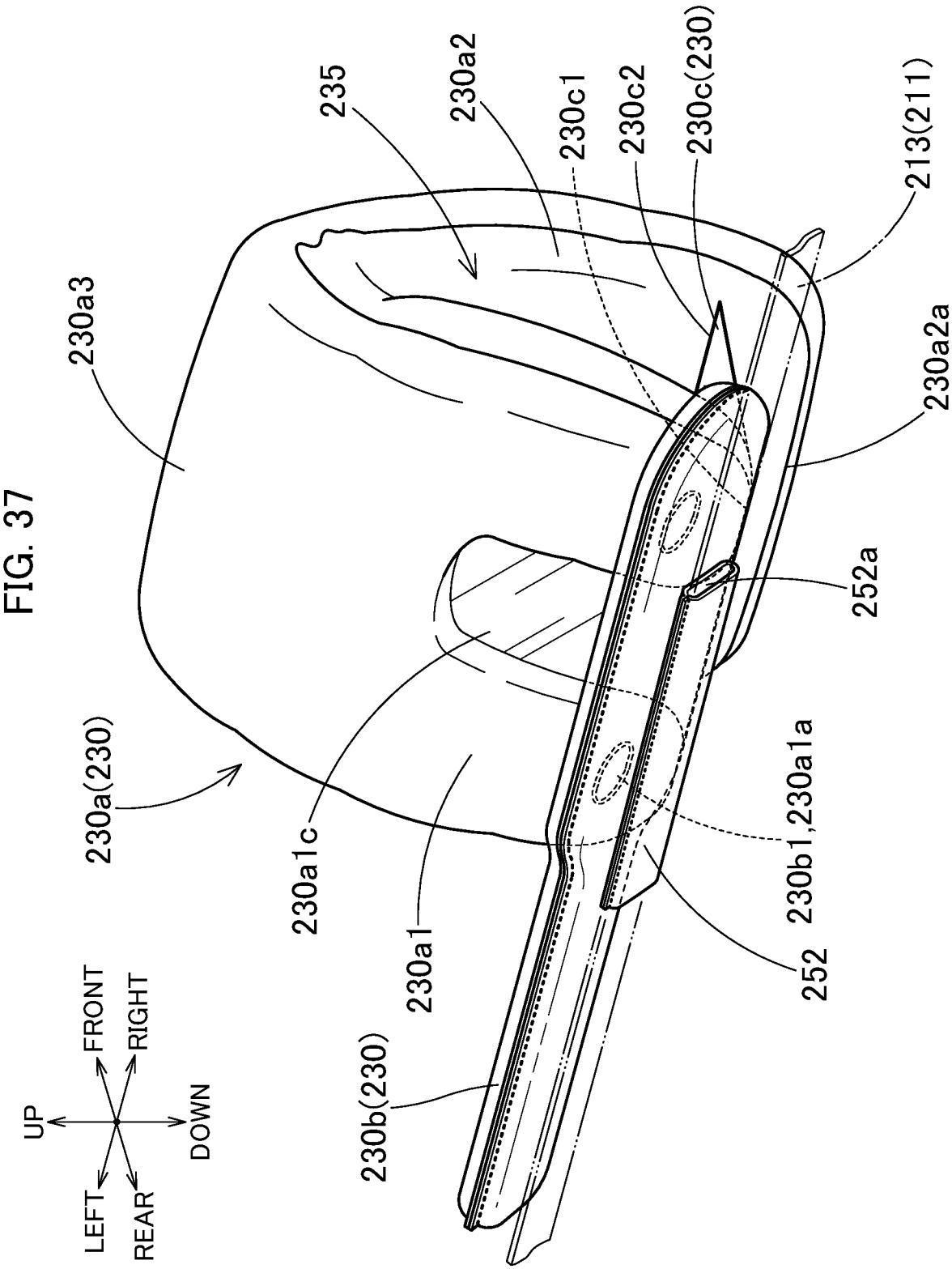
FIG. 37 is a perspective view wherein the bag assembly in a state wherein the airbag is inflated is seen from below.
Figure 38:
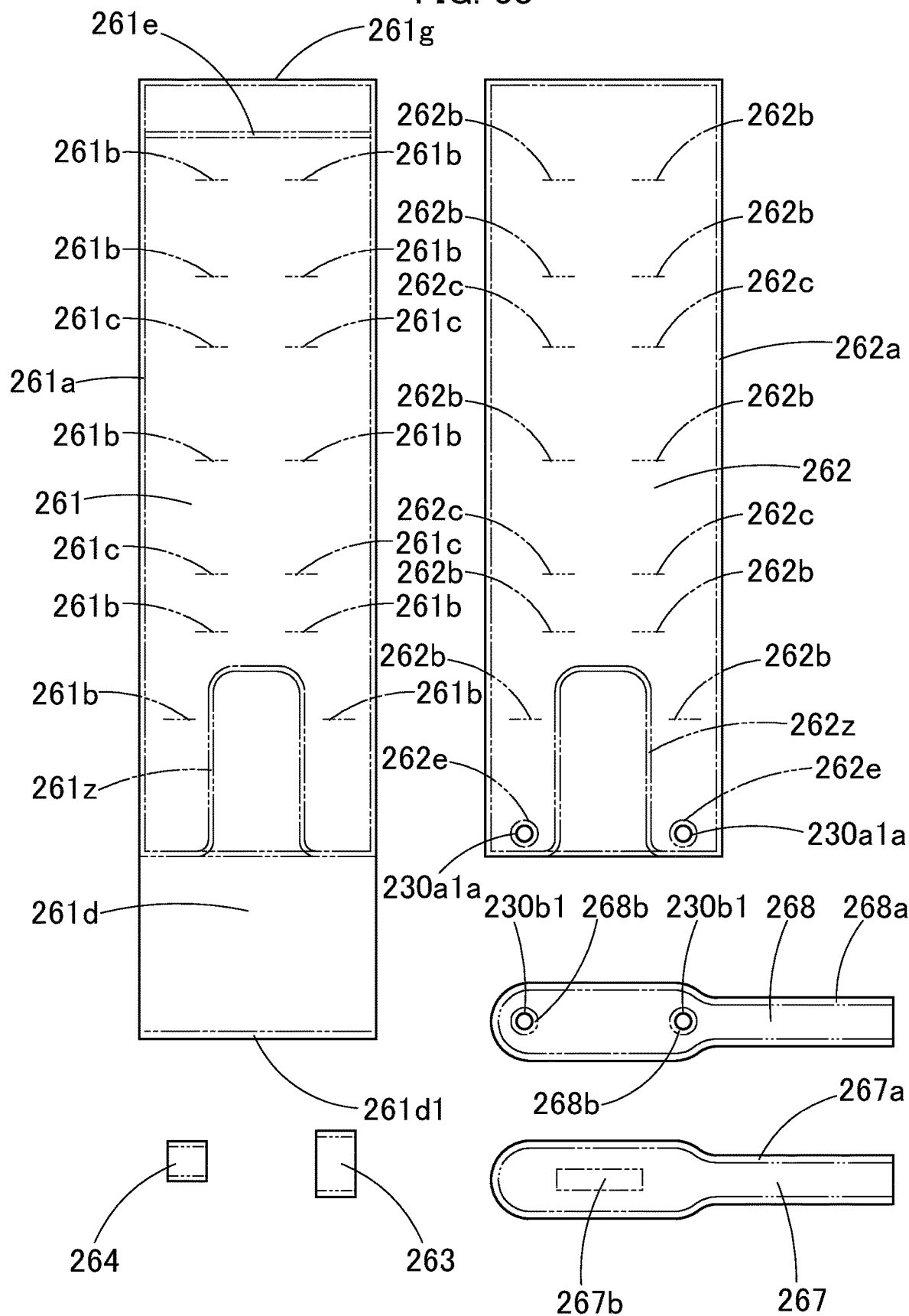
FIG. 38 is an exploded plan view of the airbag.
Figure 39:
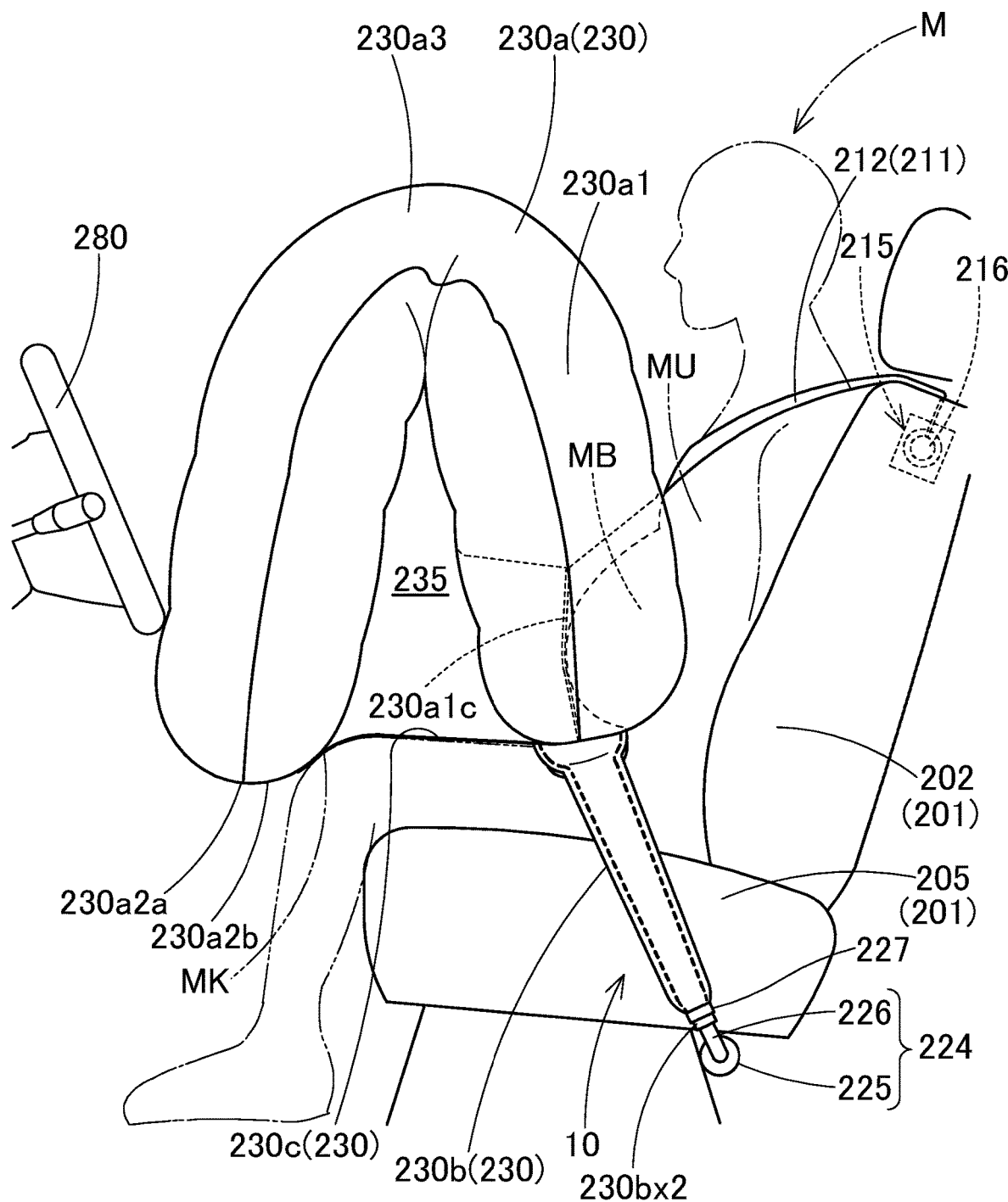
FIG. 39 is a drawing wherein a periphery of the seat when the airbag is inflated is seen from the left side.

FIG. 37 is a perspective view wherein the bag assembly 229 in a state wherein the airbag 230 of the occupant protection device 10 according to the present embodiment is inflated is seen from below, with the bag cover 259 being omitted. FIG. 38 is an exploded plan view of the airbag 230. FIG. 39 is a drawing wherein a periphery of the seat 201 when the airbag 230 is inflated in a state wherein the seat 201 is positioned toward the rear side, and the distance between the seat 201 and the steering wheel 280 is long, is seen from the left side, and shows a state wherein the occupant M whose circumference of the lower abdominal portion MB is large, such as a pregnant woman, is seated on the seat 201.

As shown in FIG. 37, the occupant protection device 10 of the present embodiment differs from the configuration of the fifth embodiment only in a form of the bag main body portion 230a of the airbag 230. Specifically, the occupant protection device 10 of the present embodiment does not have the through hole 230a1b formed in the rear wall portion 230a1 of the bag main body portion 230a of the occupant protection device 10 of the fifth embodiment, but a non-expanding portion 230a1c wherein an inflow of inflating gas is regulated is provided instead. As other configurations of the occupant protection device 10 according to the present embodiment are the same as the configurations of the occupant protection device 10 of the fifth embodiment, a description thereof will be omitted.

The non-expanding portion 230a1c is formed in a position in the rear wall portion 230a1 the same as the position in which the through hole 230a1b of the occupant protection device 10 of the fifth embodiment is formed. That is, the non-expanding portion 230a1c extends in the left-right direction center of the rear wall portion 230a1, and upward from the lower end in a vertical direction. An upper end portion of the non-expanding portion 230a1c is disposed above the tether 230c in the vertical direction. A width in the left-right direction of the non-expanding portion 230a1c is of a tapered form that narrows from bottom to top.

As shown in FIG. 38, the bag main body portion 230a is formed by sewing together the edge portions 261a and 262a of the two base fabrics 261 and 262 of approximately rectangular form, which are woven fabrics formed by plain weaving, or the like, a polyester fiber, in the same way as in the fifth embodiment. The base fabric 261 is configured in such a way that the length in the longitudinal direction is long with respect to that of the base fabric 262, and the length in the lateral direction is the same. The long portion 261d of the base fabric 261, which is longer than the base fabric 262, forms the tether 230c by the leading end portion 261d1 thereof being sewn to the tether stitching portion 261e of the base fabric 261 in the exterior of the bag main body portion 230a. Owing to the tether 230c being formed using the base fabric 261 for forming the bag main body 230a in this way, material for forming the airbag 230 can be reduced.

When such a point is not taken into consideration, the tether 230c may be configured by linking a tether of a separate base fabric or another material to the outer peripheral face of the bag main body 230a.

Also, the base fabric 261 and the base fabric 262 are sewn to stitching portions 261z and 262z. Because of this, the space in the bag main body portion 230a in which the inflow port 230a1a is formed and a space on an inner side of the stitching portions 261z and 262z are separated, and the non-expanding portion 230a1c wherein an inflow of inflating gas is regulated is formed. Also, in order to secure the thicknesses of the rear wall portion 230a1, the front wall portion 230a2, and the upper wall portion 230a3, a multiple of the two kinds of internal tethers 263 and 264 of an approximately rectangular form, for separating the two base fabrics 261 and 262, are provided in the interior of the bag main body portion 230a. The internal tether 263 is configured in such a way that the length in the longitudinal direction is long with respect to that of the internal tether 264, and the length in the lateral direction is the same. The internal tether 263 is sewn to the tether stitching portions 261b and 262b of the base fabrics 261 and 262, and the internal tether 264 is sewn to the tether stitching portions 261c and 262c of the base fabrics 261 and 262.

The occupant protection device 10 of the present embodiment is such that, according to the same mechanism as that of the fifth embodiment, when the distance between the seat 201 and the steering wheel 280 is long, the tether 230c catches on and is engaged in such a way as to follow the upper face of the knee portion MK of the occupant M on the airbag 230 inflating, and the bag main body portion 230a is supported via the tether 230c (FIG. 34). Because of this, the bag main body portion 230a is stably supported by the knee portion MK of the occupant M, the bag main body portion 230a is more easily disposed in an intended position, and the bag main body portion 230a more easily obtains a reactive force from the knee portion MK or a thigh portion connected to the knee portion MK. Also, as the leading end region 230a2b of the front wall portion 230a2 is disposed immediately in front of the knee portion MK of the occupant M, the knee portion MK of the occupant M is more easily protected by the bag main body portion 230a, and the tether 230c can more easily catch on the knee portion MK.

Also, as shown in FIG. 35, according to the same mechanism as that of the fifth embodiment, on the airbag 230 inflating when the distance between the seat 201 and the steering wheel 280 is short, the steering wheel 280 is disposed in the gap 235 formed between the rear wall portion 230a1 and the front wall portion 230a2 of the bag main body portion 230a. This means that even when the steering wheel 280, which is an obstruction, is in front of the seat 201, interference between the bag main body portion 230a and the steering wheel 280 is restricted, and difficulty in the bag main body portion 230a of the airbag 230 spreading out due to the steering wheel 280 can be restricted. Also, as the tether 230c catches on and is engaged with the upper face of the ring portion 280a of the steering wheel 280 from above, the bag main body portion 230a is supported by the ring portion 280a of the steering wheel 280 via the tether 230c. Because of this, the bag main body portion 230a is stably supported by the steering wheel 280, the bag main body portion 230a is more easily disposed in an intended position, and the bag main body portion 230a more easily obtains a reactive force from the steering wheel 280. Also, as the leading end region 230a2b of the front wall portion 230a2 is disposed immediately in front of the steering wheel 280, the tether 230c can more easily catch on the steering wheel 280.

Also, as shown in FIG. 39, the non-expanding portion 230a1c is formed in the aforementioned position in the rear wall portion 230a1 of the bag main body portion 230a, meaning that when the bag main body portion 230a expands, the non-expanding portion 230a1c, whose internal pressure is low, comes into contact with a vicinity of the lower abdominal portion MB of the occupant M. Also, as the gap 235 is formed between the rear wall portion 230a1 and the front wall portion 230a2, the non-expanding portion 230a1c that has come into contact with a vicinity of the lower abdominal portion MB of the occupant M receives a reactive force from the occupant M, and bends slightly to the gap 235 side. Because of these actions, a force with which the bag main body portion 230a presses against a vicinity of the lower abdominal portion MB of the occupant M is reduced, meaning that, according to the occupant protection device 10 of the present embodiment, a load exerted on a lower abdominal portion of the occupant M can be effectively reduced. This configuration is particularly effective for the occupant M whose circumference is large, such as a pregnant woman, and who needs protection of the lower abdominal portion MB.

Also, as there is no need to cut out the base fabrics 261 and 262, as is the case with the through hole 230a1b of the fifth embodiment, the non-expanding portion 230a1c formed in the rear wall portion 230a1 can easily be formed by sewing together the base fabrics 261 and 262. Because of this, productivity of the bag main body portion 230a can be improved.

Also, the bag main body portion 230a is such that the rear wall portion 230a1 and the front wall portion 230a2 are connected by the upper wall portion 230a3 above the two, and the inflow port 230a1a is disposed in the rear wall portion 230a1. Because of this, the bag main body portion 230a firstly protrudes upward when inflating gas flows in, as heretofore described, because of which the load exerted on the lower abdominal portion MB of the occupant M when the bag main body portion 230a starts to expand can be reduced in comparison with a configuration wherein the bag main body portion 230a spreads out with no gap on the front side of the occupant M.

Also, as the bag main body portion 230a has the gap 235 and the non-expanding portion 230a1c, a capacity of a portion of the bag main body portion 230a into which inflating gas flows can be reduced in comparison with a form such that the bag main body portion 230a spreads out without a gap on the front side of the occupant M. Because of this, a time from the bag main body portion 230a starting to expand until completion can be shortened, and the occupant M can be more safely protected by the bag main body portion 230a.

Figure 40:
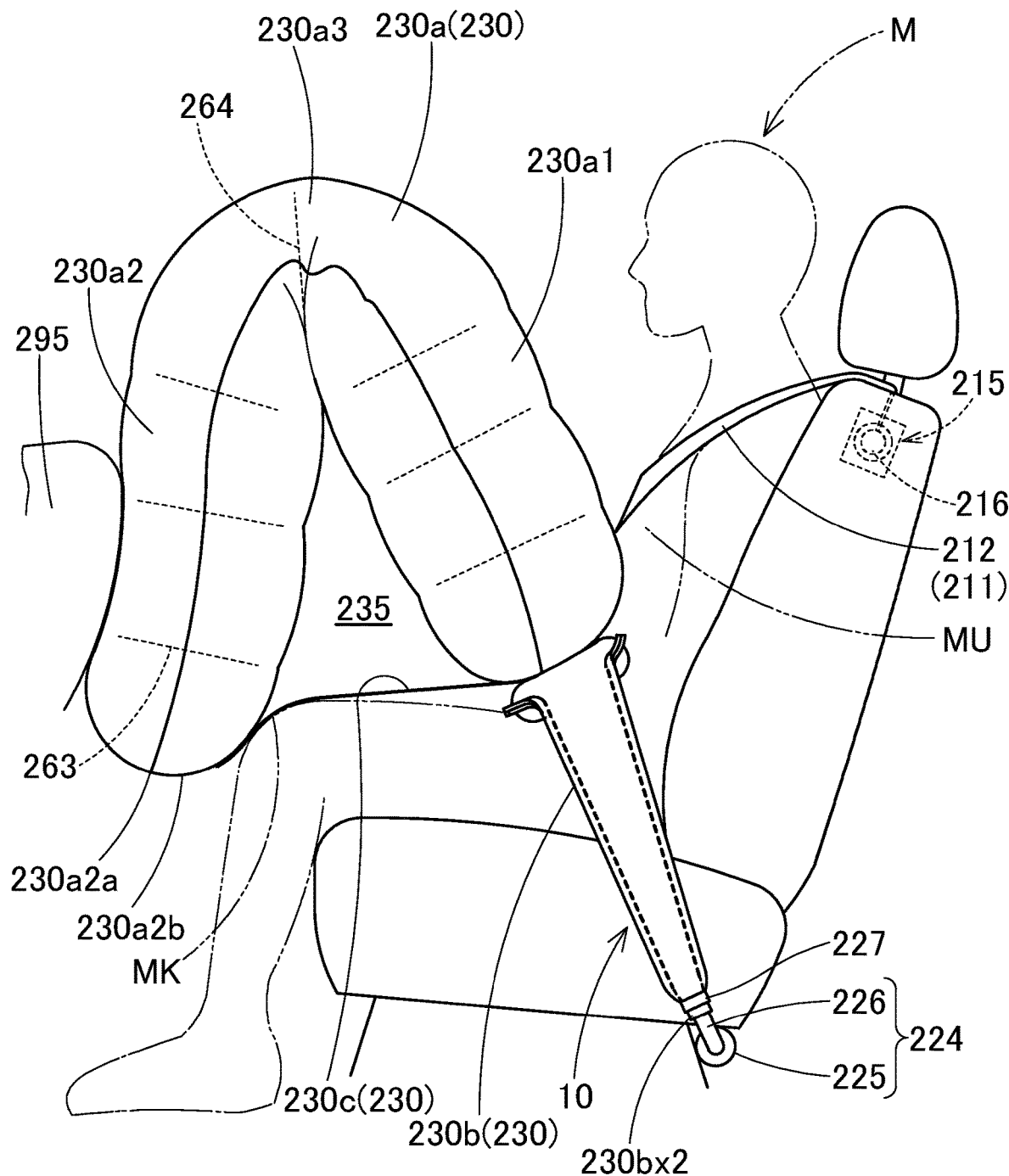
FIG. 40 is a drawing wherein a periphery of the seat when the airbag is inflated is seen from the left side in a configuration wherein the occupant protection device is mounted on a passenger seat.

In the fifth embodiment and the sixth embodiment, a configuration wherein the occupant protection device 10 is provided in a driver's seat of a vehicle has been described, but the invention not being limited to this, the occupant protection device 10 can also be provided in a rear seat or a passenger seat of a vehicle. For example, a case wherein the occupant protection device 10 is provided in a passenger seat of a vehicle is such that on the airbag 230 inflating in a state wherein a distance between the seat 201 and an instrument panel 295 in front of the seat 201 is long, as shown in FIG. 40, the tether 230c catches on and is engaged with the knee portion MK of the occupant M seated in the passenger seat from above, and the bag main body portion 230*a* is supported by the knee portion MK of the occupant M via the tether 230*c*.

Also, in the fifth embodiment and the sixth embodiment, the occupant protection device 10 is described with the so-called three-point seatbelt 211, wherein the seatbelt 211 includes the shoulder belt portion 212 and the lap belt portion 213, as an example, but the invention is not limited to this. That is, even when the invention is applied to the so-called two-point seatbelt 211, wherein the seatbelt 211 includes the lap belt portion 213 without including the shoulder belt portion 212, advantages the same as those heretofore described can be obtained.

What is claimed is:

1. An occupant protection device, comprising:
    a seatbelt having at least a tongue, a buckle to which the tongue is joined, and a lap belt portion that restrains a waist portion of an occupant seated on a seat in a state where the tongue is joined to the buckle;
    an inflator that discharges an inflating gas; and
    an airbag that is provided in the lap belt portion, the airbag including a main body portion that expands owing to the inflating gas being supplied and receives the occupant, a conduit portion that is connected to the inflator, guides the inflating gas discharged from the inflator to the main body portion, and causes the inflating gas to flow into the main body portion, and a tether linked to an outer peripheral face of the main body portion,
    wherein the main body portion when inflation is completed includes a rear wall portion that comes into contact with the occupant and to which one end portion of the tether is linked,
    a front wall portion that is disposed in front of the rear wall portion, separated from the rear wall portion, and to which another end portion of the tether is linked, and
    an upper wall portion that connects the rear wall portion and the front wall portion above the tether,
    wherein the main body portion is adapted and configured for being supported by a supporting body via the tether by the tether which is adapted and configured for catching on so as to follow an upper surface of the supporting body and being engaged with the supporting body, and
    wherein the tether is connected along a left-right direction to the main body portion.

2. The occupant protection device according to claim 1, wherein the main body portion is formed of a fabric, and the tether is formed of one portion of the fabric forming the main body portion.

3. The occupant protection device according to claim 1, further comprising a take-up mechanism that can take up the seatbelt,
    wherein the inflator and the take-up mechanism are mounted on the seat.

4. The occupant protection device according to claim 1, wherein the supporting body is a steering wheel mounted in a vehicle.

5. The occupant protection device according to claim 1, wherein the supporting body is a knee portion of the occupant.

6. The occupant protection device according to claim 1, wherein the rear wall portion has a first protruding portion and a second protruding portion, the first protruding portion being disposed on one left-right direction end side and protruding downward in such a way that at least one portion thereof is positioned lower than a linking region of the tether in the rear wall portion, the second protruding portion being disposed on another left-right direction end side, being separated in the left-right direction from the first protruding portion, and protruding downward in such a way that at least one portion thereof is positioned lower than the linking region of the tether in the rear wall portion.

7. The occupant protection device according to claim 6, wherein the first protruding portion and the second protruding portion are disposed in approximately symmetrical positions with a left-right direction center of the rear wall portion as a reference.

8. The occupant protection device according to claim 6, wherein the first protruding portion and the second protruding portion are of a form having approximate bilateral symmetry.

9. The occupant protection device according to claim 6, wherein the front wall portion has a third protruding portion and a fourth protruding portion, the third protruding portion protruding rearward from one left-right direction end side and being disposed such that at least one portion of which is positioned lower than a linking region of the tether in the front wall portion, the fourth protruding portion protruding rearward from a position on another left-right direction end side, being separated in the left-right direction from the third protruding portion, and being disposed such that at least one portion of which is positioned lower than the linking region of the tether in the front wall portion.

10. The occupant protection device according to claim 9, wherein the third protruding portion and the fourth protruding portion are disposed in approximately symmetrical positions with a left-right direction center of the front wall portion as a reference.

11. The occupant protection device according to claim 9, wherein the third protruding portion and the fourth protruding portion are of a form having approximate bilateral symmetry.

12. The occupant protection device according to claim 1, wherein the rear wall portion includes a through hole penetrating in a front-rear direction, the through hole being formed at a center of the rear wall portion in a left-right direction and extending upward from a bottom end of the rear wall portion in a vertical direction.

13. The occupant protection device according to claim 12, wherein the through hole is of an approximate inverted U form whose lower side is an aperture portion when seen from the front-rear direction.

14. The occupant protection device according to claim 12, wherein the other end portion of the tether is linked in a position farther to the upper wall portion side than a leading end portion of the front wall portion.

15. An occupant protection device, comprising:
    a seatbelt having at least a tongue, a buckle to which the tongue is joined, and a lap belt portion that restrains a waist portion of an occupant seated on a seat in a state where the tongue is joined to the buckle;
    an inflator that discharges an inflating gas; and
    an airbag that is provided in the lap belt portion, the airbag including a main body portion that expands owing to the inflating gas being supplied and receives the occupant, a conduit portion that is connected to the inflator, guides the inflating gas discharged from the inflator to the main body portion, and causes the inflating gas to flow into the main body portion, and a tether linked to an outer peripheral face of the main body portion,
    wherein the main body portion when inflation is completed includes a rear wall portion to which one end portion of the tether is linked, that comes into contact with the occupant, and has a first protruding portion protruding rearward from one left-right direction end side, and a second protruding portion protruding rearward from a position on another left-right direction end side separated in the left-right direction from the first protruding portion, a front wall portion that is disposed in front of the rear wall portion, separated from the rear wall portion in a front-rear direction, and to which another end portion of the tether is linked, and an upper wall portion that connects the rear wall portion and the front wall portion above the tether, wherein the main body portion is adapted and configured for being supported by a supporting body via the tether by the tether which is adapted and configured for catching on so as to follow an upper surface of the supporting body and being engaged with the supporting body, wherein the tether is connected along a left-right direction to the main body portion.

16. An occupant protection device, comprising:

a seatbelt having at least a tongue, a buckle to which the tongue is joined, and a lap belt portion that restrains a waist portion of an occupant seated on a seat in a state where the tongue is joined to the buckle;

an inflator that discharges an inflating gas; and an airbag that is provided in the lap belt portion, the airbag including a main body portion that expands owing to the inflating gas being supplied and receives the occupant, a conduit portion that is connected to the inflator, guides the inflating gas discharged from the inflator to the main body portion, and causes the inflating gas to flow into the main body portion, and a tether linked to an outer peripheral face of the main body portion, wherein the main body portion when inflation is completed includes:

a rear wall portion to which one end portion of the tether is linked, that comes into contact with the occupant, and that has a non-expanding portion, the non-expanding portion being disposed in a left-right direction center of the rear wall portion, extending upward from a lower end of the rear wall portion in a vertical direction, and being regulated an inflow of the inflating gas;

a front wall portion that is disposed in front of the rear wall portion, separated from the rear wall portion, and to which another end portion of the tether is linked; and an upper wall portion that connects the rear wall portion and the front wall portion above the tether, wherein the main body portion is adapted and configured for being supported by a supporting body via the tether by the tether which is adapted and configured for catching on so as to follow an upper surface of the supporting body and being engaged with the supporting body, wherein the tether is connected along a left-right direction to the main body portion.

\* \* \* \* \*